United States Patent [19]

Vinal

[11] 3,947,662

[45] Mar. 30, 1976

[54] DISTORTED TWO FREQUENCY CODED DATA INTERPRETING METHOD AND APPARATUS

[75] Inventor: Albert Watson Vinal, Cary, N.C.

[73] Assignee: International Business Machines Corporation, Armonk, N.Y.

[22] Filed: Dec. 31, 1974

[21] Appl. No.: 538,272

[52] U.S. Cl. ............................ 235/61.11 E; 360/43
[51] Int. Cl.² .......................................... G11B 5/09
[58] Field of Search. 360/43; 235/61.11 D, 61.11 E; 340/347 DD

[56] References Cited
UNITED STATES PATENTS

| | | | |
|---|---|---|---|
| 3,235,855 | 2/1966 | Woo | 360/43 |
| 3,623,040 | 11/1971 | Erickson et al. | 360/43 |
| 3,701,097 | 10/1972 | Wolff | 340/146.3 Z |
| 3,711,843 | 1/1973 | Galvagni et al. | 360/45 |
| 3,727,202 | 4/1973 | Fort | 360/42 |
| 3,737,632 | 5/1973 | Barnes | 235/61.11 E |
| 3,750,108 | 7/1973 | Jensen | 340/172.5 |
| 3,805,175 | 4/1974 | Nassimbene | 325/38 B |
| 3,811,033 | 5/1974 | Herrin et al. | 235/61.11 E |

Primary Examiner—Thomas J. Sloyan
Attorney, Agent, or Firm—Edward H. Duffield

[57] ABSTRACT

An improved method and apparatus are disclosed for the reading (or sensing) and decoding of two frequency "bar coded" or transition coded sensible data. The data may take the form of indicia recorded on various media or it may be transmitted on a communications channel. The method and apparatus include means for simultaneously or separately accommodating both variable velocity scan (or distorted reception) conditions and non-uniform bar widths in the coded data or other variations in the spacing of transition signals in the recorded indicia. Frequency variations in transmitted data signals can also be accommodated. Hand held sensor or "wand" scanning of coded tangible indicia-bearing media is facilitated for either optically or magnetically recorded data indicia. Correct interpretation of frequency-distorted transmitted data is also made possible.

30 Claims, 54 Drawing Figures

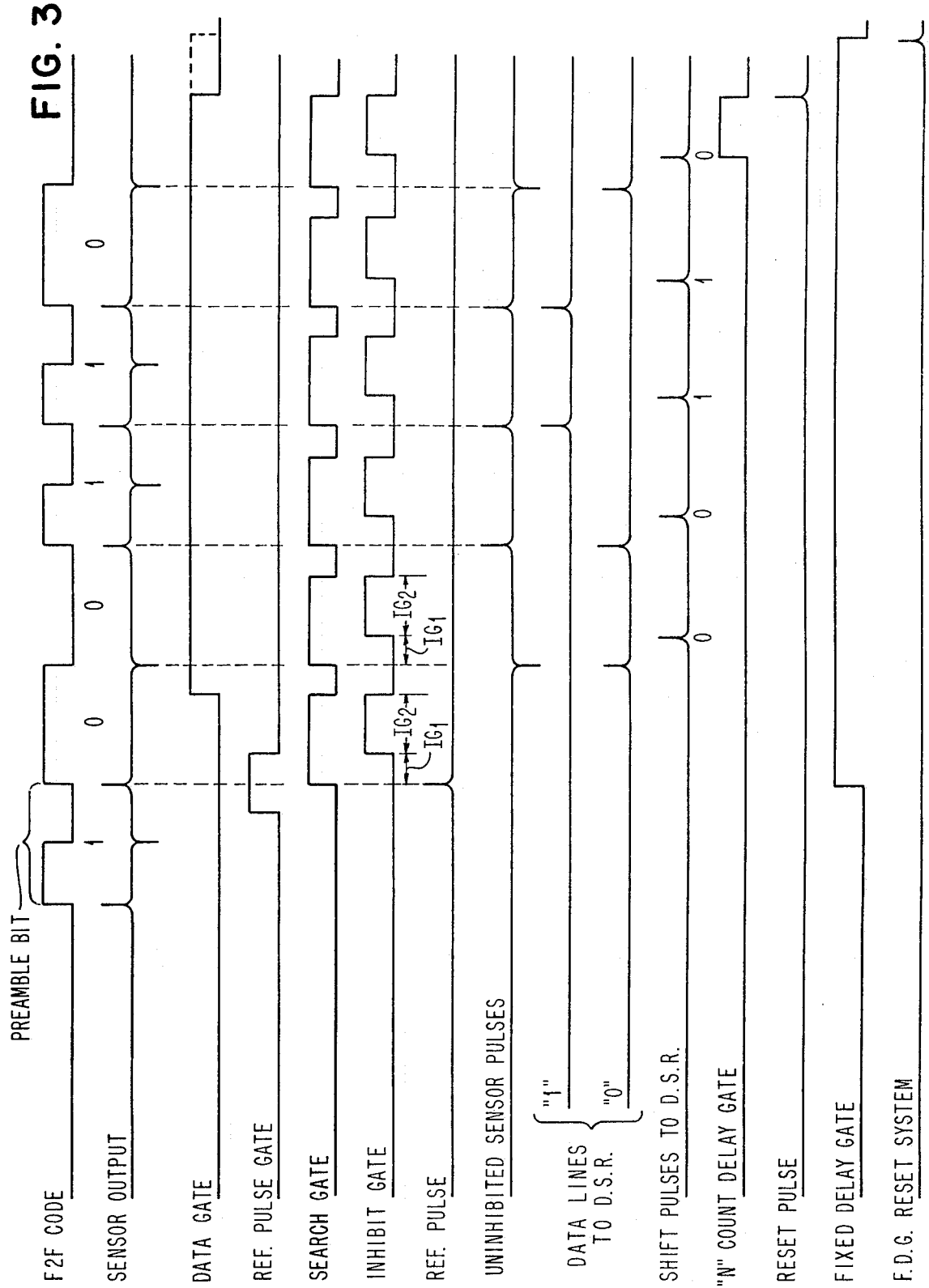

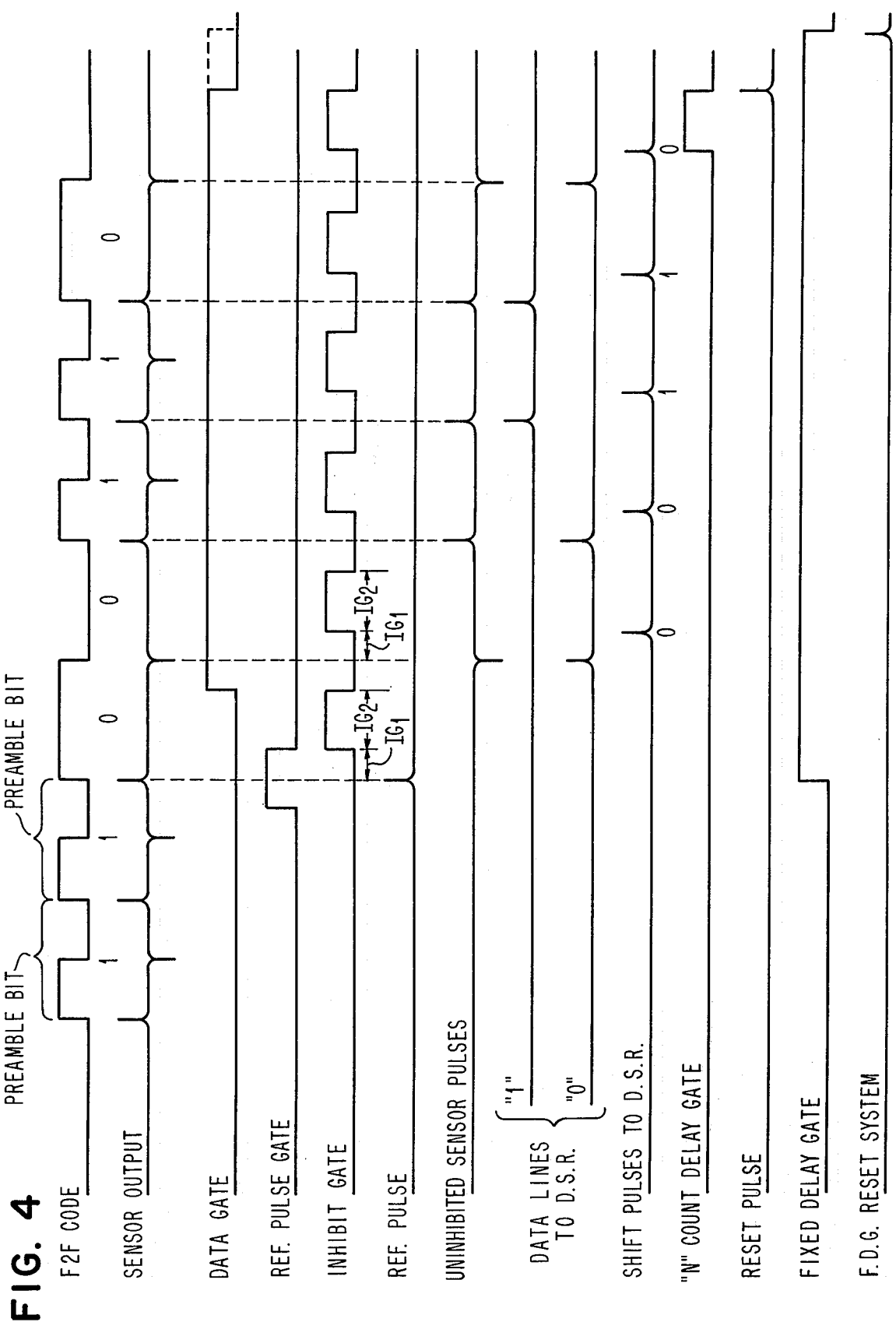

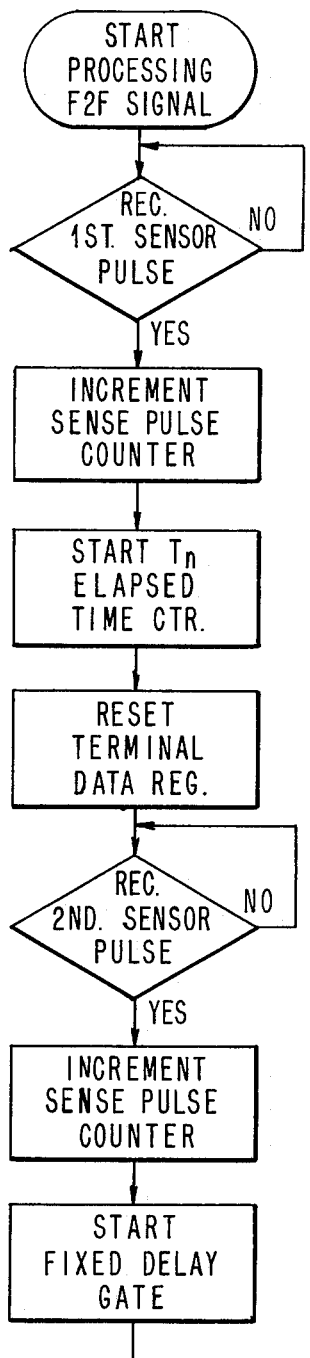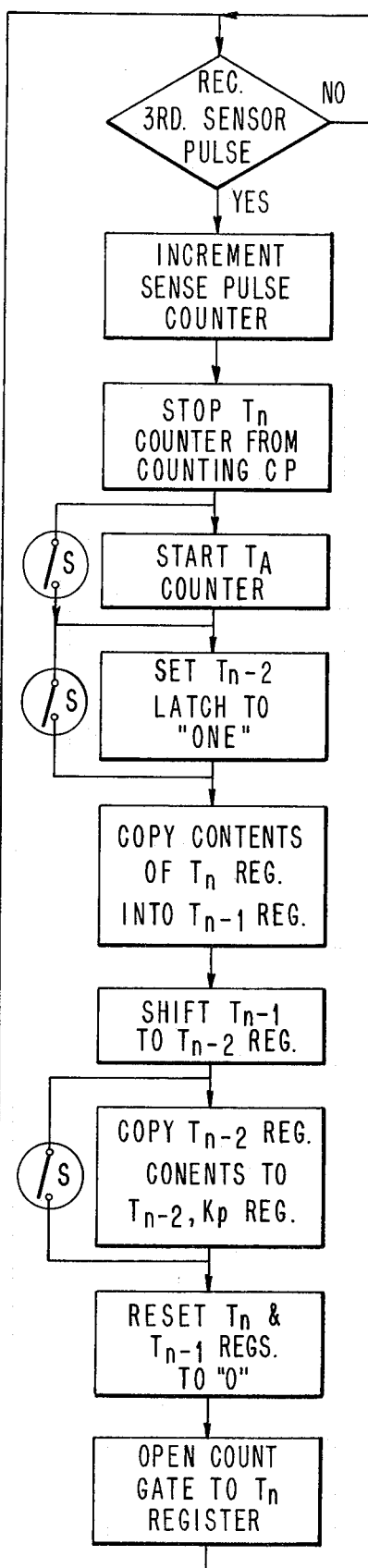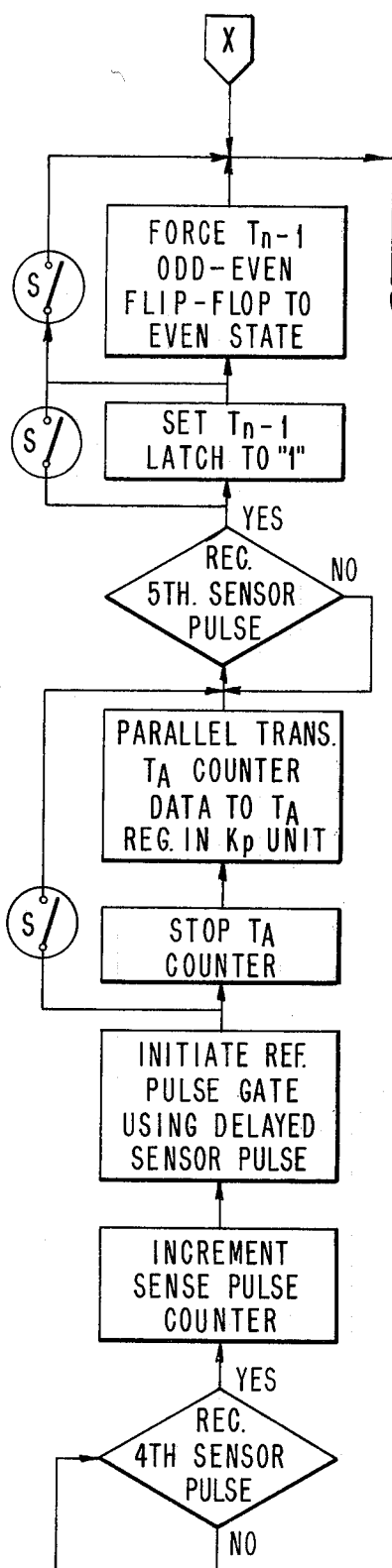
FIG. 5A

DOUBLE FREQUENCY INHIBIT TECHNIQUE WITH POLAR COMPARISON DECODE

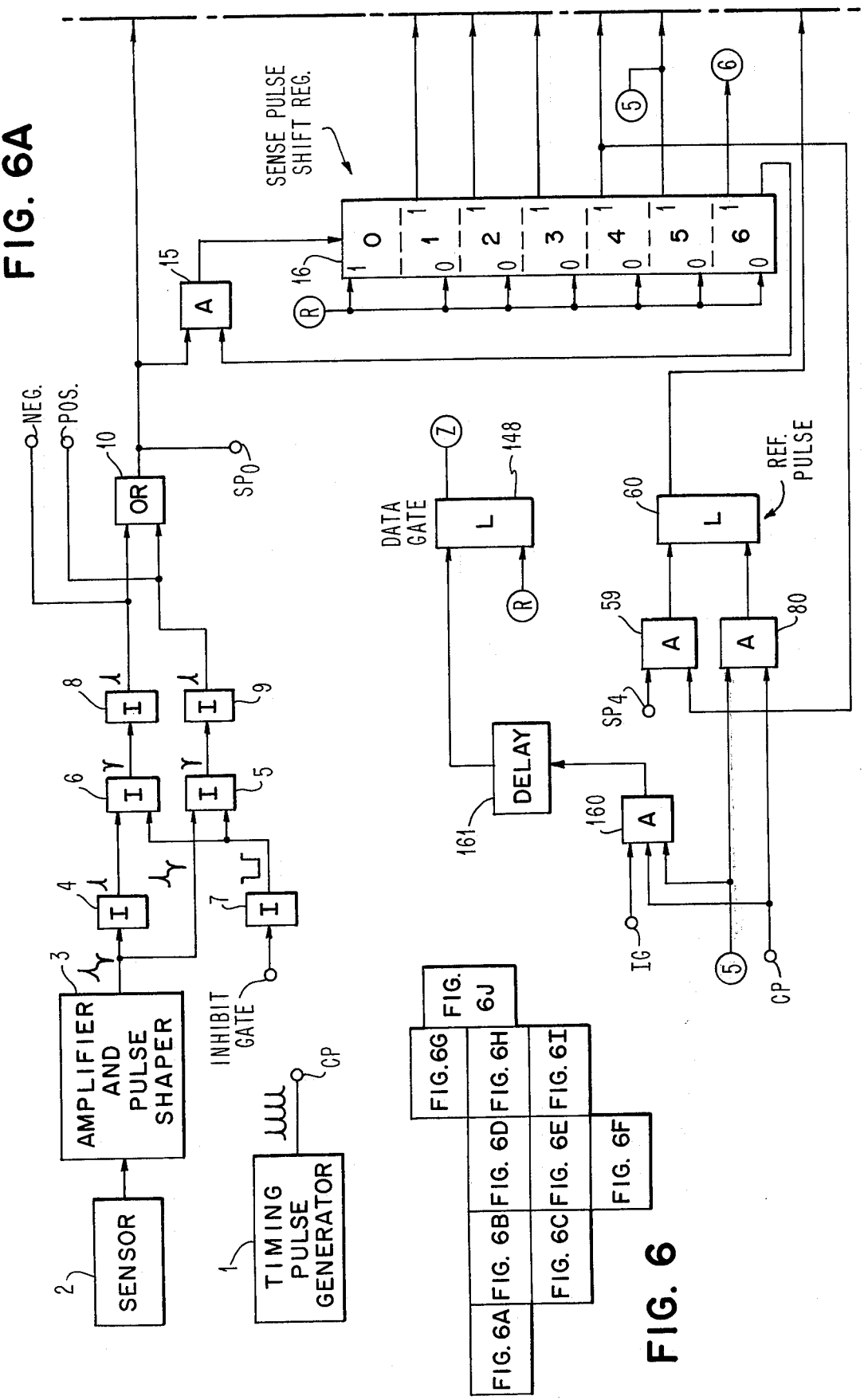

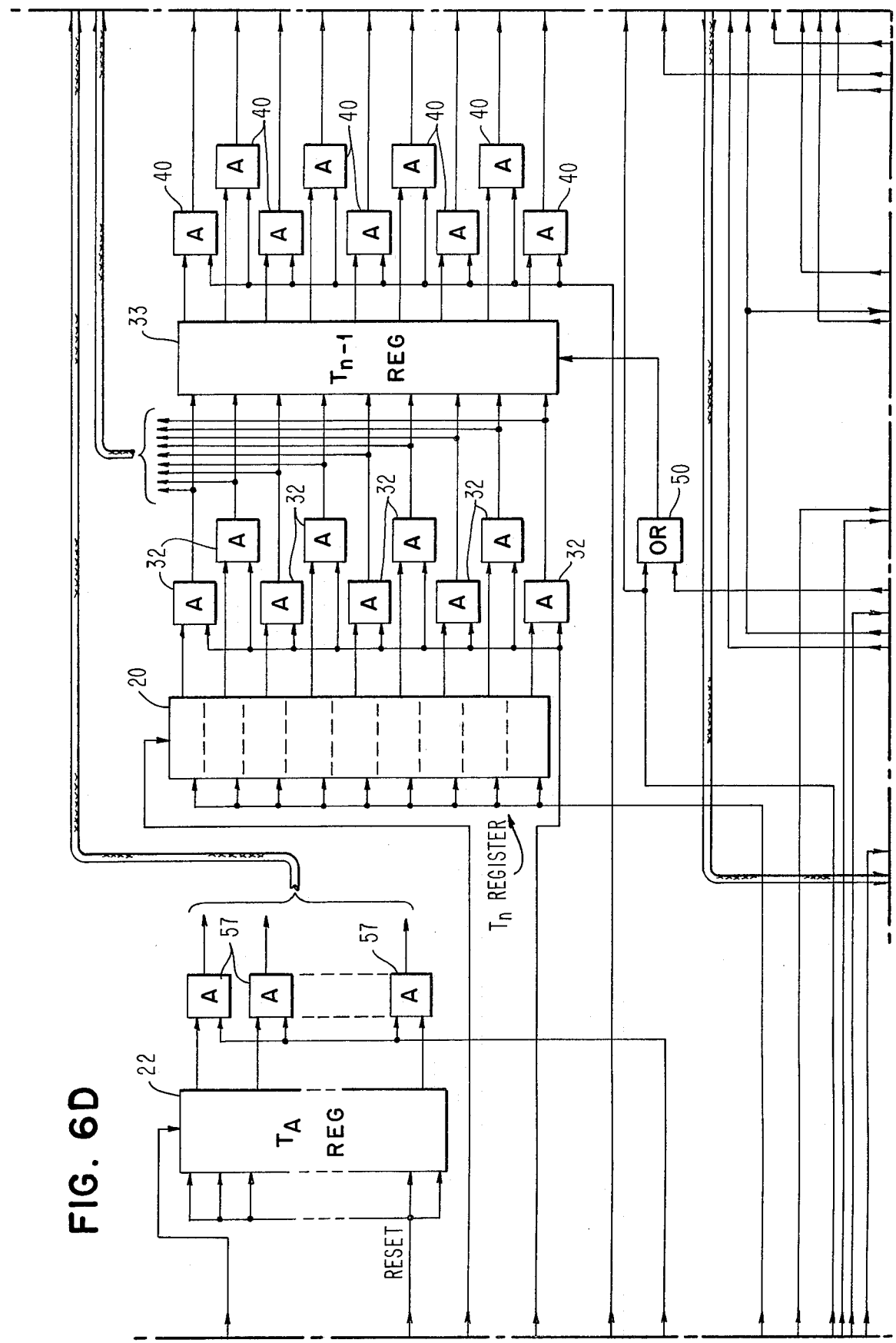

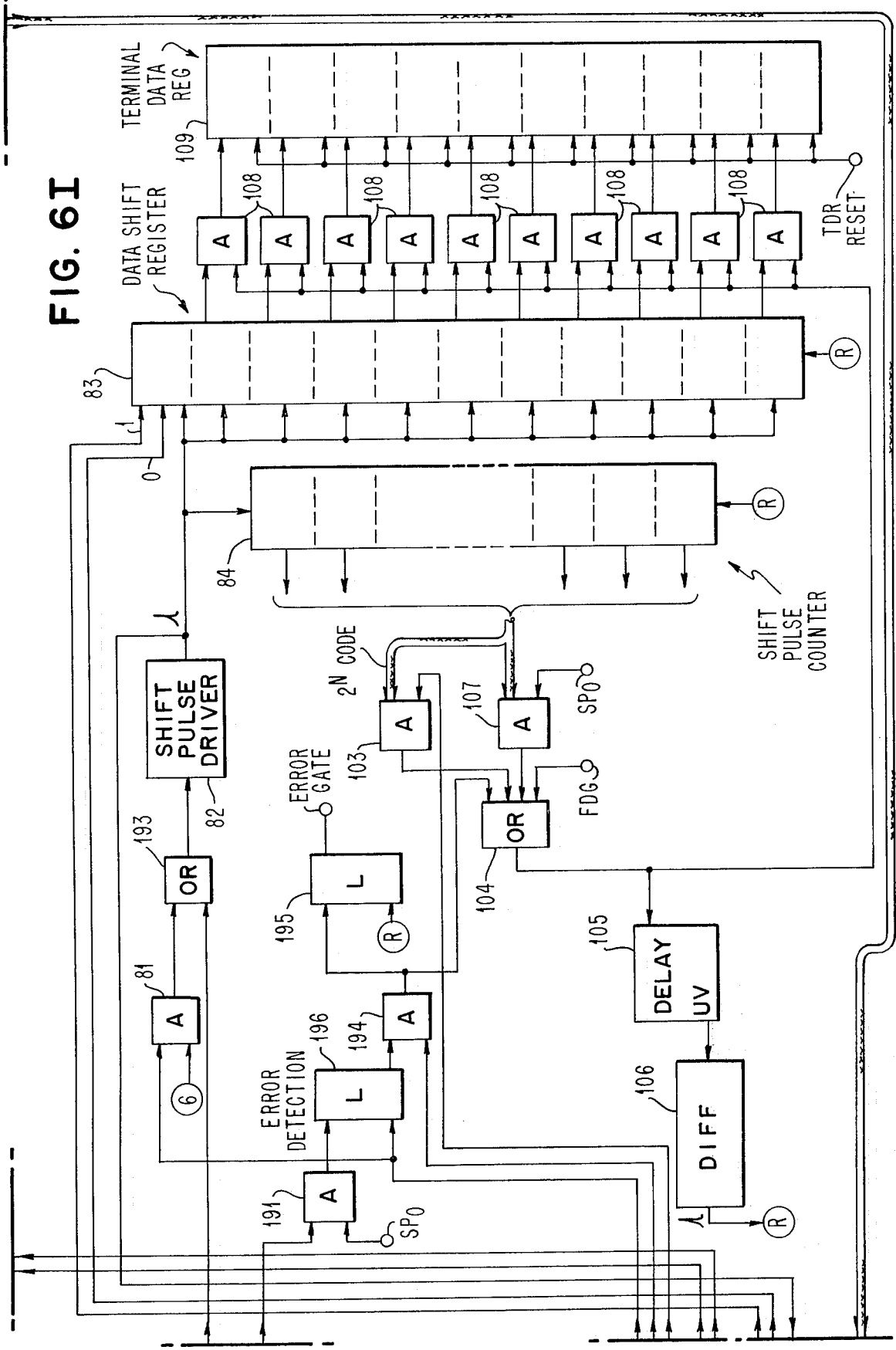

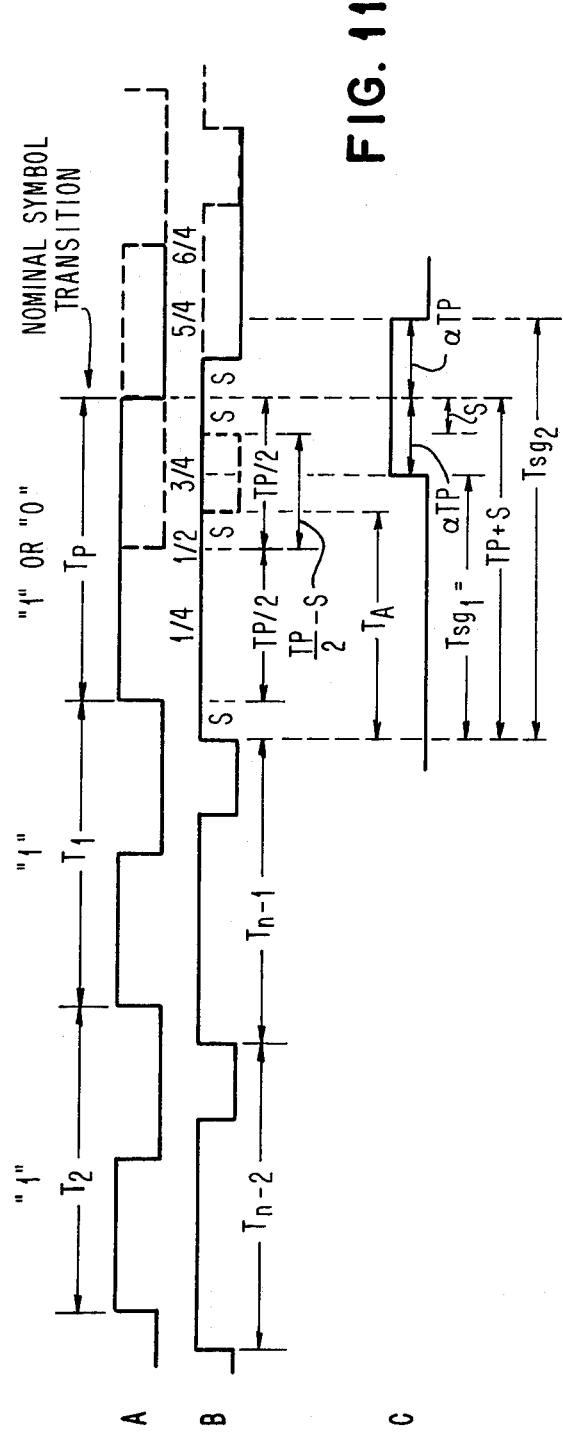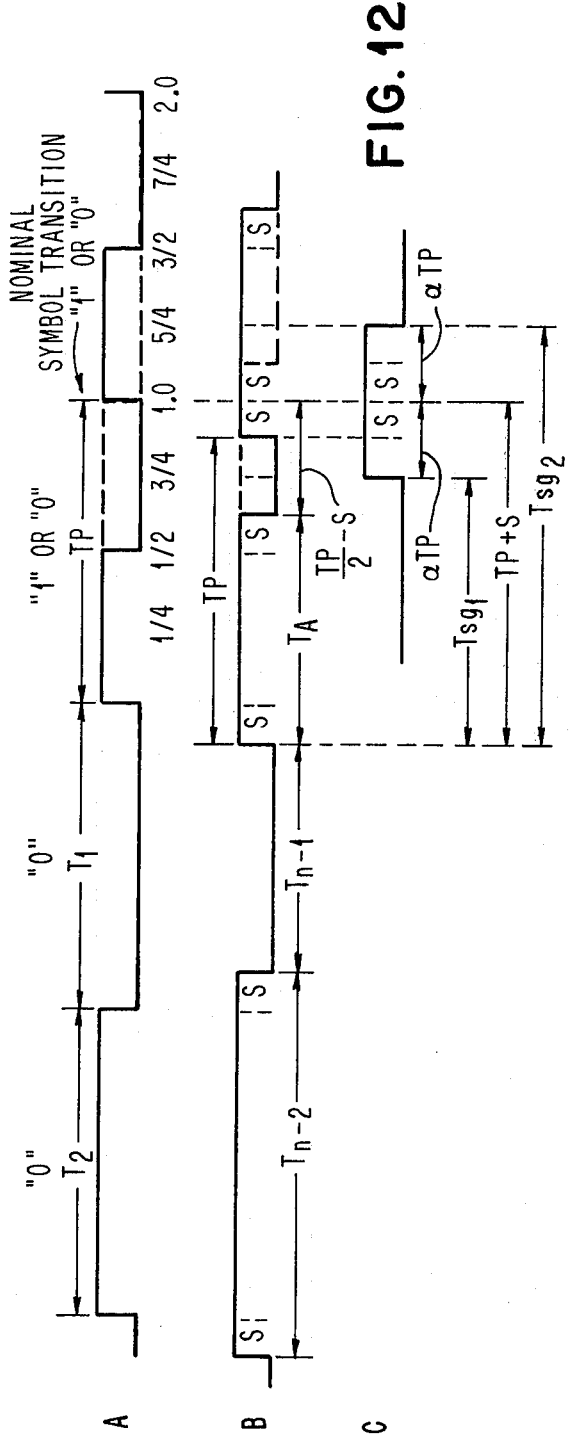

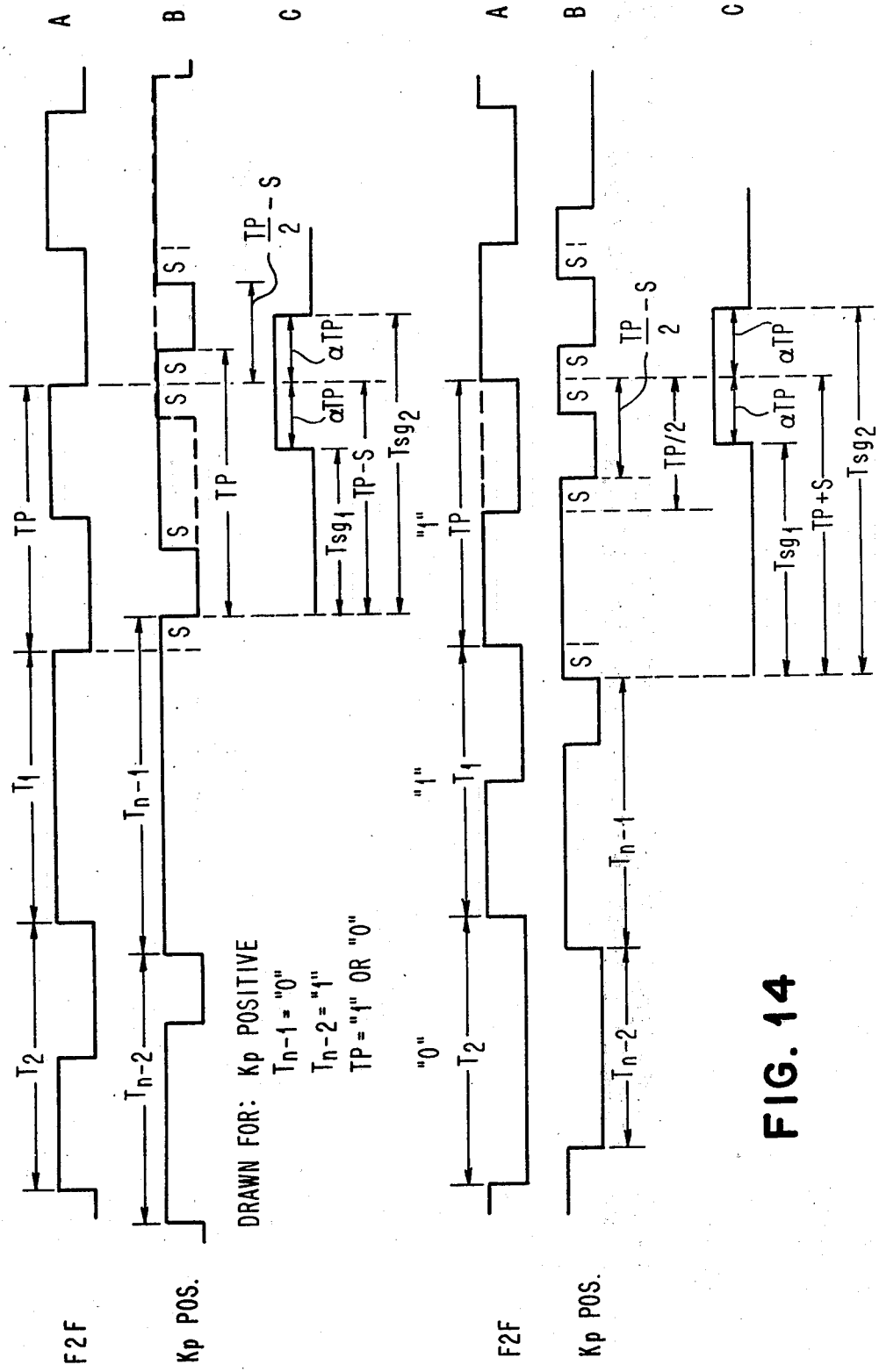

FIG. 15
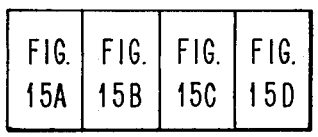
FIG. 15A
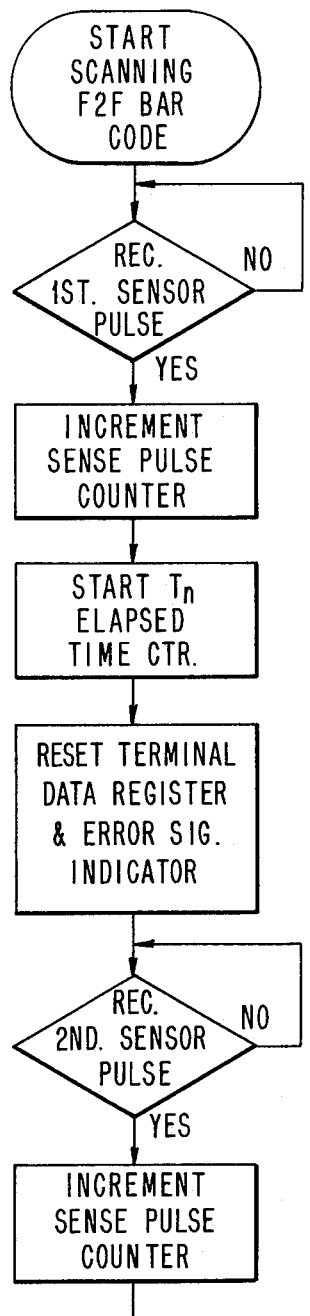
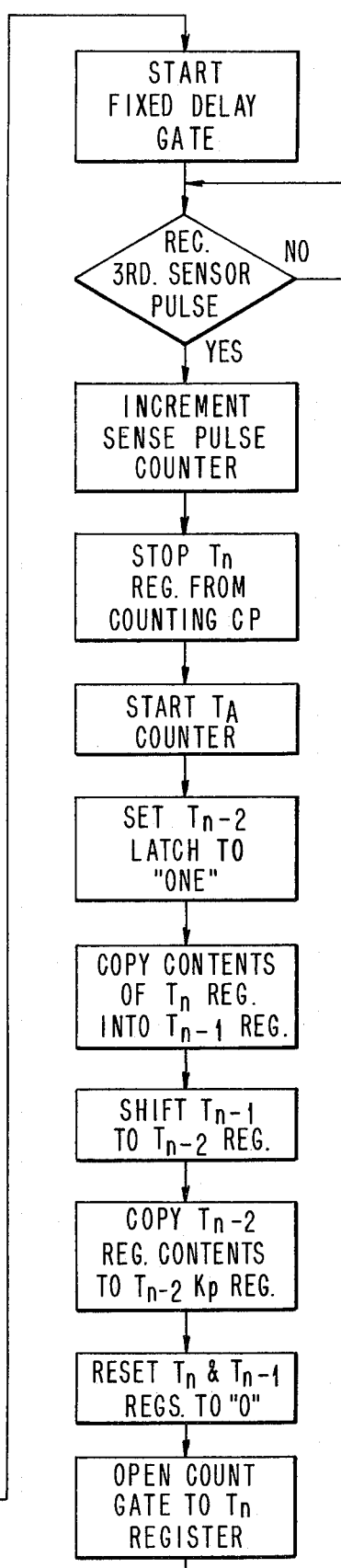
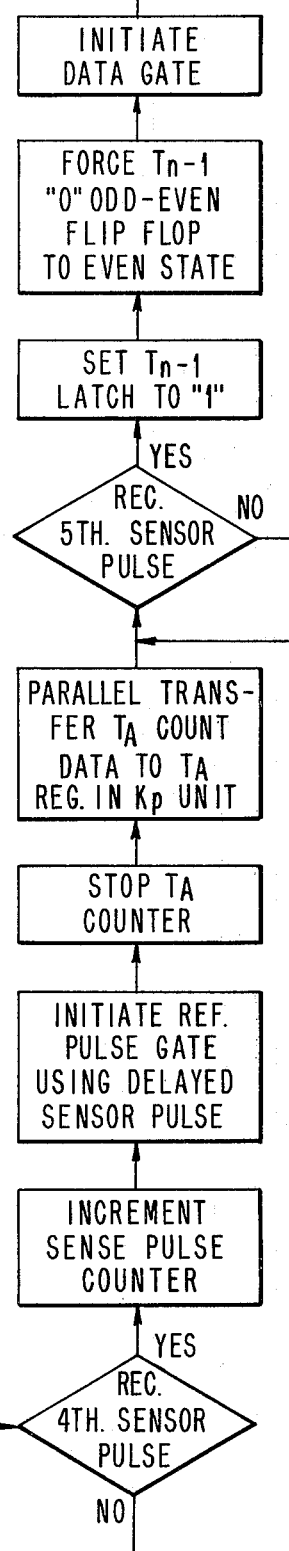

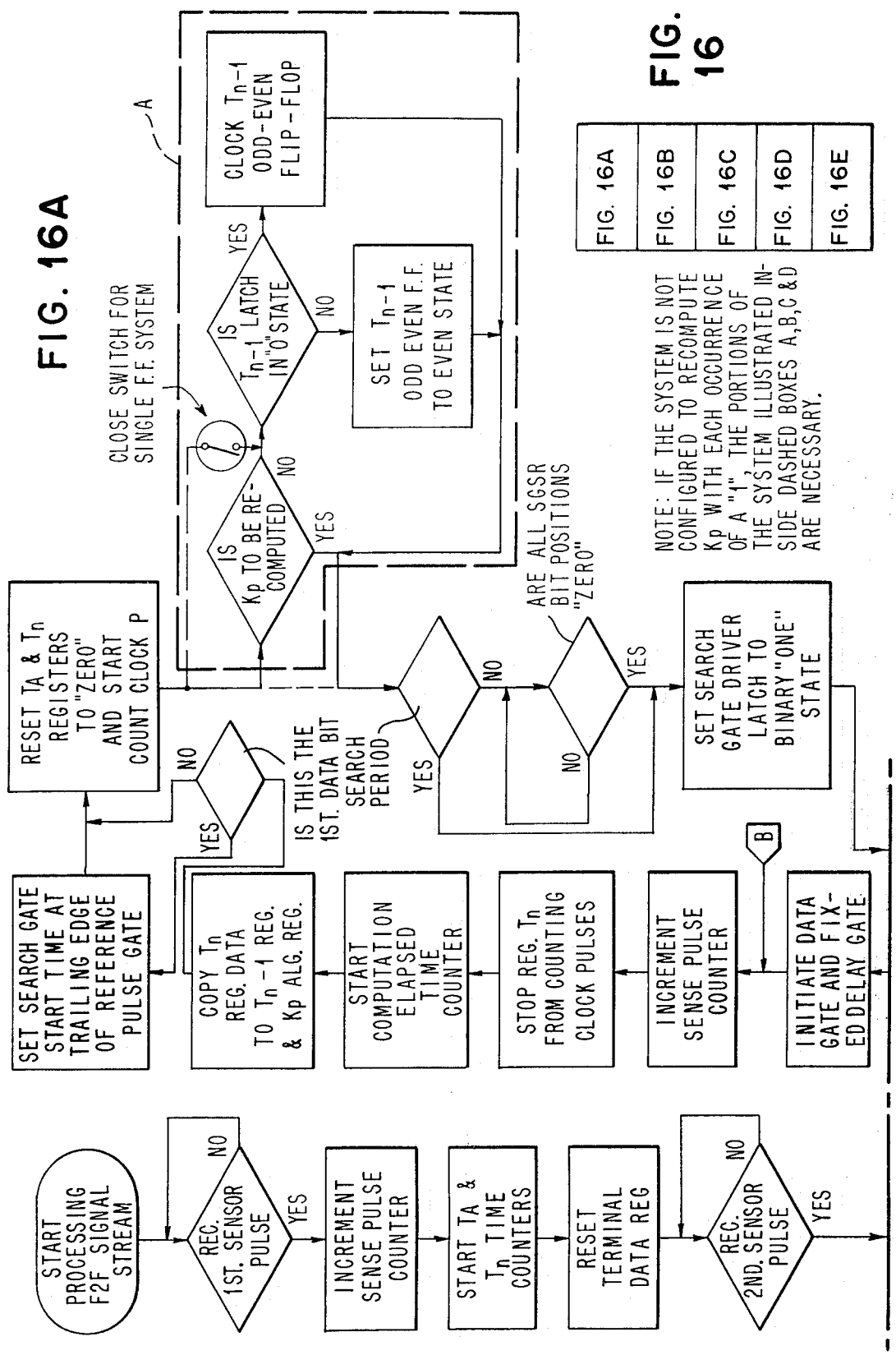

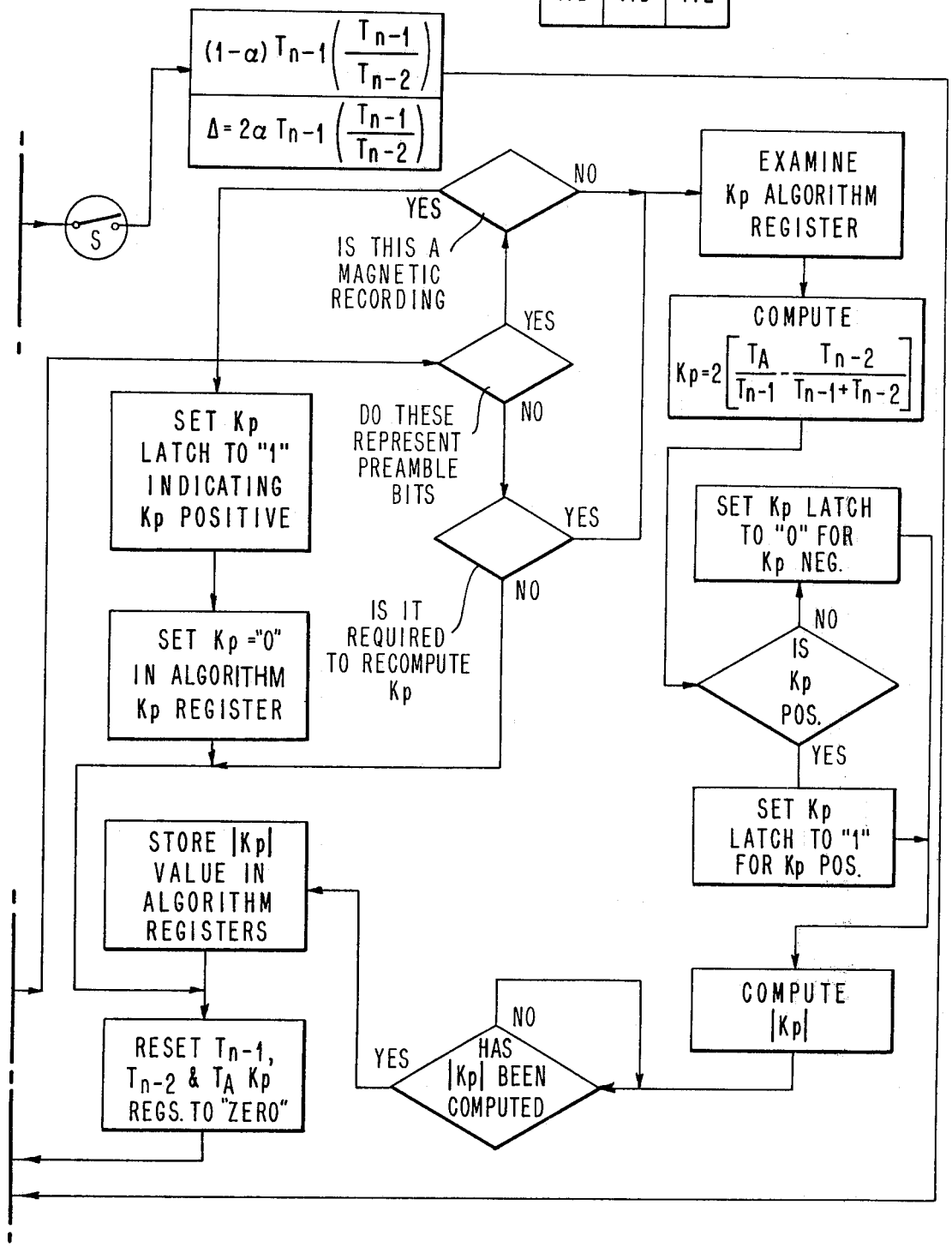

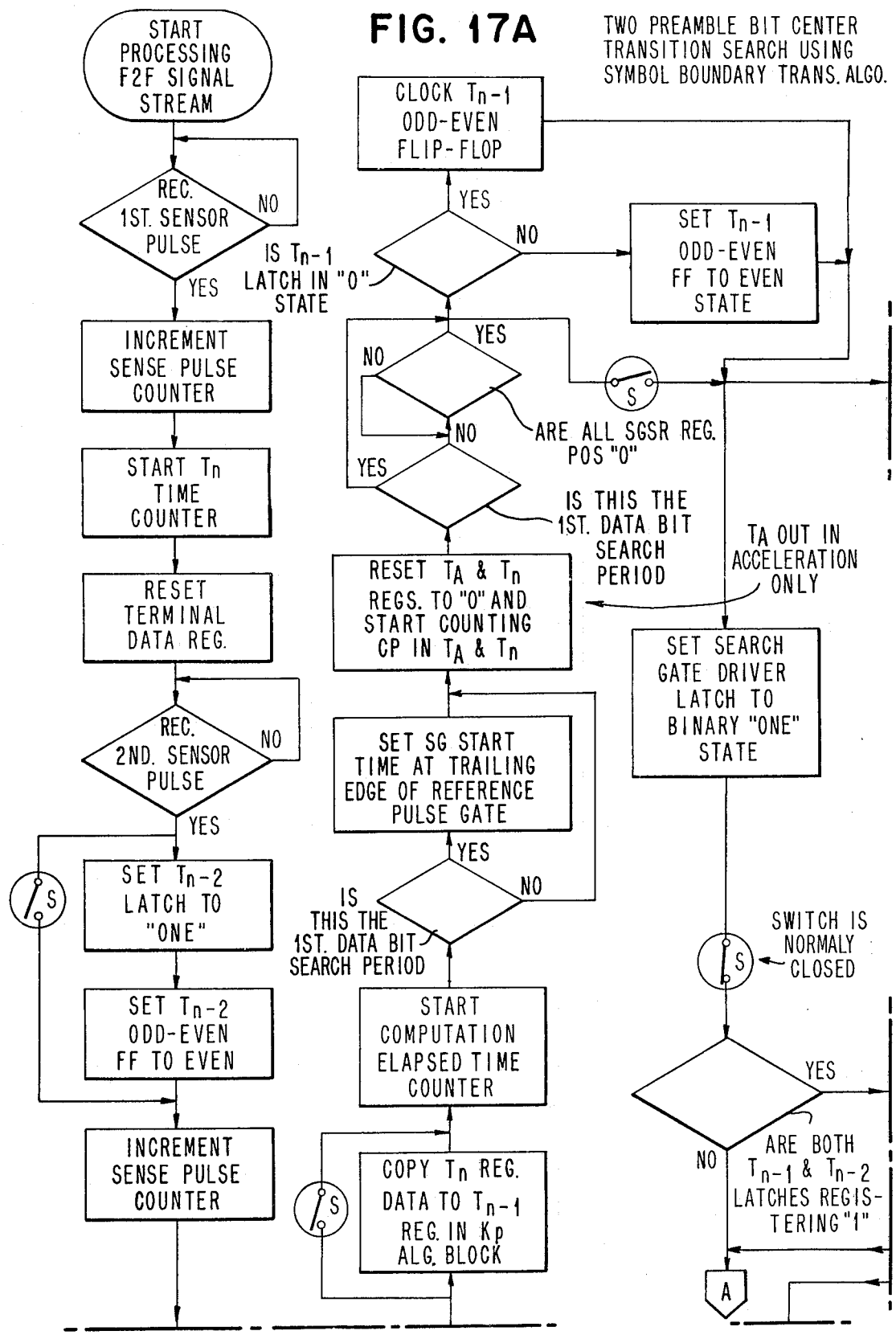

ZERO ACCELERATION

FOR $T_{n-1}\left[(1\pm\alpha)-\dfrac{|K_p|}{4}\right]$ #1, #6

ZERO ACCELERATION $T_{n-1}\left(\dfrac{2(1+\alpha)-\dfrac{|K_p|}{2}}{2+|K_p|}\right)$   $\Delta = 2\alpha\left(\dfrac{2T_{n-1}}{2+|K_p|}\right)$

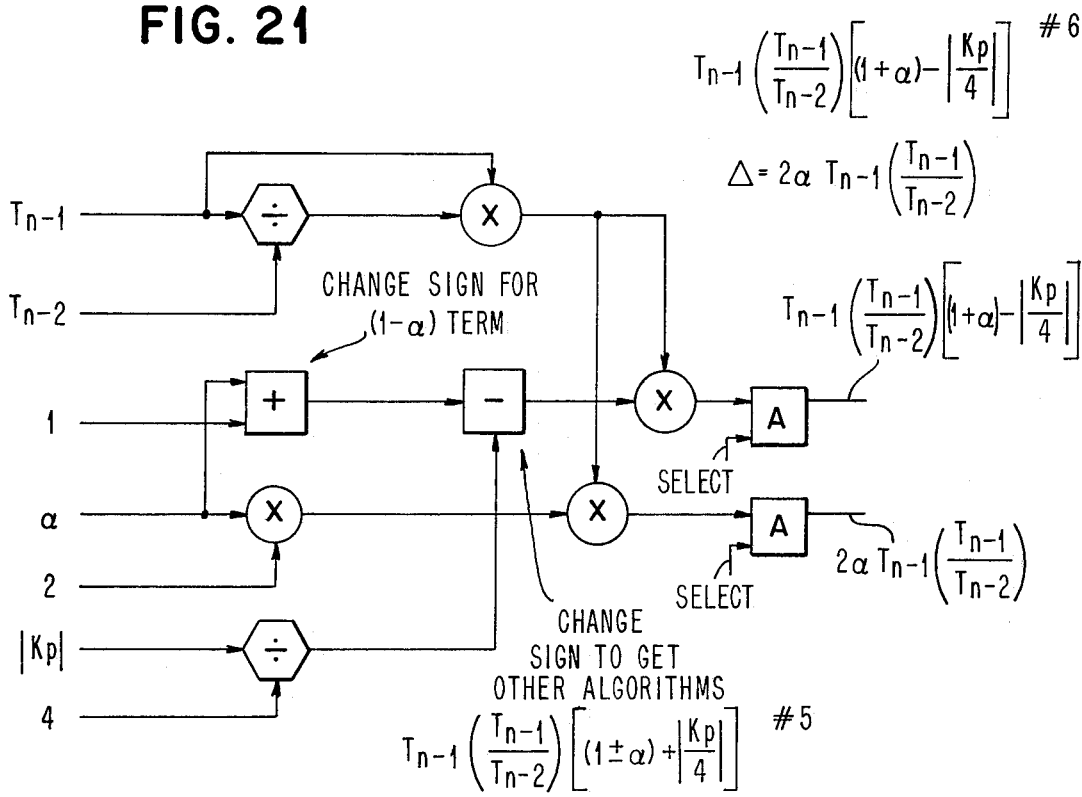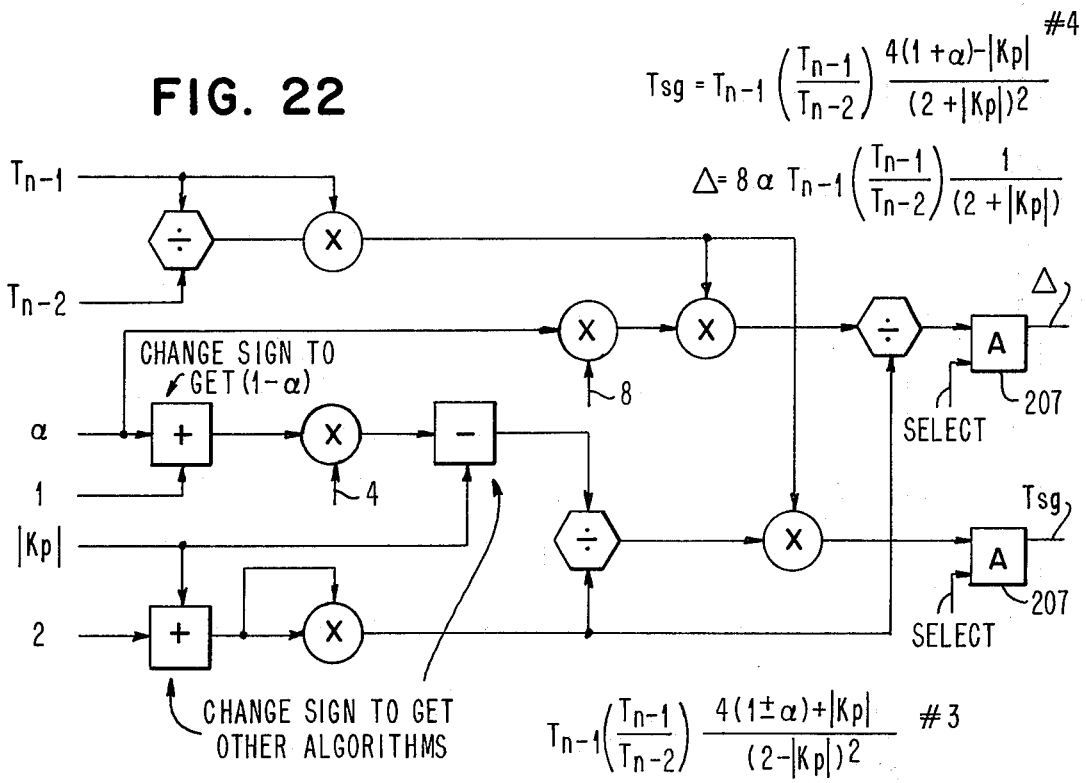

DISTORTED TWO FREQUENCY CODED DATA INTERPRETING METHOD AND APPARATUS

FIELD OF THE INVENTION

This invention relates generally to recorded indicia or transmitted code sensing and decoding methods and apparatus and to data processing systems. More specifically, it relates in particular to self-clocking coded data indicia sensing and decoding systems and apparatus.

PRIOR ART

A large body of prior art exists in which bar width coded indicia (for optical scanning) or transition time based magnetic bar widths are utilized to encode data in any one of a variety of code formats. Examples of such bar codes or transition coding schemes may be found in U.S. Pat. No. 3,750,108 to Jensen for example, or U.S. Pat. No. 3,811,033 to Herrin et al, or in U.S. Pat. Nos. 3,708,748, 3,701,886, 2,870,429, 2,887,674, 3,111,576, 3,723,710 and 3,403,377. While a good deal of art exists in addition to the aforementioned patents, these are fairly representative of the approaches that have been taken in writing, reading and interpreting bar coded or transition coded indicia or signals. The systems are essentially intended for use with either magnetic or optically encoded data. In such systems, the recoded indicia may be optically visible and may also be magnetically readable, such as is commonly the case with magnetic (MICR) ink characters. Also, the indicia may be optical only with contrasting light and dark or colored bars. The indicia may be magnetic only with optically invisible magnetically encoded bar patterns which, on a magnetic medium, serve the same purpose as optical bars, insofar as scanning with a magnetic sensing head versus an optical scanning head is concerned. Alternatively, a stream of signal variations may arrive over a communications channel in the form of distorted frequency coded signal transitions which vary in a manner similar to that produced by a scanning head.

As will be apparent to those skilled in the art, previous patents, such as mentioned above, have directed themsevles toward problems of uneven spacing of the bars, frequency variations in the signal, or variations in indicia spacing which differ from the ideal spacing desired according to the coding format. Such variations make the problem of interpreting the encoded data difficult. Also, variations in the relative velocity between the scanning head, whether it be optical or magnetic, and the data records, introduce errors since the transition times, or crossings of the edges of optically visible bars or magnetically sensible bars, will vary if the scanning velocity varies or if, during encoding, the encoding system experienced varying transport velocities.

While the aforementioned patents are indicative of some general improvement in the art of scanning, writing, and decoding these types of coded indicia, or interpreting such distorted signals, two inherent problems remain essentially unsolved: when the coded indicia are printed with ink on paper or other similar media, the ink tends to spread or flow into the media and vary the width of the resulting printed indicia. This problem, known as "print spread," introduces an inherent source of error since the edges of the coded data bars will not occur at the ideal width or spacing at which they are desired. As will be apparent to those skilled in the art, this problem becomes increasingly significant with increasing print spread. It is also apparent that certain types of code format are more sensitive to this phenomenon, even given a constant velocity scanning operation, than are other codes.

As will appear in greater detail below, the prior art has not produced an acceptable solution to the problem of print spread. Such a solution is a prerequisite for the use of a hand held, freely movable wand or scanning head approach where the operator moves the wand freely and easily across a printed indicia for reading it. Some "hand-wandable" bar code formats have been introduced, but the operator is generally required to move the sensing wand, or scanner head at a fairly constant velocity and in a carefully prescribed manner across the indicia in order to read it effectively. The amount of training and skill required to perform this operation repeatedly and correctly are a source of great dissatisfaction. It is desirable to improve the system to permit an untrained operator to move the hand-held sensor at will, without any particular training or preparation, across bar coded indicia and consistently read it effectively and correctly extract the data therefrom.

A second inherent problem with the prior art deals with the compensation for variations in scanning velocity or transmitted signal frequency variations. Systems which depend on the measured time interval between signal transitions of previous bar coded bits of data, and which compensate internally for variations in these measurements by using a continuously varying standard, have met with some success as evidenced by the prior mentioned patents such as U.S. Pat. No. 3,811,033. Unfortunately, the degree of velocity (or frequency) variation in a hand held scanner system is such, as will appear later, that the aforementioned systems in the prior art will not function effectively. As a result, the coded data will be read inaccurately under certain conditions of high acceleration and/or print spread.

The combination of acceleration (velocity) effects with print spread effects compounds the problem and creates seriously detrimental difficulties in accurately reading and interpreting coded data encoded under these width or transition time-frequency formats. In addition, the use of hand held scanners or sensors produces a phenonmenon known as "skew" in which, unless the path of the scanner head is directly perpendicular to the widths of the bar or the transition coded data, the transitions will appear to occur spaced wider in time than they physically are on the media. If the scan path produced in hand scanning is a wavy line rather than a straight line, the problem is further compounded.

OBJECTS OF THE INVENTION

In light of the foregoing problems and inherent difficulties with bar or transition coded indicia sensing and decoding systems, it is an object of this invention to provide an improved means and method for compensating for print spread in printed bar or transition coded data records so that they may be effectively sensed with a hand held sensor in an improved manner.

Another object of the invention is to provide an improved encoding/decoding technique for use in F2F signal transmission or recording systems.

A further object of the invention is to provide an improved means and method for compensating for acceleration effects in hand held, or other non-uniform velocity scanning, or sensing systems in general, or in non-hand held systems in an improved manner which effectively compensates for all spread, velocity or frequency distortion effects.

Still another object of the invention is to provide an improved means and a method for compensating for the combined effects of print spread and acceleration simultaneously.

SUMMARY OF THE INVENTION

The foregoing and other objects of the invention are met by providing a means and method for first measuring signal transition time spacings and then adjusting an inhibit or signal blocking time to account for the amount of print spread and/or acceleration effects detected in the initial measuring operation, so that the symbol boundaries in transition codes or bar codes, encoded in an improved way, can be isolated and accurately interpreted when sensed. Additional means and method are utilized for measuring and adjusting the inhibit operation for acceleration alone or spread alone accordng to specially derived algorithms as will appear later. Combined algorithms for correcting for both print spread and acceleration are also derived and developed and embodied in particular embodiments which will be discussed.

BRIEF DESCRIPTION OF THE DRAWINGS

FIG. 3 illustrates a schematic timing diagram for the logic operations of a preferred embodiment of the invention.

FIG. 4 illustrates a schematic timing diagram for the logic operations of another preferred embodiment of the invention.

FIGS. 11–14 illustrates arbitrary code sequences used in deriving the algorithms in Table 1A and 1B.

FIGS. 19–23 illustrate, in schematic logic form, the mathematical computation logic circuits for the algorithms in Tables 1A and 1B.

Figure 1:
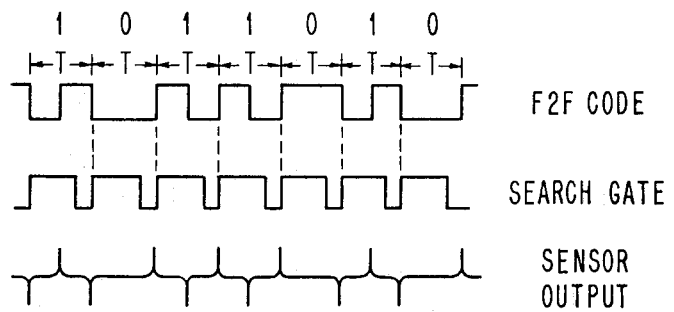
FIG. 1 is a schematic representation of the prior art F2F code and of the generally accepted method of decoding or reading such a code. A typical, but undistorted, sensor output or signal stream is also shown.

Specific embodiments of the present invention, together with flow charts illustrating their sequence of operation will be discussed shortly. However, since it is necessary to introduce a good many new terms and to discuss generally the problem to be encountered and overcome, this specification will, for reference and general background information, incorporate here by reference the entirety of my copending, commonly assigned, application Ser. No. 522,210 filed 11-8-74, where the nature of the recording or transmission technique, generally regarded in the art as "F2F" encoding, is discussed with relationship to the phenomenon known as "print spread." Print spread occurs when such coding techniques are applied to printed bar characters or codes. In a second segment of the above incorporated application, the problems of acceleration of the sensor relative to the data bearing media (or velocity variations during encoding, etc.) are discussed as concerns the effect of acceleration on accurate reading or sensing. There exists a general lack of success in the prior art at handling this problem effectively. In a third section of the aforementioned application, the combined effects of print spread and acceleration are discussed and specific embodiments developed which provide another universal reading technique and apparatus for bar or transition coded exhibiting print spread acceleration distortions in the signal stream resulting from reading such codes.

The technique set forth in my aforementioned copending application generally involves a means and method for first measuring signal transition time spacings and then adjusting a search time to account for the amount of print spread and/or acceleration effects detected in the initial measuring operation, so that transition codes or bar codes, encoded in an improved way, can be accurately interpreted when sensed. Additional means and method are utilized in my prior application for measuring and adjusting the sense operation for acceleration alone or spread alone according to some specially derived prediction algorithms therein set forth. Also, combined algorithms for correcting for both print spread and acceleration are derived therein and are developed and embodied in particular embodiments as discussed therein.

The difference between my prior application and the invention herein lies in the approach taken to encoding and decoding the F2F code format used in both, and in the method of isolating a signal element for study. In my prior application, the "2F" frequency signal transitions, if any occurred, were detected by erecting a search gate of a length predicted according to specific algorithms chosen for specific conditions. If a signal transition was found during the period the "search gate," as that term was used, then a digital 1 was sensed. If no signal occurred during the search gate period, a digital 0 was interpreted. The symbol boundaries, or "1F" signal transitions in the F2F data signal stream were isolated from the "2F" signal transitions by the search gate and were not used except for timing and measurement purposes. The inverse of these encoding and interpreting functions and techniques is utilized in the present invention. The data content of the F2F signal stream is interpreted by isolating and then considering the "1F" transitions, or symbol boundary signals as they are termed in my aforementioned application, instead of by interpreting the presence or absence of "2F" transitions which are blocked instead of detected during the search gate time period as discussed therein.

The algorithms discussed and derived in my noted copending application may be used again as taught herein to isolate the "2F" transitions from the "1F" transitions, but the "1F" transitions are interpreted instead of the "2F" transitions. It will be apparent that what was previously termed a "search gate," which searched for and sensed any "2F" signal transitions at points intermediate the "1F" symbol boundary signal transitions, may now be used herein as an "inhibit gate" to block consideration of the "2F" signal transitions and to isolate the "1F" boundary transitions for consideration.

As will be discussed in detail below, the "inhibit gate" function herein may use the same prediction algorithms as my previously mentioned invention, but in a fashion opposite to that discussed in my previous invention. The reason that the same algorithms may be used is that, by inhibiting the "2F" signals, the "1F" or symbol boundary signals may be isolated for study and interpretation. Atlernatively, new algorithms having different forms as derived herein are used in the preferred embodiments.

Turning then to FIG. 1, a schematic representation of the well-known "F2F" coding technique, as applied to a magnetic medium, for the digital number 1011010 is shown. F2F code is known in the art as an abbreviation for "frequency and two-frequency," or alternatively, "double frequency" coding. In this technique, transitions in the signal stream sensed by an appropriate sensor occur at one frequency or at double that frequency.

The assumption is made for movable scanners, under these ideal conditions, that the sensor moves at a constant velocity relative to the data bearing medium and that the code was written under constant velocity conditions. A digital 1 may be recorded as one signal transition within a given period of time T written as illustrated in the upper line of FIG. 1 and sensed as shown in the bottom line of FIG. 1. A digital 0 may be represented as not transition over a similar time interval T.

For optically printed bar codes, the top line of FIG. 1 may be thought of as a series of single or double width bars with single or double width white spaces between the bars. When scanned by a suitable optical sensing means, such patterns would produce a signal train similar to that shown in the lower line of FIG. 1. Where an electrical signal is produced by a magnetic sensing head sensing a magnetically encoded data record, or by an optical sensing head scanning a series of black and white bars of varying widths, the bottom line of FIG. 1 represents an output signal stream.

It will be observed, in FIG. 1, that a varying signal is produced at the output of a magnetic sensing head when it passes over a suitable magnetized medium bearing a pattern of magnetization for the digital character 1011010 as shown. The magnetization on the particular medium varies between two levels of magnetization as shown. Various equal time intervals T are illustrated as spaced along the upper line of FIG. 1. The well-known F2F code shown here is already used in magnetic stripe credit card reader systems and is written on the credit cards themselves, of course. It is also used in a variety of optical scanning devices, such as shown generally in the aforementioned U.S. Pat. Nos. 3,750,108 and 3,811,033. In the magnetic sense, it will be observed in FIG. 1 that a transition from one level of magnetization to another occurs midway in the interval time T, when viewed from left to right, on the top line of FIG. 1. This is arbitrarily chosen to represent the digital data bit 1 as shown. The succeeding interval time T contains no transition of signal and is thus interpreted as a digital data bit 0. Succeeding time intervals are shown in which transitions either occur or do not occur to generate the codes 11010 following the initial 1 and 0 just discussed.

The top line in FIG. 1 may be alternatively viewed as either a magnetic code pattern on a magnetic media or an optical code pattern, such as a series of black and white bars of varying widths, on a sheet of paper as was previously discussed. The varying signal levels may then be taken either as varying magnetization levels or variable optical reflectivity levels between two general values, high and low.

It is desirable to make a single assumption and suggest that this transitional pattern may also be viewed as an analog electrical signal. Assuming that a suitable sensor of the desired optical or magnetic type is used to scan across the appropriate media, it will produce electrical signals which may be suitably amplified and shaped to produce the typical waveform shown in the bottom line of FIG. 1. The waveform pattern in the bottom line of FIG. 1 corresponds to the transitions in the analog pattern in the top line of FIG. 1. All similar waveform figures will, for simplicity, be omitted in the figures following FIG. 1. But it should be understood that the transitional waveform in the bottom of FIG. 1 contains the data and clocking information which would be utilized in logic embodiments. As will be readily appreciated by those of skill in the art, the production of a suitable waveform involves sensing an analog signal with a sensor, converting it to a digital output in an A to D converter or similar device, suitable amplifying and shaping the waveform, and producing clean square-edged waves, which may be differentiated, etc., to produce the waveform in the bottom line of FIG. 1. The foregoing operations, being well-understood in the various arts of either optical or magnetic sensing, will not be discussed further here. It will be assumed that a suitable sensor will be provided together with the necessary waveform modifying apparatus to produce a clean square-edged waveform and that a suitable sensor scanning a particular encoded media will produce a waveform such as shown in the top and bottom lines of FIG. 1.

F2F coding as just described must, of course, be decoded in order to extract from it the data contents of 1 or 0. This is accomplished, in the classical sense, as shown in U.S. Pat. No. 3,750,108 for example. It involves setting up a gate function which gates the output of the sensor to a using system under certain conditions such that, for example, the presence of a transitional pulse appearing from the scanner during the time in which the search gate is open arbitrarily signifies a binary 1 for example, and the absence of a transitional pulse from the sensor during a search gate time signifies a digital 0. The classic or ideal timing of the required search gate is shown in FIG. 1, in the line of graphical transitions labeled "search gate." It is assumed in FIG. 1 that the relative velocity between the appropriate sensor and the ideally encoded media is constant so that the widths T are all equal.

It will be readily apparent to those of skill in the art that in order to sense the transition which is significant for a binary 1, which occurs exactly midway in a time interval T, it is desirable to set up a "search gate" to run from the instant a time interval T begins to a point exactly equal to ¾ the time interval T, where the search gate is ended. If a transition is detected, it will unambiguously denote a binary 1, whereas if no transition is detected, an unambiguous binary 0 will be the information content described.

Given the assumption that T is the intended width of each of the character symbol periods, whether they contain a binary 1 or a binary 0, the normal length of the search gate to accurately detect the transition significant of a 1, without inadvertently picking up the transition at the boundaries of a symbol time period T, is equal to ¾ of a symbol time period T. The search gate of the prior art is started at the beginning of each symbol time T and is terminated when ¾ of the previous symbol length is reached. A mechanism for providing this result is shown, for example, in U.S. Pat. No. 3,750,108, where specific timing circuitry to create the ¾ T search gate period is explained. The object of the search gate is to permit the response signals in the top line, which originate from the binary 1 intermediate symbol transitions, to be detected without confusion with the response signal resulting from the symbol boundary transitions occurring at either end of each symbol.

The object of an "inhibit gate," as used in the present invention, on the other hand, is to block the intermediate signals from being detected and to permit the response signals resulting from the symbol boundary transitions to be detected instead. The proper time for terminating an inhibit gate is equal to that for terminating a search gate, the period thereof being measured from a symbol boundary just passed. The actual start of an inhibit gate function would be slightly after a symbol boundary signal transition, for example, at $\frac{1}{8}T_{n-1}$, where $T_{n-1}$ is the width of the last symbol. This will be made clear when FIG. 3 is discussed below. The boundary transitions correspond to the so-called "single frequency" signals.

Having thus discussed the general field to which the invention relates and the basic prior art of F2F coded bar, optical, or magnetic symbols, the discussion will now turn to the problem which exists when optical bar codes are printed on ordinary media using ink, for example.

When optical bar codes are printed in the F2F code format as discussed above, a phenomenon known as "print spread" takes place. Print spread may be defined as the widening of the ink pattern due to spreading and diffusion of the ink into the paper medium. The resulting printed black bars become wider than originally intended when they were printed. The situation compounds itself in complexity since the widening of adjacent black bars narrows the intervening white bars or spaces on an optical printed media. In the magnetic equivalent of this phenomenon, assuming that a magnetic media is "written" with alternating magnetization areas, the effect of spread as it is known in the optical printing art can also exist, one form of which is known as "intersymbol interference" to those in the art.

Figure 2A:
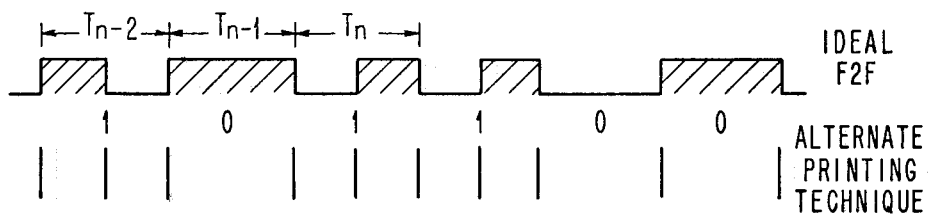
FIG. 2A illustrates an ideal F2F code pattern and an alternate printing technique where only the edges or transition points are printed.
Figure 2B:
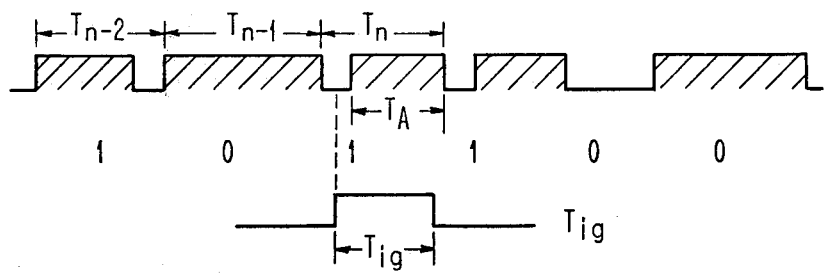
FIG. 2B illustrates the ideal pattern of FIG. 2A as distorted by spread and illustrates an inhibit gate period for blocking the 2F signal transitions.

Turning to FIG. 2A, an example of a binary code written in F2F format for the character 101100 is shown for an ideal F2F code not having any print spread. FIG. 2B, shown directly below FIG. 2A, illustrates the situation for the same code in which positive print spread, or widening of the printed bars, has taken place. In FIG. 2B, the widths of the black bars, shown by the cross hatched areas in FIGS. 2A and 2B, are increased by some arbitrary and uncontrolled amount due to the flow of ink. FIG. 2B thus illustrates a positively spread F2F code pattern. It also represents the un-differentiated signal train which would be produced from a primary sensor of the optical or magnetic type reading the appropriate coded media. The inhibit gate termination time, or length $T_{ig}$ which would be predicted for a given symbol time $T_n$, may be determined by the use of new algorithms chosen from Tables 1A and 1B below, where $T_{n-1}$ is the width of the previous symbol, $T_{n-2}$ is the width of the next previous symbol, $\alpha$ is a variable term which is chosen at some particular value as will be discussed, and $K_p$ is a spread factor as discussed and derived in my copending application Ser. No. 522,210.

TABLE 1A

F2F SYMBOL BOUNDARY POSITION SEARCH WINDOW

| $T_{n-1}$ | $T_{n-2}$ | $T_{n-1}$ Conditions "0" | Comp. $K_p$ | Constant Velocity No Spread $\Delta = 2\alpha T_{n-1}$ | Acceleration No Spread $\Delta = 2\alpha T_{n-1} (\frac{T_{n-1}}{T_{n-2}})$ |
|---|---|---|---|---|---|
| "0" | "0" | Even | Pos. | $T_{n-1}(1 \pm \alpha)$ | $T_{n-1} (\frac{T_{n-1}}{T_{n-2}}) (1 \pm \alpha)$ |
| "0" | "0" | Odd | Neg. | | |
| "0" | "0" | Odd | Pos. | $T_{n-1}(1 \pm \alpha)$ | $T_{n-1} (\frac{T_{n-1}}{T_{n-2}}) (1 \pm \alpha)$ |
| "0" | "0" | Even | Neg. | | |
| "1" | "0" | Forced Even | Neg. | $T_{n-1}(1 \pm 60)$ | $T_{n-1} (\frac{T_{n-1}}{T_{n-2}}) (1 \pm \alpha)$ |
| "1" | "0" | | | | |
| "1" | "0" | Forced Even | Pos. | $T_{n-1}(1 \pm \alpha)$ | $T_{n-1} (\frac{T_{n-1}}{T_{n-2}}) (1 \pm \alpha)$ |
| "1" | "0" | | | | |
| "0" | "1" | Odd | Pos. | $T_{n-1}(1 \pm \alpha)$ | $T_{n-1} (\frac{T_{n-1}}{T_{n-2}}) (1 \pm \alpha)$ |
| "0" | "1" | Odd | Neg. | $T_{n-1}(1 \pm \alpha)$ | $T_{n-1} (\frac{T_{n-1}}{T_{n-2}}) (1 \pm \alpha)$ |
| "1" | "1" | Forced Even | Pos. | $T_{n-1}(1 \pm \alpha)$ | $T_{n-1} (\frac{T_{n-1}}{T_{n-2}}) (1 \pm \alpha)$ |
| "1" | "1" | Forced | Neg. | $T_{n-1}(1 \pm \alpha)$ | $T_{n-1} (\frac{T_{n-1}}{T_{n-2}}) (1 \pm \alpha)$ |

TABLE 1A-continued

F2F SYMBOL BOUNDARY POSITION SEARCH WINDOW

| $T_{n-1}$ | $T_{n-2}$ | $T_{n-1}$ | Conditions "0" | Comp. $K_p$ | Constant Velocity No Spread | Acceleration No Spread |
|---|---|---|---|---|---|---|
| | | | | | $\Delta = 2\alpha T_{n-1}$ | $\Delta = 2\alpha T_{n-1} \left(\frac{T_{n-1}}{T_{n-2}}\right)$ |
| | | Even | | | | |

(For leading edge of symbol boundary search window, use $-\alpha$; for trailing edge of search window, use $+\alpha$; for symbol boundary use $\alpha=0$.)

Where: $\frac{K_p}{4} \leq \alpha \leq \frac{1}{2} - K_p/4$ and $0 \leq K_p \leq 1.0$ $\Delta$ = the search window width or the difference between leading and trailing edges

TABLE 1B

| $T_{n-1}$ | $T_{n-2}$ | Conditions $T_{n-1}$ "0" | Comp. $K_p$ | Constant Velocity | $\Delta$ With Spread |
|---|---|---|---|---|---|
| "0" | "0" | Even | Pos. | $T_{n-1} \left[\frac{2(1\pm\alpha)+ \frac{|K_p|}{2}}{2-|K_p|}\right]$ and | $\Delta = 2\alpha \left(\frac{2T_{n-1}}{2-|K_p|}\right)$ |
| "0" | "0" | Odd | Neg. | | |
| "0" | "0" | Odd | Pos. | $T_{n-1} \left[\frac{2(1\pm\alpha)- \frac{|K_p|}{2}}{2+|K_p|}\right]$ and | $\Delta = 2\alpha \left(\frac{2T_{n-1}}{2+|K_p|}\right)$ |
| "0" | "0" | Even | Neg. | | |
| "1" | "1" | Forced Neg. | | $T_{n-1} \left[(1\pm\alpha) - \frac{|K_p|}{4}\right]$ and | $\Delta = 2\alpha T_{n-1}$ |
| "1" | "0" | Even | | | |
| "1" | "0" | Forced Pos. | | $T_{n-1} \left[(1\pm\alpha) + \frac{|K_p|}{4}\right]$ and | $\Delta = 2\alpha T_{n-1}$ |
| "1" | "0" | Even | | | |
| "0" | "1" | Odd | Pos. | $T_{n-1} \left[\frac{2(1\pm\alpha)- \frac{|K_p|}{2}}{2+|K_p|}\right]$ and | $\Delta = 2\alpha \left(\frac{2T_{n-1}}{2+|K_p|}\right)$ |
| "0" | "1" | Odd | Neg. | $T_{n-1} \left[\frac{2(1\pm\alpha)+ \frac{|K_p|}{2}}{2-|K_p|}\right]$ and | $\Delta = 2\alpha \left(\frac{2T_{n-1}}{2-|K_p|}\right)$ |
| "1" | "1" | Forced Even | Pos. | $T_{n-1} \left[(1\pm\alpha)+ \frac{|K_p|}{4}\right]$ and | $\Delta = 2\alpha T_{n-1}$ |
| "1" | "1" | Forced Even | Neg. | $T_{n-1} \left[(1\pm\alpha)- \frac{|K_p|}{4}\right]$ and | $\Delta = 2\alpha T_{n-1}$ |
| "0" | "0" | Even | Pos. | $T_{n-1} \left(\frac{T_{n-1}}{T_{n-2}}\right) \frac{2+|K_p|}{2-|K_p|} \left[2(1\pm\alpha)+ \frac{|K_p|}{2}\right]$ and $\Delta=4\alpha T_{n-1}$ | $\left(\frac{T_{n-1}}{T_{n-2}}\right) \frac{2+|K_p|}{2-|K_p|}{}^2$ |
| "0" | "0" | Odd | Neg. | | |
| "0" | "0" | Odd | Pos. | $T_{n-1} \left(\frac{T_{n-1}}{T_{n-2}}\right) \frac{2-|K_p|}{2+|K_p|} \left[2(1\pm\alpha)- \frac{|K_p|}{2}\right]$ and $\Delta=4\alpha T_{n-1}$ | $\left(\frac{T_{n-1}}{T_{n-2}}\right) \frac{2-|K_p|}{(2+|K_p|)^2}$ |
| "0" | "0" | Even | Neg. | | |
| "1" | "0" | Forced Neg. | | $T_{n-1} \left(\frac{T_{n-1}}{T_{n-2}}\right) \left[1- \frac{|K_p|}{2}\right] \left[(1\pm\alpha)- \frac{|K_p|}{4}\right]$ and $\Delta = 2\alpha T_{n-1}$ | $\left(\frac{T_{n-1}}{T_{n-2}}\right) 1- \frac{|K_p|}{2}$ |
| "1" | "0" | Even | | | |
| "1" | "0" | Forced Pos. | | $T_{n-1} \left(\frac{T_{n-1}}{T_{n-2}}\right) 1+ \frac{|K_p|}{2} \left[(1\pm\alpha)+ \frac{|K_p|}{4}\right]$ and $\Delta=2\alpha T_{n-1}$ | $\left(\frac{T_{n-1}}{T_{n-2}}\right) 1+ \frac{|K_p|}{2}$ |
| "1" | "0" | Even | | | |
| "0" | "1" | Odd | Pos. | $T_{n-1} \left(\frac{T_{n-1}}{T_{n-2}}\right) \left[\frac{4(1\pm\alpha)- |K_p|}{2+|K_p|}{}^2\right]$ and $\Delta=8\alpha T_{n-1}$ | $\left(\frac{T_{n-1}}{T_{n-2}}\right) \frac{1}{(2+|K_p|)^2}$ |
| "0" | "1" | Odd | Neg. | $T_{n-1} \left(\frac{T_{n-1}}{T_{n-2}}\right) \left[\frac{4(1\pm\alpha)+ |K_p|}{(2-|K_p|)^2}\right]$ and $\Delta=8\alpha T_{n-1}$ | $\left(\frac{T_{n-1}}{T_{n-2}}\right) \frac{1}{(2-|K_p|)^2}$ |
| "1" | "1" | Forced Even | Pos. | $T_{n-1} \left(\frac{T_{n-1}}{T_{n-2}}\right) \left[(1\pm\alpha)+ \frac{|K_p|}{4}\right]$ and $\Delta=2\alpha T_{n-1}$ | $\left(\frac{T_{n-1}}{T_{n-2}}\right)$ |
| "1" | "1" | Forced Even | Neg. | $T_{n-1} \left(\frac{T_{n-1}}{T_{n-2}}\right) \left[(1\pm\alpha)- \frac{|K_p|}{4}\right]$ and $\Delta=2\alpha T_{n-1}$ | $\left(\frac{T_{n-1}}{T_{n-2}}\right)$ |

The conditions for choosing the proper algorithm are the same as those developed in my copending application for the factors in Tables 1–5 thereof, and are as shown therein. Their meaning will be discussed below.

Equation (1) given below, is the basic statement for terminating an inhibit gate where spread exists in the encoded F2F character chain. Equation (1) was developed in my copending application for use in terminating a search gate, but may be used here as noted above. As the derivation is lengthy, it will not be repeated here.

$$T_{to} = \gamma \left(\frac{T_{n-2}+T_{n-1}}{2}\right) \quad (1)$$

The spread coefficient is defined as $\gamma$ and it may be determined on a symbol-by-symbol basis. This allows the spread factor $\gamma$ to vary monotonically within a printed character (consisting of multiple bits) and from character to character, as will appear below. In order to determine γ initially and to set up inhibit gates properly thereafter, the present invention provides, in addition to the coded data to be interpreted, at least one preamble symbol or bit recorded with the data at the time the original data is laid down on the media. The preamble bit, which is a particular type of digital 1, provides information to the using system which is used to determine the spread coefficient for a new printed character. It appears in this invention with each multi-bit printed or magnetically encoded or with any other F2F character signal, such as those from a communications channel, for example.

An inhibit gate function would be deleted while the sensing of a preamble bit is conducted. The inhibit gate interval for the first bit of data following the preamble symbol, regardless of whether the bit is a 1 or a 0, may be established by determining the spread coefficient γ for that character from its preamble symbol. Monotonic changes in the spread throughout the character can be corrected for by the continued use of the spread algorithm as the character scanning operation proceeds. As was fully developed in my copending application, different spread effects exist for various time intervals $T_{n-2}$, $T_{n-1}$, etc., depending on their binary 0 or 1 contents.

It is particularly desirable to provide a means to increase the tolerance to acceleration effects in F2F is significant to note that the symbol width of a binary 1 is constant and is independent of spread. However, the symbol width of binary 0's is altered by the spread so that they may be wider or narrower than the ideal. The consistency of the binary 1 symbol width, which is independent of spread, leads to its choice as a preamble bit to be associated with a stand alone multi-bit character. As alluded to previously, it is desirable to include with each encoded character a preamble bit from which a degree of print spread can be measured and computed for correcting for print spread; and it is also desirable to have a series of symbol boundary transition signals which can be measured in evaluating the degree of acceleration which is being experienced. Two binary 1 preamble bits serve this purpose as discussed fully in my copending application Ser. No. 522,210.

For the data bits which follow the preamble bit, or bits, regardless of whether the data bits are 1's or 0's, the inhibit gate length is predicted by using one of two algorithms listed in Table 1 of my copending application for the case $T_{n-1}=1$ and $T_{n-2}=1$. The choice of the appropriate algorithm from Table 1, given the preceding conditions for $T_{n-1}$, will become apparent in the discussion which follows. Given positive spread, $2T_A$ will be greater than $T_{n-1}$ and the inverse is true for negative spread. This is explained in detail in my copending application and will not be repeated here.

In Table 1 of my copending application, a reproduction of which follows, there are five columns.

TABLE 1

| $T_{n-1}$ | $T_{n-2}$ | Condition | First Order Solution | Second Order Solution | |
|---|---|---|---|---|---|
| "0" | "0" | $T_{n-1}<T_{n-2}$ | $T_{sg} = \dfrac{(3+K_p)}{2(2-K_p)}(T_{n-1})$ | $T_{sg} = \dfrac{(3+K_p)(2+K_p)}{2(2-K_p)hu\ 2}(T_{n-1})$ | $(\dfrac{T_{n-1}}{T_{n-2}})$ |
| "0" | "0" | $T_{n-1}>T_{n-2}$ | $T_{sg} = \dfrac{(3-2K_p)}{2(2+K_p)}(T_{n-1})$ | $T_{sg} = \dfrac{(3-2K_p)(2-K_p)}{2(2+K_p)^2}(T_{n-1})$ | $(\dfrac{T_{n-1}}{T_{n-2}})$ |
| "0" | "1" | $T_{n-1}<T_{n-2}$ | $T_{sg} = \dfrac{(3+K_p)}{2(2-K_p)}(T_{n-1})$ | $T_{sg} = \dfrac{(3+K_p)}{(2-K_p)^2}(T_{n-1})$ | $(\dfrac{T_{n-1}}{T_{n-2}})$ |
| "0" | "1" | $T_{n-1}>T_{n-2}$ | $T_{sg} = \dfrac{(3-2K_p)}{2(2+K_p)}(T_{n-1})$ | $T_{sg} = \dfrac{(3-2K_p)}{(2+K_p)^2}(T_{n-1})$ | $(\dfrac{T_{n-1}}{T_{n-2}})$ |
| "1" | "0" | $T_{n-1}<T_{n-2}$ | $T_{sg} = \dfrac{(3-2K_p)}{4}(T_{n-1})$ | $T_{sg} = \dfrac{(3-2K_p)(2+K_p)}{8}(T_{n-1})$ | $(\dfrac{T_{n-1}}{T_{n-2}})$ |
| "1" | "0" | $T_{n-1}>T_{n-2}$ | $T_{sg} = \dfrac{(3+K_p)}{4}(T_{n-1}$ | $T_{sg} = \dfrac{(3+K_p)(2-K_p)}{8}(T_{n-1})$ | $(\dfrac{T_{n-1}}{T_{n-2}})$ |
| "1" | "1" | $T_{n-1}<2T_A$ | $T_{sg} = \dfrac{(3+K_p)}{4}(T_{n-1})$ | $T_{sg} = \dfrac{(3+K_p)}{4}(T_{n-1})$ | $(\dfrac{T_{n-1}}{T_{n-2}})$ |
| "1" | "1" | $T_{n-1}>2T_A$ | $T_{sg} = \dfrac{(3-2K_p)}{4}(T_{n-1})$ | $T_{sg} = \dfrac{(3-2K_p)}{4}(T_{n-1})$ | $(\dfrac{T_{n-1}}{T_{n-2}})$ |

To convert the above algorithms to the general form, substitute 4C for the numeral 3 wherever it occurs.

decoding systems. The algorithms summarized in Table 2 of my copending application and their derivations which were explained previously in that application, provide an accurate means of accommodating velocity changes which will accurately predict the termination of a search gate, even under high acceleration conditions.

Having discussed the related problems of compensating for print spread and for acceleration effects, it is apparent that a truly versatile system must be able to simultaneously compensate for both acceleration and for print spread effects. The following discussion will describe such a system in some detail, giving specific embodiments and certain improvements in the embodiments which form the basis of several truly universally functional F2F code reading techniques and apparatus.

Returning momentarily to FIGS. 2A and 2B, it will be observed that when the symbol bars are uniformly spread in width as a result of printing F2F characters. It The first two columns define the binary content found to exist in the data symbols identified as $T_{n-1}$ and $T_{n-2}$. These are the two symbols which precede the symbol in question which is to be sensed and interpreted. The third column of Table 1 defines control conditions. The third column relates to the width of $T_{n-2}$ symbol being greater or less than that of $T_{n-1}$, as defined in detail in my copending application. The fourth column lists the first order solution algorithm for spread conditions alone for ending a search gate. The fourth column thus gives an algorithm which may be used to end an inhibit gate to account for print spread alone. The last column lists the algorithm which is used to terminate an inhibit gate to account for print spread and acceleration.

As stated earlier, any of the algorithms in Tables 1–5 of my copending application Ser. No. 522,210 may be used to yield predictions for terminating an inhibit gate. As will appear below, however, preferred algorithms in an equivalent but more easily utilized form as shown in Tables 1A and 1B herein are used in the preferred embodiments. The selection criteria for choosing algorithms for Tables 1–5 of my copending application may also be used herein for the algorithms of Tables 1A and 1B.

The equivalence of the equations given in Table 5 (which are the same as those in Table 1 but having different selection criteria) of copending application Ser. No. 522,210 with equations given in Table 1B herein is illustrated below.

Consider the conditions:
$T_{n-1} = 0$
$T_{n-2} = 0$
$T_{n-1} = $ Even 0
$K_p = $ Positive The equation given in Table 1B reads:

$$T_{sp1} = T_{n-1} \quad (\frac{T_{n-1}}{T_{n-2}}) \frac{2+K_p}{(2-K_p)^2} [2(1-\alpha) + \frac{K_p}{2}] \quad \text{Eq. (a)}$$

The equation given in Table 1 or 5 of my copending application for the same selection conditions reads:

$$T_{sp1} = T_{n-1} \quad (\frac{T_{n-1}}{T_{n-2}}) \frac{2+K_p}{(2-K_p)^2} [\frac{3+K_p}{2}] \quad \text{Eq. (b)}$$

Notice that the coefficient $$T_{n-1} \quad (\frac{T_{n-1}}{T_{n-2}}) \frac{2+K_p}{(2-K_p)^2}$$

is identical in both representations. To prove total identity of the expressions, it is only necessary to show that Eq. (c) is true.

$$2(1-\alpha) + \frac{K_p}{2} = \frac{3+K_p}{2} \quad \text{Eq. (c)}$$

Setting $\alpha = \frac{1}{4}$ (a preferred nominal value) in Eq. (c) gives:

$$2(1\frac{1}{4}) + \frac{K_p}{2} = 2(\frac{3}{4}) + \frac{K_p}{2} = \frac{3+K_p}{2} \quad \text{Eq. (d)}$$

This result is identical to the right side of Eq. (c). This analysis demonstrates that the algorithm for the conditions given above corresponding to Tables 1 and 5 of my copending application are mathematically identical to the algorithms given in Table 1B of this application for the same algorithm selection conditions.

Equality for each of the algorithms can be demonstrated by proceeding in the fashion described above, however, this proof is not given here for the sake of simplicity.

A specific embodiment of an electronic logic circuit constructed to receive the transition signals from an appropriate magnetic or optical sensor, or from a data transmission channel, assuming those signals have been properly amplified and freed from noise, will now be described together with a flow chart describing the operation of the logic circuit.

As will be apparent to those skilled in the art, the algorithms listed in Tables 1A and 1B, or in Tables 1–5 of my copending application, require the use of some mathematical computation for the division and multiplication functions, as well as for the addition and subtraction. It might be presumed that a general purpose computer, appropriately programmed to carry out these functions, would be suitable to perform these operations. However, in the preferred embodiments, this is not the case since the use of an expensive general purpose computer, dedicated to the task of calculating the various products and quotients, sums, etc., for the algorithms, would be too expensive and cumbersome for use in an economical F2F code reader and processor. Therefore, the preferred embodiments rely upon integrated circuits with standard logic components for carrying out these functions. In light of the now current technology and low cost of even so complicated a circuit pattern as will be discussed, it is more advantageous to build actual logic circuits to carry out the mathematical operations. However, the method involved in solving the algorithms and in applying the results is exactly the same and is fully equivalent, whether the results are computed on a general purpose computer or whether the results occur from the logic manipulations of the arithmetic logic circuits to be discussed.

As was discussed previously, it is desirable to use at least one preamble symbol containing a binary 1 bit preceding each F2F coded message so that the initial data as to spread may be calculated before the actual reading of data is commenced. One or two preamble bits may be used as will be discussed, and the advantage of using two preamble bits is that acceleration calculations and corrections may be accomplished before actually reading the first bit of data, instead of waiting and using the first bit of data in addition to the preamble bit (as was first discussed in my copending application) for calculating acceleration when only a single preamble bit is used.

Turning to FIG. 3, a timing diagram illustrating the sequence of events required in the present invention to decode an F2F (or double frequency transition code) using a bipolar sensor and a single preamble bit preceding each coded message. FIG. 4 is similar to FIG. 3, except that two preamble bits are used to precede the data. FIG. 5 is a system functional flow chart which applies to the timing diagrams of FIGS. 3 and 4. FIG. 6 is a logic diagram in schematic form which shows the circuit embodiments for several F2F code scanner and processing systems which may be configured for first or second order prediction functions and which are operative with two preamble bits and, if desired one preamble bit and a data bit, to define and decode F2F characters in correct form with acceleration and spread corrections.

Figure 7:
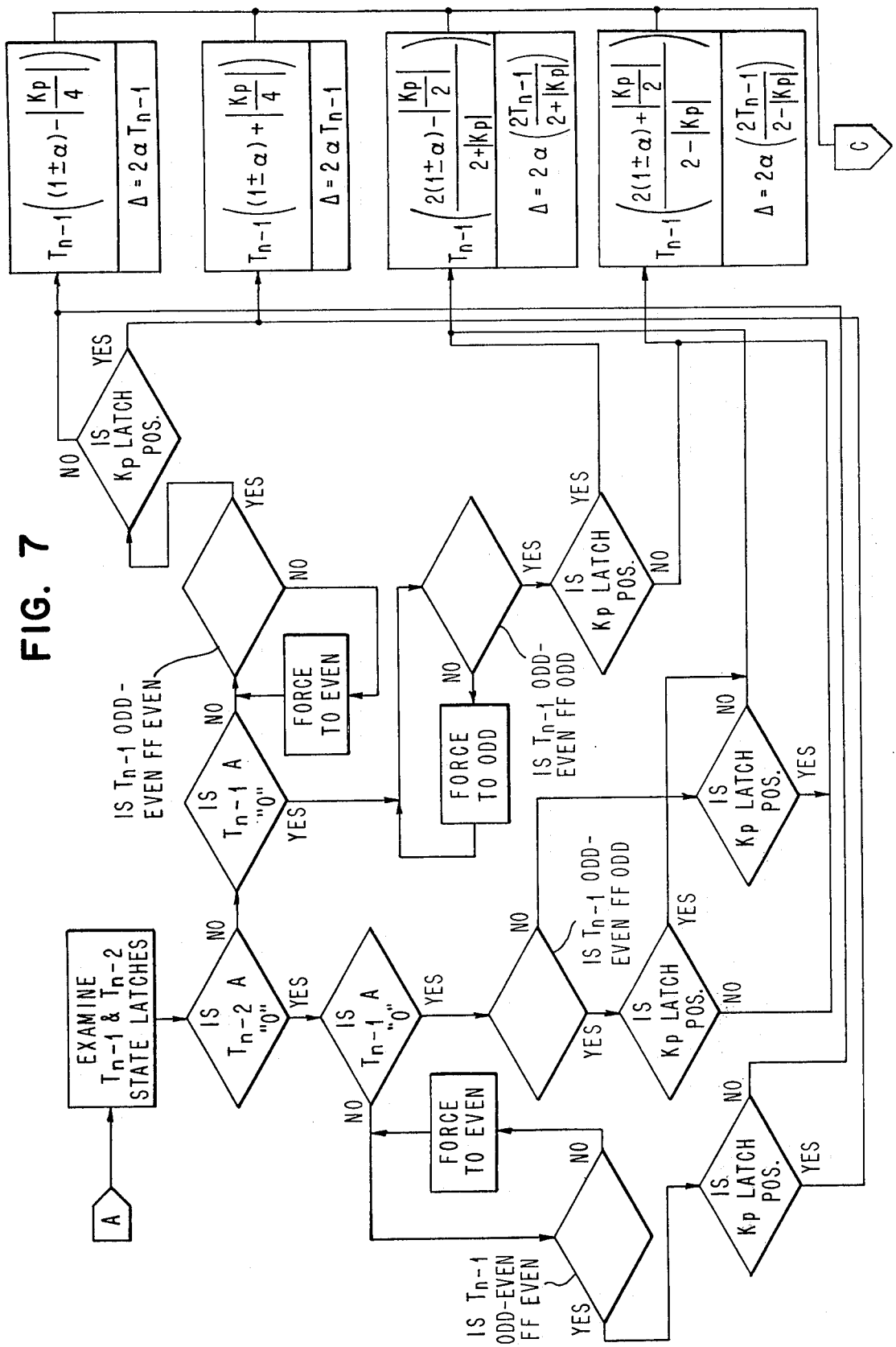
FIG. 7 illustrates in more detail an algorithm selector for use in FIG. 5 and is for spread corrections only.

FIG. 7 is a detailed logic diagram for the algorithm selector control logic block which is indicated in FIG. 6. Functional logic configurations for all of the decode algorithms of Tables 1–5 required to implement both the first and the second order system configurations illustrated in FIG. 6 are shown in detail in my previous application noted above. Logic configurations for the algorithms of Tables 1A and 1B are given herein. A discussion of the timing diagrams of FIGS. 3 and 4 will now be given.

Referring to FIG. 3, there are fifteen horizontal waveform diagrams which illustrate various distinct timing functions to be described. The top line illustrates double frequency or F2F symbols for a character 00110 which is preceded by a single preamble bit consisting of a binary 1. This bit must be provided in order to give a print spread compensation measurement prior to the initial data bit. The form of the binary 1 preamble bit must be the type which begins with a printed black bar (or similar transition producer) in the first time slot. This is discussed in detail in my aforementioned application as a "Phase A" one.

Line 2 illustrates a series of bidirectional pulses obtained from either an optical or a magnetic sensing means which would scan the code bearing medium, or from another source, such as a communications channel. The peaks of the sensor pulses in line 2 correspond very closely in time to the state transitions of the F2F code in line 1.

Line 3 illustrates the logic data gate activated to the up level by the sensor pulse which corresponds to the end of the first inhibit gate in line 6. This gate would be set by the system to stay open for a sufficient length of time, or a sufficient number of pulses, to receive a number of coded bits according to a prescribed character format.

Line 4 is labeled "reference pulse gate." The function of this logic signal, new in the present invention, is to allow the passage of the first data symbol boundary sensor output signal to a register as a reference for comparing later signals. In effect, the reference pulse gate sets a polarity latch for future comparison. Specifically, the reference pulse gate admits the ending transition signal of the binary 1 preamble bit which precedes the data.

The details of the system which will be discussed allow the positioning of an inhibit gate at proper times to account for changes in scan velocity due to acceleration of the sensor (or due to distortion of the F2F code, as written, as the result of the recording mechanism), and/or for print spread.

Line 5 illustrates the search gate timing of my previous application Ser. No. 522,210 and is shown for comparison with line 6.

Line 6 illustrates the inhibit gate utilized to block all double frequency signals from being sent to the data shift register. The inhibit gate signals correspond, in termination time, to the trailing edges of the search gate times in line 5 and are begun at some arbitrary time following the reference pulse gate or symbol boundary transitions.

Line 7 is a reference pulse which is admitted by the reference pulse gate in line 4. The polarity of this pulse is important in the present invention for decoding the content of uninhibited pulses which follow it.

Line 8 shows the uninhibited sensor pulses which would be produced by the sensor output line 2. These pulses are admitted by the absence of the inhibit gate and correspond to the symbol boundary transitions in line 2.

Lines 9 and 10 are the data signals sent to the data register as the result of a polarity comparison decoding process, believed to be new to the present invention.

As shown in lines 9 and 10, a pulse appears on the 1 data line if the signal pulse sensed is of the same polarity as the previous pulse. A pulse appears on the 0 data line if the signal pulse sensed is of the opposite polarity to the previous pulse. This is the essence of the new encoding/decoding scheme of the present invention. The reference pulse of line 6 is the first pulse used for this comparison (for the first data bit) and then the first data bit is used as a reference for the second data bit, and so on.

Line 11 illustrates shift pulses for the data register which pulses are derived from the leading edges of the inhibit gate signals.

Line 12 is the n-pulse count delay for counting of $n$ pulses of data equal to $n$ bits in a given code character format. The termination of the $n$ count delay resets the entire system.

Line 13 is the system reset signal activated by a count of $n$ being reached in line 12.

Line 14 is a fixed delay gate initiated by the first data signal transition. If $n$ data signals are not received within a specified time, the system is reset by this signal and an error or re-scan indication is given.

Line 15 is the reset signal derived from the trailing edge of the delay gate of line 14.

FIG. 4 is similar to FIG. 3 except that there are two preamble bits utilized. The use of two preamble bits illustrates an embodiment for which second order (acceleration prediction) corrections can be made for the initial and all succeeding data bits. Since no prediction function is required while sensing preamble bits, (it is already known to the system that two preamble bits consisting of 1's must be read, which means that five pulses must be sensed prior to receiving data) time registers $T_{n-1}$ and $T_{n-2}$ can be filled with measured time interval data. This produces a self-clocking system with accurate spread, and velocity data prior to reading the coded message. The use of a single preamble bit can be accommodated as taught in my copending application Ser. No. 522,210, and used to create a second order prediction; however the acceleration data must be obtained from time interval measurements derived from the first data bit of a coded mssage together with the preamble bit, and this is a slightly less desirable method than the use of two preamble bits.

Turning to FIG. 5, a system functional flow chart, which is applicable to the timing diagram of FIG. 4, is illustrated. In FIG. 5, incoming pulse signals from a from a primary sensor and amplifier, or other source such as a communications channel, not a part of this invention, are applied to the input of the reading system with the following logic and control functions and sequences.

Figure 5B:
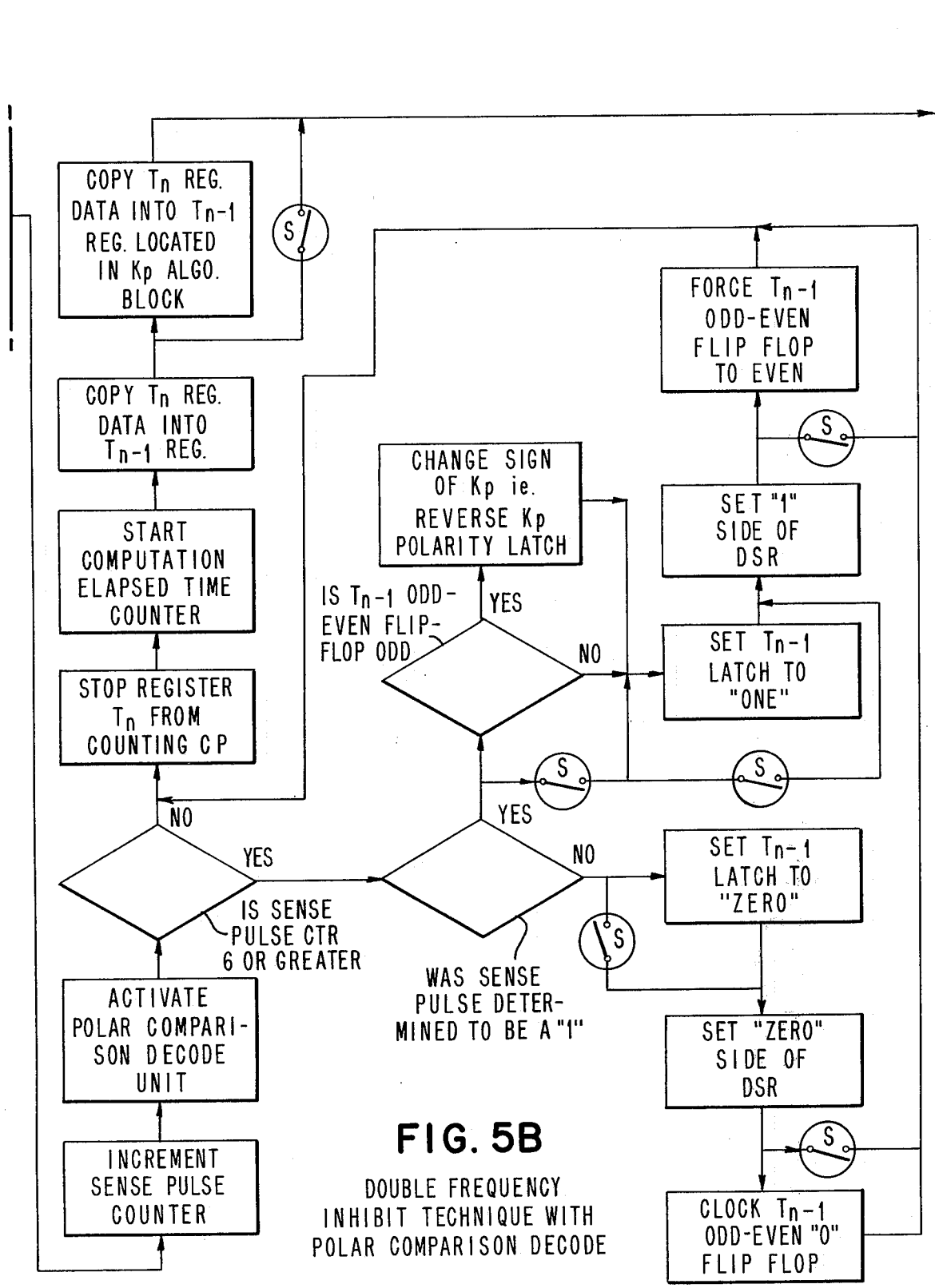
FIG. 5 illustrates a schematic flow chart of a preferred embodiment of the invention.
Figure 5C:
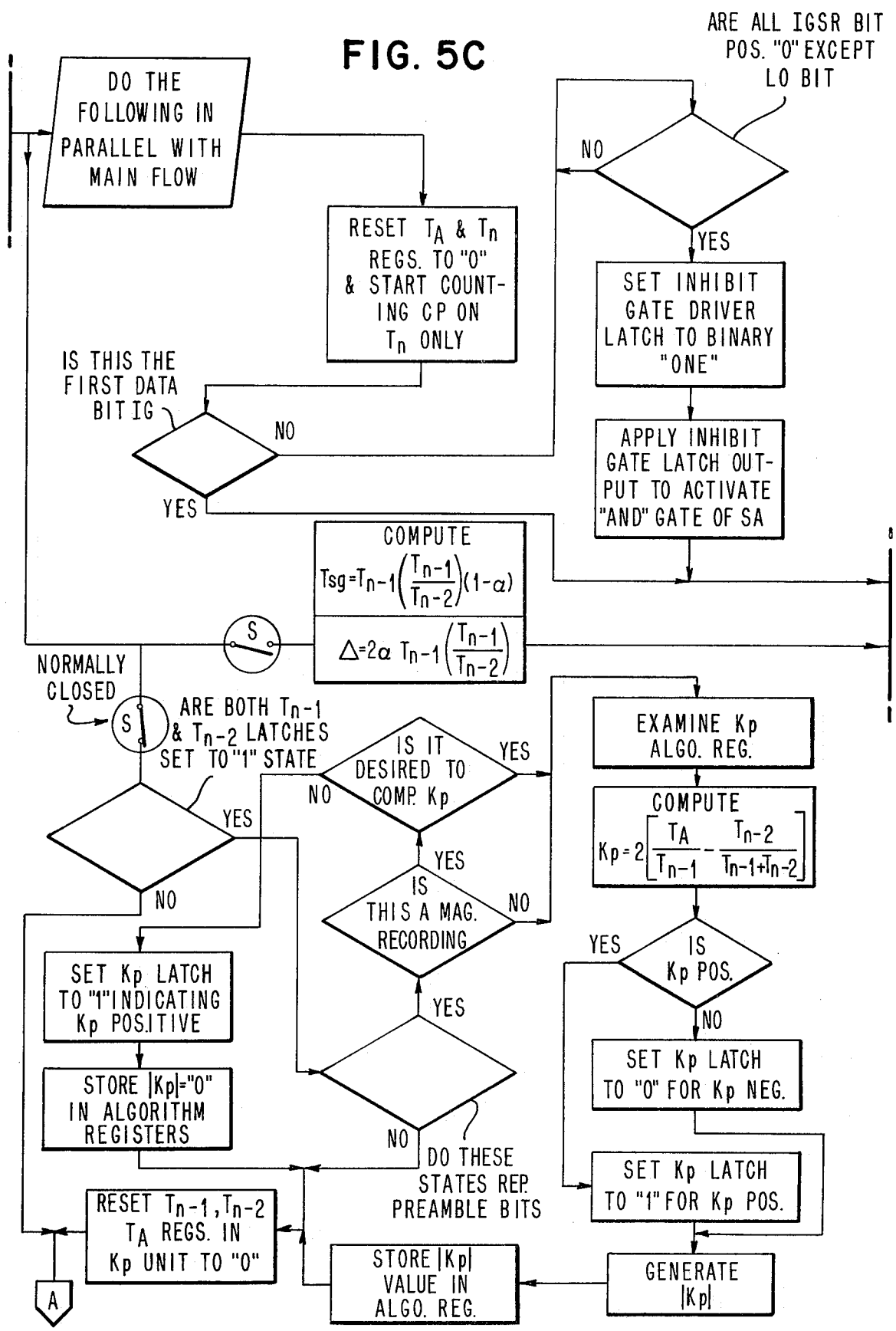
Figure 5D:
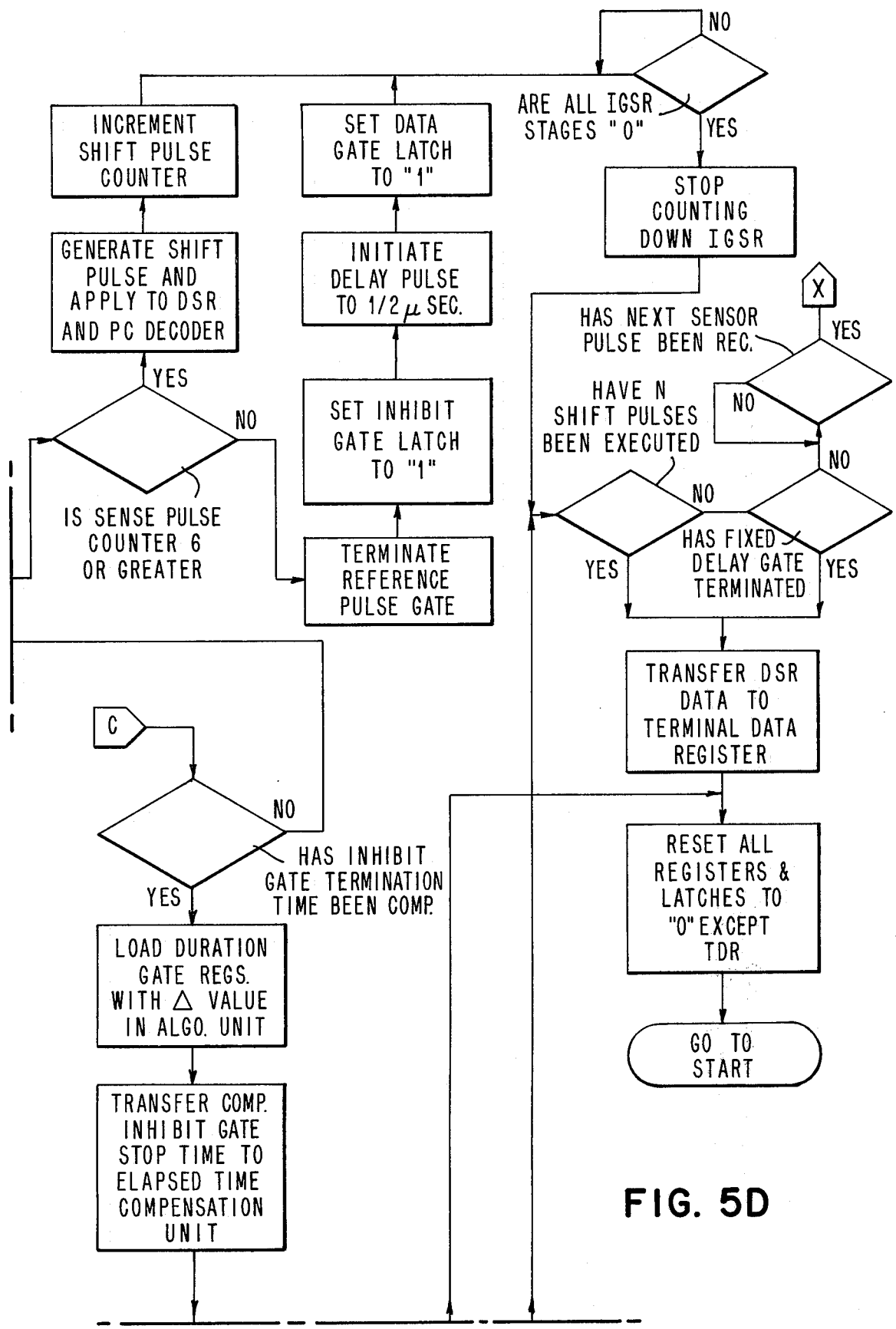
Figure 5E:
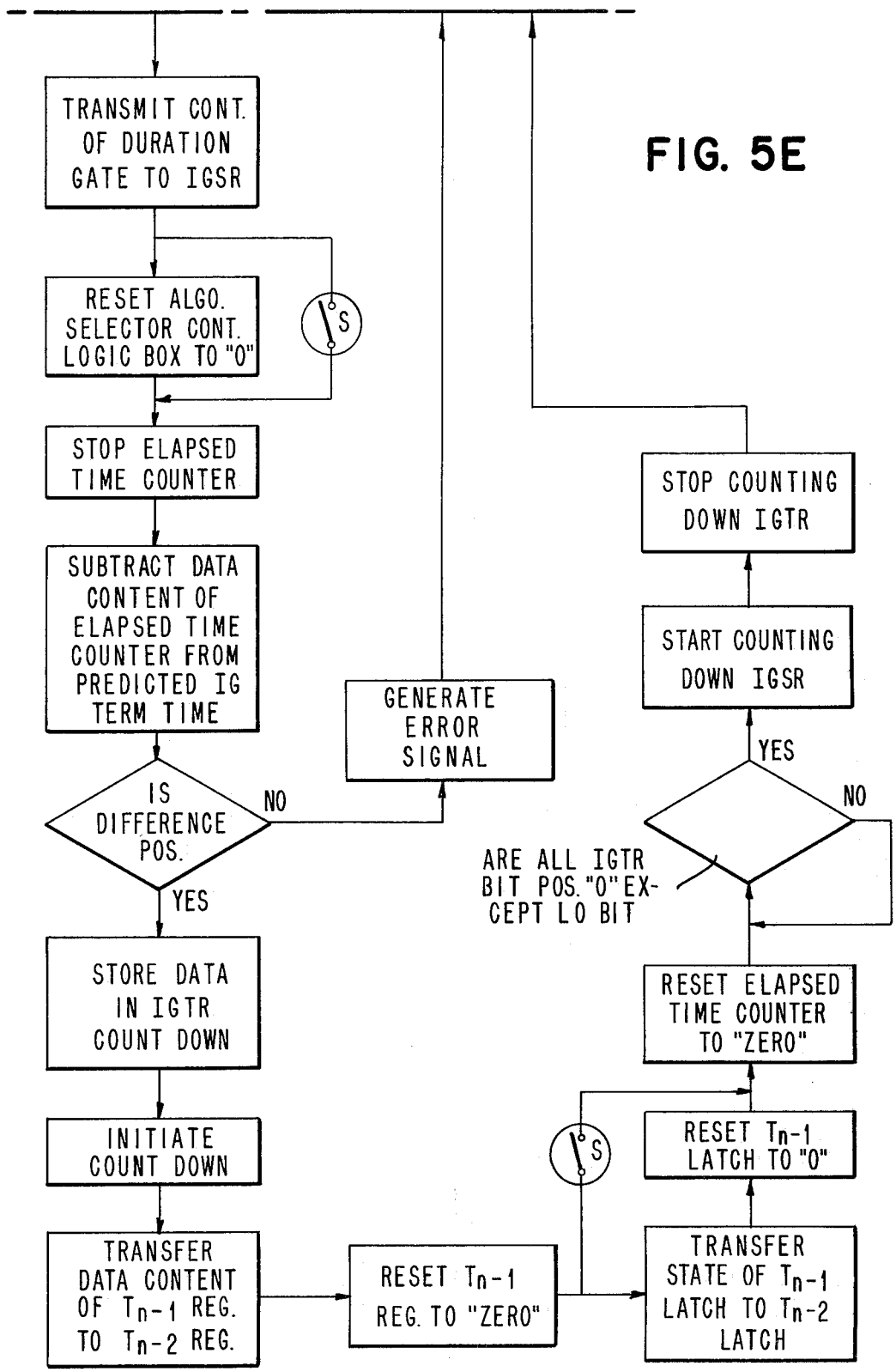
Figure 6B:
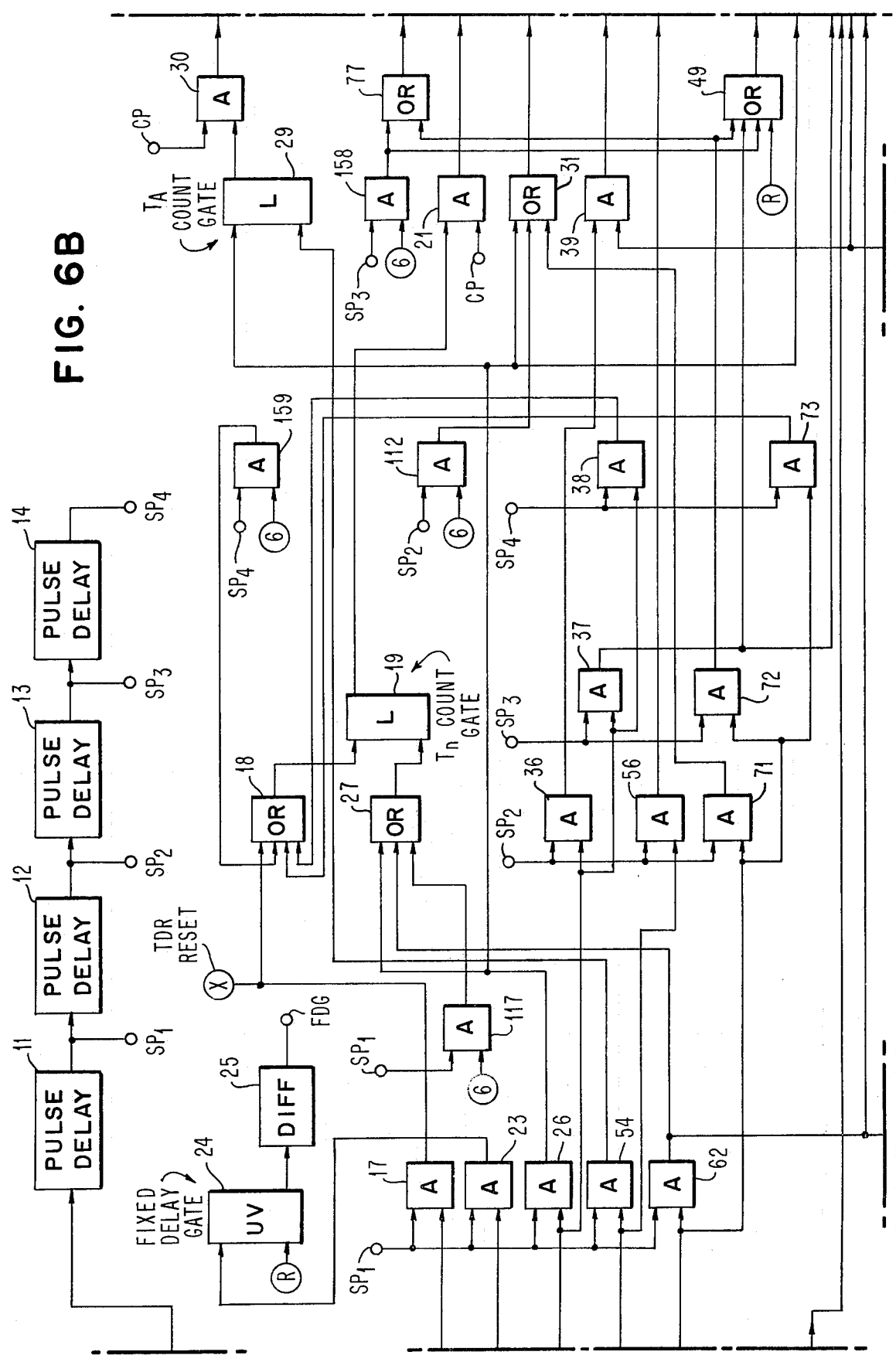
FIG. 6 illustrates, in schematic form, a logic circuit diagram for several preferred embodiments of search or inhibit gate systems described herein.
Figure 6C:
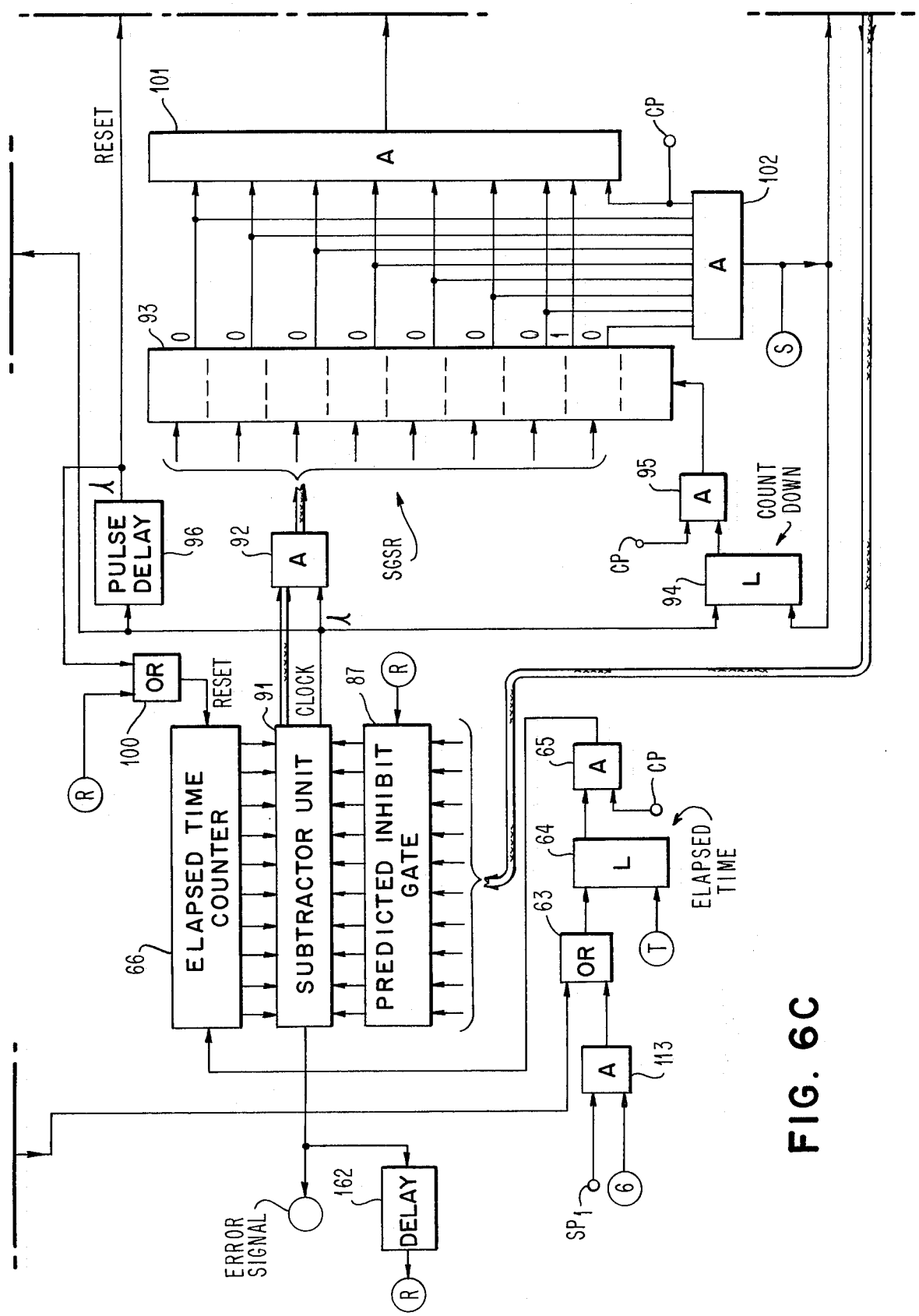
Figure 6E:
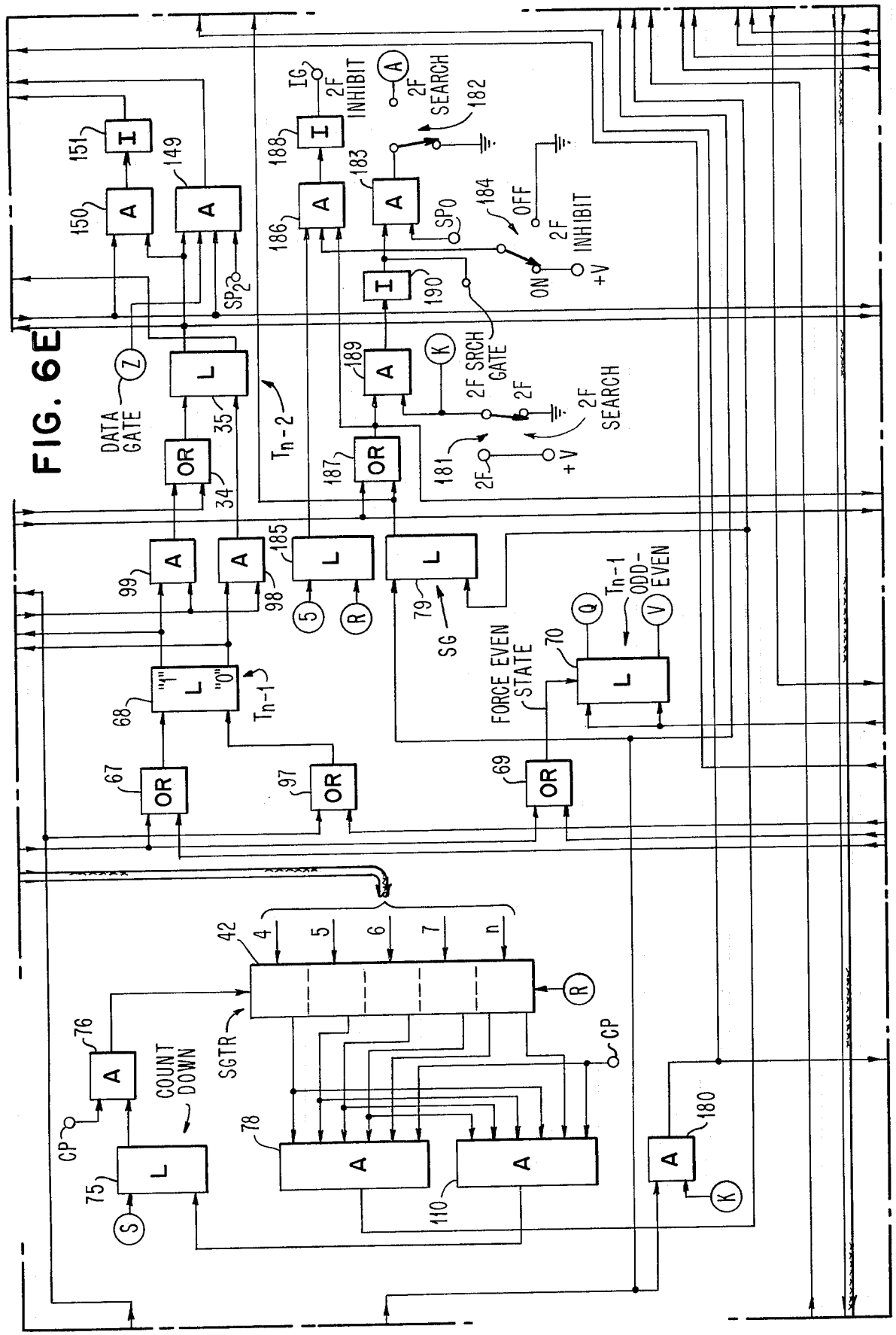
Figure 6F:
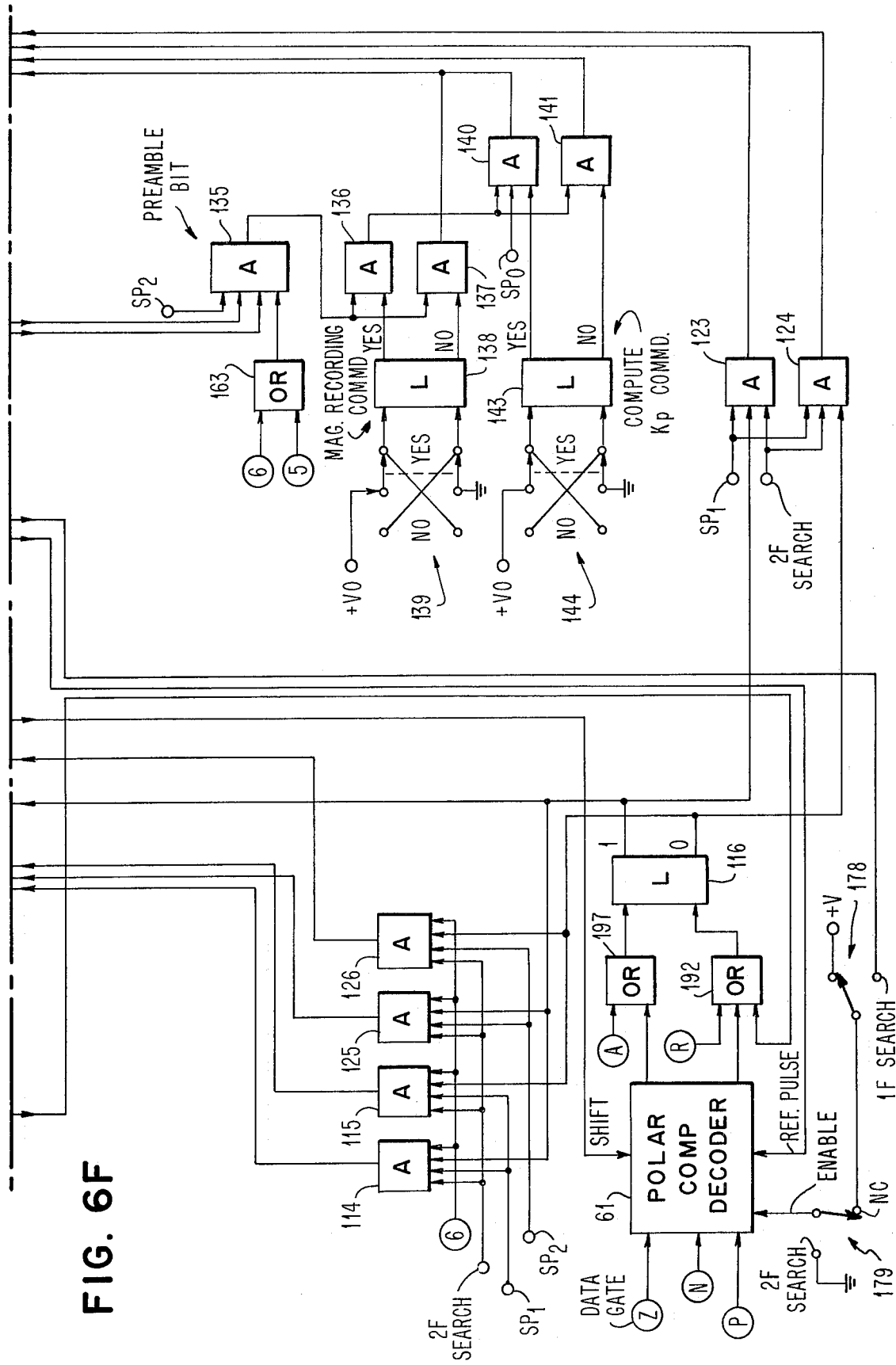
Figure 6G:
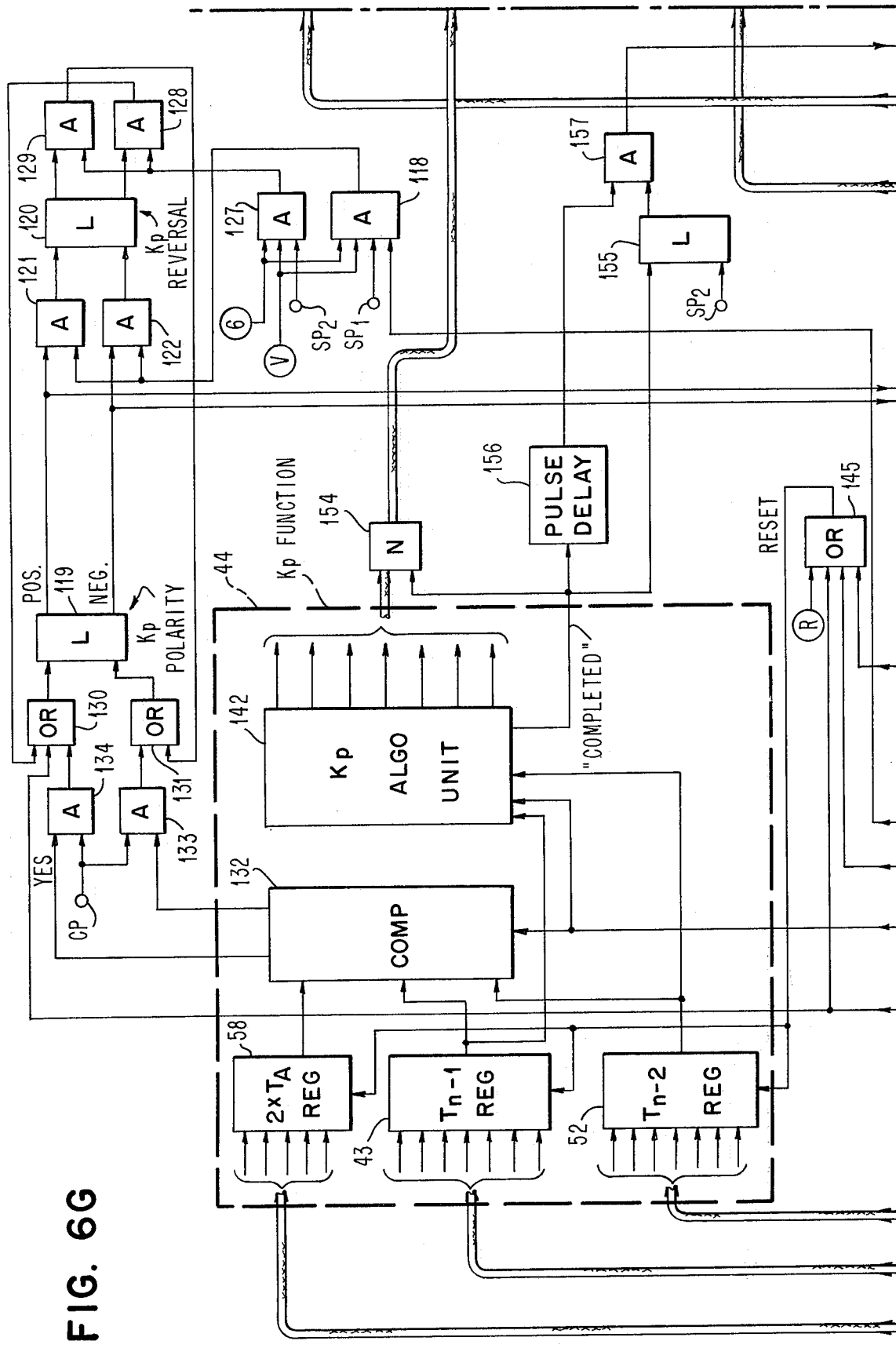
Figure 6H:
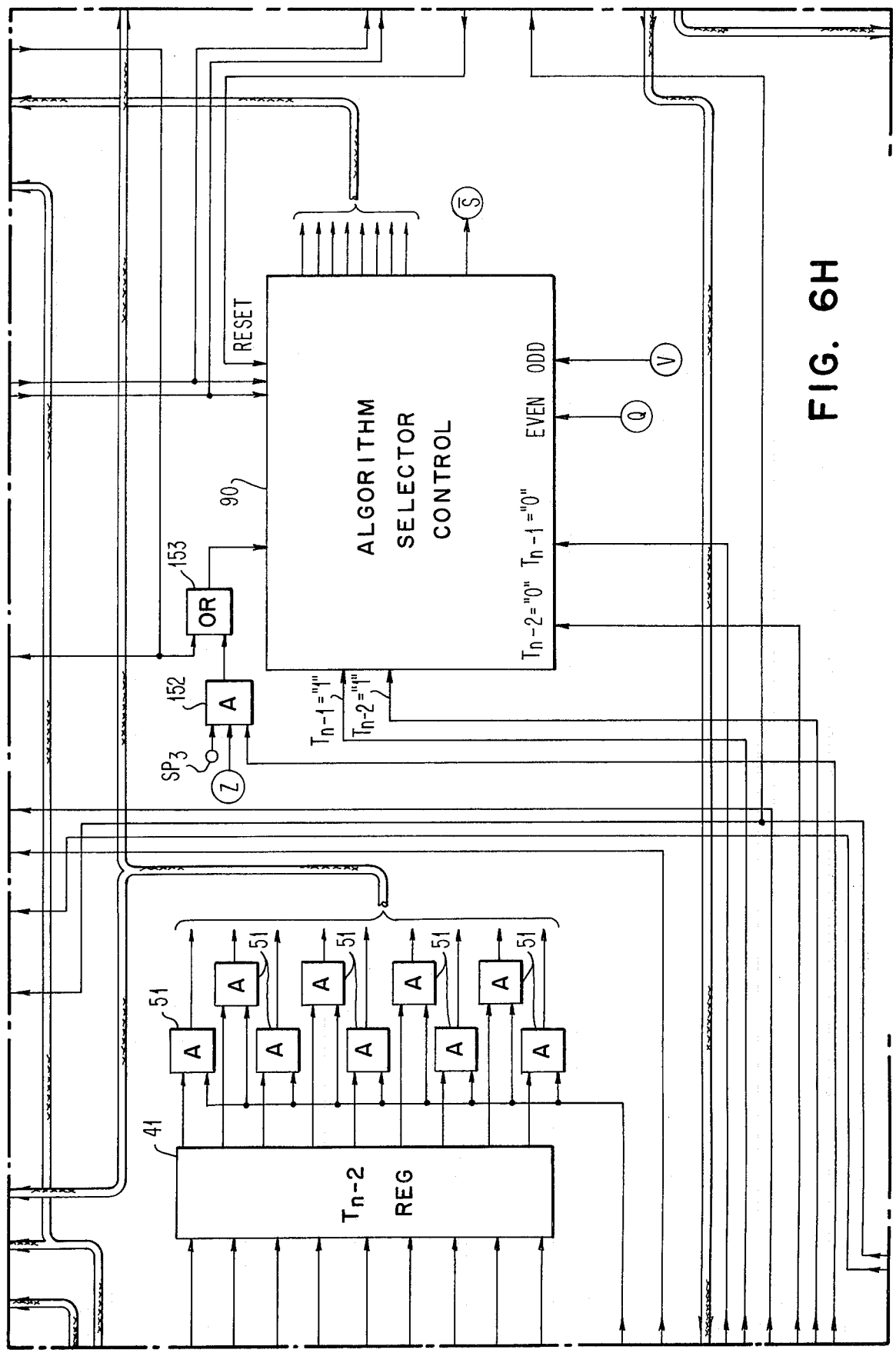
Figure 6J:
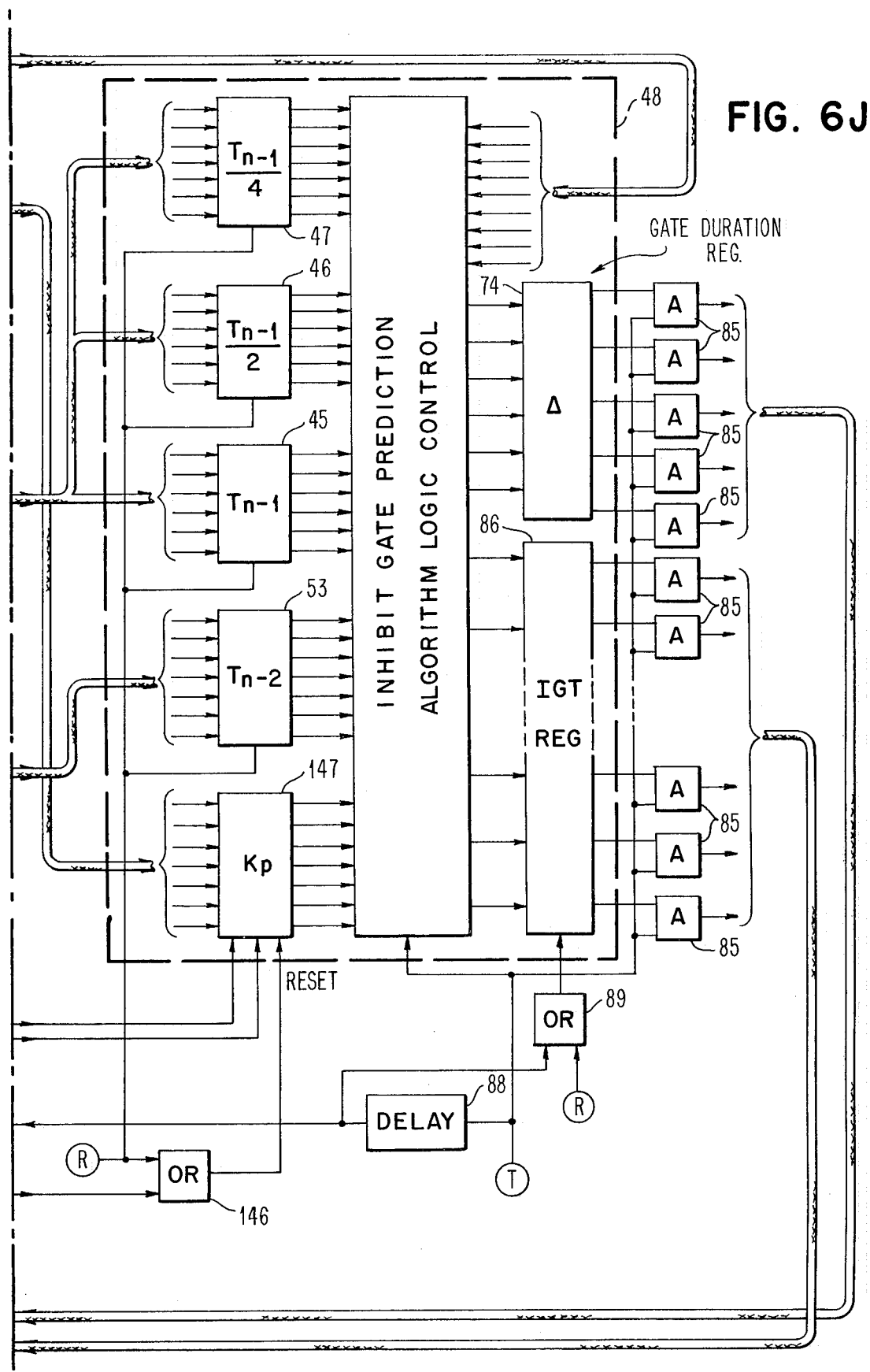

Starting at the top of FIG. 5A, incoming signals are examined. The question is asked whether the first sensor pulse has yet been received. If a pulse has been received, a sense pulse counter is incremented by 1 and a time counter is started from 0 to count time periods, or clock pulses of a reference clock, corresponding to the length of $T_n$ (as has already been defined). The terminal data register for holding data to be finally outputted is also reset to 0 at this point. The system awaits the receipt of a second sensor pulse. When the second pulse is received, it increments the pulse counter and initiates the fixed delay gate.

The system awaits the receipt of the third sensor pulse. When the third pulse is received, several actions are taken. First, the sense pulse counter is incremented by one and the $T_n$ counter is stopped, completing the measurement of the length of the first preamble symbol. The $T_A$ counter is started to start measuring the first time slot of the next preamble symbol, and the $T_{n-2}$ indicator (or second indicator) is set to a "one" state. The contents of the $T_n$ counter are stored in a first storage and in a second storage and the content of the second storage is loaded into the $K_p$ register. The $T_n$ counter and the $T_{n-1}$ storage (the first storage) are reset to 0 and the $T_n$ counter is started counting again. The system then awaits the receipt of the fourth sensor pulse.

At the receipt of the fourth sensor pulse, the sense pulse counter is incremented by one and the reference pulse gate is initiated by the fourth sensor pulse, delayed slightly so as to avoid triggering a reference pulse, and the system awaits the receipt of the end of the second preamble symbol at the fifth pulse. Also, at the receipt of the fourth sensor pulse, the $T_A$ counter is stopped and the time period for $T_A$, the first time slot in the second preamble symbol, is loaded in a register in the $K_p$ calculation unit. As noted above, the system awaits the receipt of the fifth sensor pulse at the end of the second preamble symbol.

At the fifth sensor pulse, the first indicator (or $T_{n-1}$ latch) is set to a binary 1 and an odd-even flip flop (or indicator) is set to the even state. The sense pulse counter is also incremented by one more count. The polarity comparison decoding unit is then activated. The question is asked, "is the count in the pulse counter for sensed pulses equal to 6 or greater?." At the point in the system where the two preamble bits or symbols have been read, the count will be 5. Therefore, the answer will be "no" and the system will stop the $T_n$ register from counting clock pulses. At this point, the second preamble symbol length will have been measured as a count $T_n$. An elapsed time counter to allow for the time utilized in computation is then started and the count in the $T_n$ counter is loaded into the storage for $T_{n-1}$ (or first storage). The content of the $T_n$ register is copied also into a register in the $K_p$ computation unit to give an initial value for the measurement of the second preamble symbol.

The $K_p$ factor is then computed and stored in the algorithm $K_p$ register. The $T_A$ and $T_n$ counters are reset to 0. The $T_n$ counter is started from 0 to count clock pulses as a measurement of the length of the next symbol. The question is asked, "is this the first data bit inhibit gate?," and when the answer is "yes," the question is again asked, is the count in the sense pulse counter 6 or greater? The answer at this point will be "no" or "yes" depending on whether another pulse has been sensed by this time. If the answer is "no", the system terminates the reference pulse gate, initiates the inhibit gate to block the passage of pulses, and initiates a delay pulse of ½ microsecond duration, for example. The data gate latch is then set to the "one" position to raise the data gate signal and the system asks, are all of the inhibit gate start register stages 0? It awaits the " yes" answer and when the answer is "yes," the system stops counting down the inhibit gate start register. The question is then asked, have $n$ shift pulses been executed in the data shift register, where $n$ is equal to the number of bits to be sensed for an arbitrary data character format? If the answer is "no" and the fixed delay gate has not terminated, the system awaits the receipt of the next sensor pulse, and when that pulse is received, it returns to the point marked with an X in a box in FIG. 5 to increment the sense pulse counter again and continue operation. If the fixed delay gate has terminated, the data in the shift register is transferred to the using system and all registers and indicators are reset to 0 except for the terminal data register and the system returns to the start.

If the count in the sense pulse counter is 6 or greater, the data register is shifted and the polarity comparson decoder is pulsed; the sense pulse counter is incremented by one, and, as above, the question is asked whether all of the inhibit gate start register stages are 0, and the process continues as above.

If, when the question is asked whether this is the first data bit inhibit gate, the answer is "no," the question as to whether all except the low order bit position in the inhibit gate start register are zero is asked at once and an affirmative answer is awaited. When a "yes" to this question is received, the inhibit gate period is begun, and the question is asked whether the sense pulse count is 6 or greater and the system continues as above from the point where the "6 or greater" question is asked the second time.

At the first time the question is asked, is the sense pulse count 6 or greater, if the answer is "yes," the question is asked whether the pulse sensed was a binary 1. If the answer is "yes," the question is asked whether the odd-even indicator is odd, and if the answer is "yes" the sign of $K_p$ is reversed, the first indicator is set to a 1 (the $T_{n-1}$ latch) and a 1 is entered into the data register. The $T_{n-1}$ odd-even indicator is then set to even and the $T_n$ register is stopped from counting clock pulses. If the pulse sensed is determined to be a binary 0 instead, the first indicator of the $T_{n-1}$ latch is set to a 0 and the data register is loaded with a 0, and the odd-even indicator is set to the opposite of whatever state it is then in and the system returns to stop the $T_n$ register from counting clock pulses as shown.

At the time the $T_A$ and $T_n$ register as reset to 0 and the $T_n$ register is started counting again, the question is also asked, are both the first and the second indicator, the $T_{n-1}$ and $T_{n-2}$ latches respctively, set to the 1 state. If the answer is "no," the system continues to the box marked with an A which leads to the algorithm selector control logic shown in FIG. 7 (this is the same as that shown in FIG. 31 of my copending application, Ser. No. 522,210 referred to previously).

If, however, both the first and the second indicators are in the "one" state, the question is asked whether these "one's" represent preamble bits and if they do, and a magnetic recording is being read, the question is asked whether it is desired to compute $K_p$. If the answer to this question is "yes," the $K_p$ algorithm is examined and the algorithm for $K_p$ is computed. The sign of the $K_p$ is entered into a register or latch, the latch being set to 0 for $K_p$ negative and the latch being set to the 1 state for $K_p$ positive. The value, in absolute terms of $K_p$, is stored in the appropriate storage and the $T_{n-1}$ and $T_{n-2}$ and $T_A$ registers in the $K_p$ computation unit are all reset to 0.

If it is not desired to compute $K_p$, the $K_p$ latch is set to a 1 indicating a positive $K_p$ and the absolute value of $K_p$ equals 0 is entered into the algorithm registers.

If a magnetic recording is not being read, the $K_p$ algorithm register is examined and $K_p$ is computed automatically.

When the algorithm selection has been completed, the algorithm selector re-enters the flow chart at the point marked C in FIG. 5 and the question is asked whether the predicted inhibit gate termination time has been computed. When the computation is finished, the inhibit gate termination time and the $\Delta$ value for the time to begin the next inhibit gate are outputted. The $\Delta$ value is loaded into the inhibit gate start register. The computed inhibit gate's termination time is transferred to an elapsed time compensator unit and the algorithm selector control is reset to 0, the elapsed time counter is stopped and the elapsed time that has run is subtracted from the predicted inhibit gate termination. If the difference is positive, the remainder is stored in the inhibit gate termination count down register which is then started counting down, and the data content of the $T_{n-1}$ register at the first storage is transferred to the $T_{n-2}$ register (the second storage) and the $T_{n-1}$ (the first storage) is reset to 0. If the difference is not positive, an error has resulted and an error signal is generated, all registers or indicators are reset to 0 except for the terminal data register and the system returns to start.

When the $T_{n-1}$ register is reset to 0 and a positive difference was found in the elapsed time compensator, the state of the first indicator, the $T_{n-1}$ latch, is transferred to the $T_{n-2}$ latch (or second indicator) and the first indicator is reset to 0, and the elapsed time counter is set to 0. The system asks whether all of the inhibit gate termination register positions, except for the low order bit, are 0 and when they are, the inhibit gate driver latch is set to 0 to end the inhibit gate and allow the passage of sense pulses to the polarity comparison unit. When all of the stages in the inhibit gate termination register are 0, the inhibit gate termination register is stopped counting down, the inhibit gate start register for the next inhibit period is started counting down, and the question is asked whether $n$ shift pulses have been executed and the system continues to operate as was done previously at this point in the diagram.

FIG. 5 also incorporates a number of circled blocks having normally opened and normally closed switches designated as S within them. These switches are normally open or closed as shown and are utilized to change over the flow in the system if no print spread is anticipated in the bar code or in the F2F signal being processed so that the system calculates an inhibit gate termination time based on acceleration factors alone, as shown in the diagram of FIG. 5. The (S) switches serve to bypass or eliminate functions not necessary when acceleration corrections alone are being made.

What has just been discussed is the system which utilizes and produces the timings shown in FIG. 4 for a two preamble symbol F2F code stream. As will be apparent to those of skill in the art, a single preamble signal system will be built substantially like that shown for two preamble symbols, but the first several boxes on the flow diagram would be removed or modified so that the functions would be done utilizing the first preamble symbol alone. This has previously been shown in my aforementioned copending patent application, Ser. No. 522,210 as FIGS. 21A & 21B thereof. Although these figures are for a search gate system rather than an inhibit gate system, as has been previously discussed, these functions are the inverse of one another and the timings and other logic functions are only slightly different. The operations for terminating either a search gate or an inhibit gate are identical, since the length of these gates is approximately the same and the end point is the same.

Turning to FIG. 6, a logic diagram for three preferred embodiments of F2F code interpreting systems are shown. One system is operated according to the directions given in the flow chart of FIG. 5. It must be understood that the various output algorithm functions will be different and diagram 6 does not show the specific logic circuits for computing these algorithms. These are shown separately in FIGS. 19–23 herein and in FIGS. 24A–24G of my previous application Ser. No. 522,210 when the algorithms of Tables 2–5 of my copending application are used to predict an inhibit gate termination.

It will be apparent to those of skill in the art that what has been described is the inverse function of that set forth in my copending application Ser. No. 522,210. In this invention, the center transition pulse, or double frequency signal, is inhibited or blocked from passing through to the interpreting system. The starting point and the duration of the inhibit gate function can be identical to those set forth for the search gate in Ser. No. 522,210, which allowed only the central pulse or transition to pass as set forth.

From these considerations, it is apparent that the data in the signal may be encoded either at the central transition by, its presence or absence, or at one of the symbol boundary transitions using some other characteristic of this signal itself, such as the polarity or the direction of the pulse at the transition. Utilizing symbol boundary transitions for encoding the data provides several advantages: A transition is actually sensed and must appear during each data bit time to be valid, but in the previous system described in my aforementioned application, the transition pulse may or may not be present. This situation gives rise to an inherent problem in which, due to some error, or magnetic intersymbol interference effects, a central transition might not be sensed accurately or might have been missed because of noise in the data stream and incorrectly interpreted as the presence of a zero. This situation gives rise to the possibility of an undetected readout error. By encoding the data in the polarity of the symbol boundary transitions, a pulse is present at each time data is to be read in an unambiguous fashion since it is the polarity of the signal which is important. The absence of a signal at the time when a symbol boundary transition is due is signified as an error indication.

Intersymbol interference effects on symbol boundary transition signals is less severe than on double frequency signal transitions. This features increases the reliability of reading and decoding magnetic encoded data. As will be apparent, several modes of encoding and decoding are thus possible.

Figure 10:
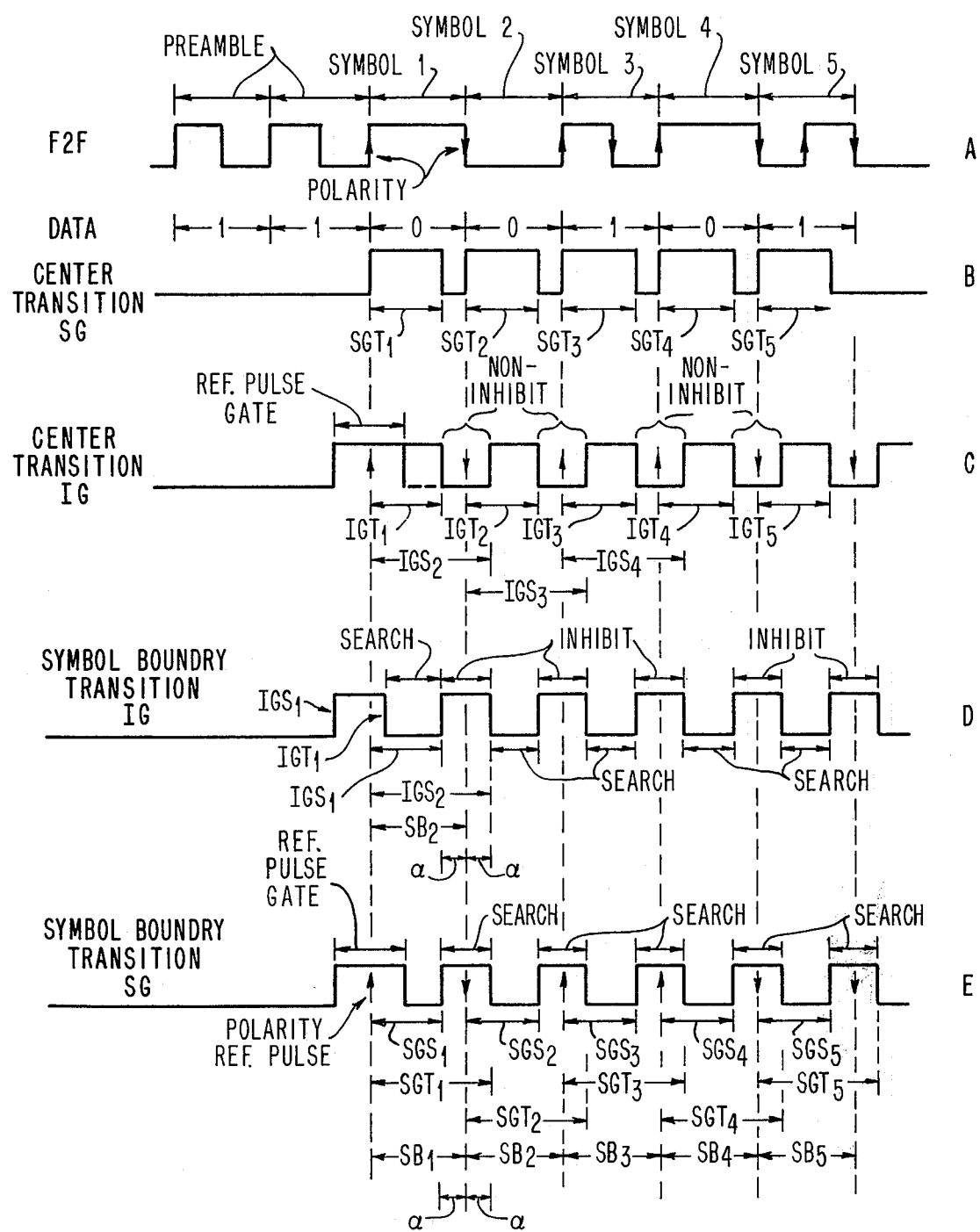
FIG. 10 illustrates, in detail, a comparison of the several systems and methods in this and in my copending application Ser. No. 522,210.

Turning to FIG. 10, a comparison of four techniques for encoding and decoding F2F data is graphically depicted. In the top line (A) a typical F2F data stream, which is preceded by two binary 1 preamble symbols as taught in my aforementioned application Ser. No. 522,210 is set forth. An arbitrary sequence of "zero" and "one" data content assigned to the center transition signal in each symbol follows the preamble symbols. At the symbol boundaries, small arrows are drawn to shown the direction of the pulse, either positive-going or negative-going. These may be viewed as the polarity of a sense pulse.

If the symbol boundary transition is to be utilized as the data bearing element, the polarity of the signal must be sensed and interpreted relative to some reference.

In the present system, as set forth in line C of FIG. 10, a reference pulse gate is constructed about the terminal symbol transition of the second (or last) preamble symbol. The polarity of this symbol boundary transition is stored temporarily in a register as the reference, for comparison purposes, with the next sensed symbol boundary transition polarity.

As an arbitrary convention, so as to contain the same data "zero" and "one" combinations as set forth with the central transition pulse coding scheme, the polarity of the signal, if it matches the reference, is indicative of a "one" and if it is not the same as the reference, is indicative of a "zero" content.

By comparing lines B and C of FIG. 10, it will be observed that, but for the reference gate signal which is required to pick up the polarity of the reference pulse, the duration of the inhibit gate function is exactly the same as the search gate function of line C. The major difference is that the search gate function of line B, as identified in my aforementioned copending application Ser. No. 522,210, allows only the central transition signal to pass through to the system for interpretation, while the system in line C blocks only the central transition from passing through to the system. In this way, the symbol boundary transitions are isolated.

A technique different from that in Ser. No. 522,210, but also for isolating the central transition for study, would be to inhibit the symbol boundary transitions by constructing inhibit gates about each symbol boundary as shown in line D. This is similar to the system shown in line B, but the starting point for the uninhibited or "search portion" in the center of each symbol begins slightly later in line D than it does in line B since it is necessary to extend a symbol boundary transition inhibit gate on both sides of the supposed location for the symbol boundary. This extends the inhibit function somewhat into the next symbol; whereas the system shown in line B can start the "search" immediately at the symbol boundary transition, or shortly thereafter as discussed in my copending application Ser. No. 522,210. Line E shows still another variation in which the symbol boundaries may be isolated for study by constructing search gates, sensing the polarity of the transition present at the symbol boundary, and comparing it with a reference as it is done with the system in lince C by inhibiting the center pulse.

It will be observed that lines C, D, and E show systems which differ one from another primarily in the element of the symbol which is chosen to contain the data and in the manner in which the isolation of the chosen element is accomplished. The lengths of the various gates, whether they be "search" or "inhibit" gates, are all related to those gates shown in line E which could be defined as "symbol boundary transition search gates."

As will be developed shortly, algorithms for defining "symbol boundary search gate" initiation and termination points may be written in a universal manner and the predictions developed can be applied to generate symbol boundary transition inhibit gates which are the exact inverse of symbol boundary transition search gates. The algorithms may also be used to inhibit the center transition by constructing a central pulse transition inhibit gate as shown in the system of line C and as discussed herein as the "center or 2F transition pulse inhibit gate" system.

With reference to line E of FIG. 10, it may be observed that algorithms could be developed for predicting the start of a search gate, SGS, and the termination of a search gate, SGT, for a symbol boundary transition in each symbol. These algorithms use measurements made on the preamble symbols or on preceding data symbols. The technique of making such measurements and performing such predictions differs in both the algorithm form and in the implementation of it from that shown in my copending application Ser. No. 522,210. The algorithms and their method of application will be developed below, but some comparison with the remaining lines in FIG. 10 is in order.

It will be observed that the waveform in line D is exactly the same as that in line E, but that the symbol transitions at the boundaries in line D are inhibited rather than allowed through. The start of the symbol boundary inhibit gate, IGS, is exactly the same as the start of the symbol boundary search gate, SGS, in line E. Similarly, the termination of the symbol boundary inhibit gate, IGT, in line D is exactly the same as the same prediction for the search gate termination SGT of line E. Of course, the data encoded in line D must be encoded by the presence or absence of the central transition, if any, since the symbol boundaries will not be sensed or passed through to the system except for timing measurement. Thus the data on line D is encoded and decoded in a manner different than that in line E where the symbol boundaries themselves are isolated and sensed in the polarity is compared with the reference. The central transition on line E is blocked from the decoding system and used only for measurement purposes for computing spread corrections.

In line C the center pulse is inhibited and it may be observed that the termination of a central pulse inhibit gate, IGT, corresponds to the same measurement utilized as the inhibit gate start point or the search gate start point of lines D and E for the symbol boundary. It is also seen that, for the following symbol, the initiation of the inhibit gate, or the inhibit gate start, IGS, corresponds to the termination of the search gate, SGT, in line E or the termination of inhibit gate for the boundary transition, IGT, in line D. It will thus be apparent that one set of predictions based on the spread and acceleration corrections using the measurements made from the preamble symbols and any preceding data bits may be utilized in any of the systems C, D, and E, although the implementations will differ and the method of encoding and decoding the data are different.

In the system of line C, as has been discussed previously, it is necessary to construct a reference gate to pick up the polarity of the terminal boundary of the preamble symbol. Since the center transition is to be inhibited, the first inhibit gate may be begun at any time following the end of the preamble symbol, just before the start of data. The reference gate pulse itself may be utilized for this purpose as shown in line C. The inhibit gate thus begun will be terminated at a point IGT which corresponds to the time which could be computed for starting a symbol boundary search gate SGS in line E. It is apparent, however, that the data present in the symbol boundaries of line C and line E is the same, but that the systems of line C and line E are the exact inverse of one another in that the center transition is inhibited in line C and only the symbol boundaries are permitted to pass, but only symbol boundaries are isolated by search gates and passed in line E. The implementations and the circuits used differ from one another. Similarly, as is apparent, the basic method of isolating the symbol boundaries is the inverse in lines C and E and in both instances the central transition is blocked from being decoded in the system. It may thus be seen that what is termed a "center transition inhibit gate" in line C is exactly equivalent to the period of time lying between the "symbol transition search gates" in line E. What is termed the end of a "search gate" in line E is the start of what is termed an "inhibit gate" in line C, etc.

Turning to a comparison of lines B and D, it may be seen that inhibiting the symbol boundary transitions, as shown in line D, is approximately the same as setting up a search gate for the central transition in line B, except that the start of the search gate in line B may be earlier in time than the prediction which would be generated for the termination of the inhibit gate in line D. Since the data information is not encoded at the symbol boundaries, the search gate in line B may be started at, or very slightly after, a symbol bounary transition while the inhibit gate in line D must be begun slightly before the symbol boundary and terminated slightly after to insure that the symbol boundary will, in fact, be inhibited.

It should be noted that the algorithms which will be developed below for the symbol transition search gate start and end points may be utilized as discussed for the symbol transition inhibit gate or for a center transition inhibit gate as discussed above. However, these are different in form from the algorithms developed for the center transition search gate in line B, as defined in my copending application Ser. No. 522,210. The reason is apparent: the algorithms utilized for defining a search gate in line B take prediction measurements and extend a search gate from a symbol boundary time to a search gate termination time, but the algorithms developed for the systems of lines C, D, and E utilize measurements and predictions which define theoretically where the next symbol boundary should occur and then add or subtract a calculated amount to define the beginning and end of search gate or inhibit gate times, as appropriate. Therefore, the measurements for systems C, D, and E and the predictions based thereon reflect essentially a gate positioned about a predicted symbol boundary which has not yet occurred, while those in line B represent a measurement starting from a symbol boundary which has already been sensed.

As the astute observer will no doubt surmise, the algorithms developed in my previous application Ser. No. 522,210 for terminating a search gate, i.e., the duration of the search gate, must be in fact the same as the new algorithms developed for predicting the start or termination of the search or inhibit gate for the system in line E which are reflected as measurements about a predicted occurrence of the next symbol boundary transition and measured from the first symbol boundary transition when it occurs. This is, in fact, the case as will be made clear below.

In summary, what has been discussed above represents four of the variations possible in which data may be encoded and decoded using the F2F signal format. Data may be represented by the presence or absence of the central or 2F signal transition as has been discussed. This data may be isolated either by positively searching for the central transition using algorithms such as developed in my copending application Ser. No. 522,210, or the central transition itself may be inhibited, using algorithms as developed below, so that only the symbol boundary transitions remain for containing data as has been discussed above. Similarly, search gates may be constructed for positively searching for the symbol boundaries and the central pulse, if any, will be inhibited, or the symbol boundaries may be inhibited using inhibit gates predicted from the measurements made in the system and the central pulse may be isolated for examination.

Thus, it may be observed that since the same measurements may be utilized in a variety of ways which are the inverse of one another and the data may be encoded in two different ways, there exist four methods of encoding and decoding F2F data by utilizing either a search or an inhibit gate for either the central pulse or the boundary transition pulse. It may be seen that inhibiting the symbol boundaries is equivalent to searching for the central transition and that inhibiting the central transition is equivalent to searching for symbol boundaries. However, while it may be said that "searching" for a central transition and data encoded by the presence or absence thereof is equivalent to "blocking" the boundary transitions so that only the central transition is left, the methods are fundamentally different. The algorithms for starting and ending the search or the inhibit functions are not based on the same type of prediction, i.e., searching for the symbol boundary requires the prediction of where the symbol boundary should next occur and the use of the predictions thus made to isolate a central boundary or to inhibit a central boundary differ substantially in method and in implementation from predicting when the next search gate for a central transition should terminate to avoid interference with a symbol boundary as was done in my previous application Ser. No. 522,210. It is now clear that while "searching for symbol boundaries" may construct gate periods which can be utilized for, and are equivalent to, inhibiting the central pulse, the basic methods differ substantially in both the manner of encoding and decoding the data (by the part of the symbol which is utilized to carry the data) and by the implementation required to carry out the method. Thus, three separate and distinct methods in addition to that shown in my copending application Ser. No. 522,210 will be described herein. Each method will have a different implementation in a preferred embodiment, but all will utilize common algorithms to define the appropriate search or inhibit times.

Turning then to FIG. 11, the algorithms for defining the start and the termination of a search gate for a symbol boundary transition such as shown in line E of FIG. 10 will be derived. This will be followed by an application of these algorithms to the systems of lines C, D, and E of FIG. 10.

Turning now to FIG. 11, a derivation of the first order solution for predicting the start and the termination time for a search gate to find the symbol boundary will be given for the condition where there is written a 1 and a 1 followed by a 1 or a 0. The first order solution is for spread only, no acceleration being present. In line A of FIG. 11, a typical F2F code is written in the unspread or ideal dimensions for an arbitrary sequence 110 or 111. The nominal symbol boundary transition ending the final 1 or 0 has its position identified by a vertical dotted line.

In line B of FIG. 11, the spread configuration for the code of line A is illustrated.

As defined in my copending application Ser. No. 522,210, a spread coefficient $K_p$ is defined as or alternatively as $$K_p = 2 \left[ \frac{T_A}{T_{n-1}} - \frac{T_{n-2}}{T_{n-1} + T_{n-2}} \right]$$

as shown in FIGS. 5C, 15C, 16, and 17C.

As defined in my copending application Ser. No. 522,210, $T_A$ is the first time slot width of a binary 1 in the spread or unspread condition, and $T_p$ is the total width of the symbol under consideration. Substituting $T_A = T_p/2 + 2S$ into equation (1) and solving the expression for S yields:

$$S = \frac{K_p \times T_p}{4} \quad (2)$$

From line B of FIG. 1 it is apparent that the nominal search gate defining and isolating the terminal boundary transition for the final 0 or 1 in the time period $T_p$ will, in the ideal case, extend from $(¾)T_p$ to $(5/4)T_p$. This is so, since these are the nominal limits to which the search gate can be extended in either direction about the nominal symbol transition points without beginning to encroach on the vicinity in which the central transitions for a binary 1 would appear in the time period $T_p$ or in the following period $T_p + 1$. The nominal end of the search gate $T_{sg2}$ is then equal to $(5/4)T_p + S$ as shown beneath line B. The width of the search gate on either side of the nominal symbol transition boundary line can be defined in the general form as some variable $\alpha \times T_p$.

$$T_{sg2} = (5/4)T_p + S \text{ which in turn is equal to } T_p + S + \alpha T_p = T_{sg2} \quad (3)$$

In equation (3) above, the left-hand side shows a nominal point for terminating the search gate. The nominal beginning of the search gate $T_{sg1}$ would equal:

$$(¾)T_p + S = T_p + S = \alpha T_p \quad (4)$$

However, $T_p = T_1$ given the fact that no acceleration is present. Also, $T_1 = T_{n-1}$ and $T_2 = T_{n-2}$, in this instance, because both are binary 1's and, as explained fully in my copending application Ser. No. 522,210, the length of binary 1's in the F2F code is not affected by spread.

Substituting equation (2) in the above expressions for $T_1$ and $T_2$ into equation (3) and equation (4) yields new equations (5) and (6)

$$T_{sg2} = \frac{T_{n-1}}{4} 5 + K_p$$

which equals $$T_{n-1} \left[ (1 + \alpha) + \frac{K_p}{4} \right] \text{ and} \quad (5)$$

$$T_{sg1} = \frac{T_{n-1}}{4} [3 + K_p], \text{ or}$$

$$T_{n-1} \left[ (1 - \alpha) + \frac{K_p}{4} \right] \quad (6)$$

As is evident from the above, the expressions for $T_{sg1}$ and $T_{sg2}$ are parallel in form. For the general expressions using $\alpha$ to be equal to the nominal ones, consider the following: For the expression in equation (5) to be a true representation it can be shown that $$4(1 + \alpha) = 5 \quad (7)$$

and solving equation (6) for $\alpha$ yields $$\alpha = ¼ \quad (8)$$

Equation (8) defines the nominal value of $\alpha$. Referring to FIG. 11 in portion C, it can be seen that $$S < \alpha T_p \leq \frac{T_p}{2} - S \quad (9)$$

This is the relationship depicted by the measurements shown in line C of FIG. 11.

Substituting the expression for S in equation (2) into equation (9) yields $$\frac{K_p \times T_p}{4} \leq \alpha T_p \leq \frac{T_p}{2} - \frac{K_p \times T_p}{4} \quad (10)$$

Eliminating $T_p$ yields a value for the permissible range which $\alpha$ may take.

$$\frac{K_p}{4} \leq \alpha \leq ½ - \frac{K_p}{4} \quad (11)$$

Referring to equations (5) and (6), it should be evident that a general expression for the search gate length can be written as follows.

$$T_{sg} = T_{n-1} \left[ (1 \pm \alpha) + \frac{K_p}{4} \right] \quad (12)$$

In equation (12), $\alpha$ is defined as within the range above and, as was pointed out in my copending application Ser. No. 522,210, $K_p$ has a minimum value of 0 and a maximum value of 1. This is the equation as it appears in Table 1A in the column headed "Constant Velocity Width Spread." It is the seventh entry from the top and corresponds to the conditions $T_{n-1} = 1$, $T_{n-2} = 1$, $K_p$ positive, and the $T_{n-1}$ 0 odd-even indicator is forced to the even state.

Turning to FIG. 12, a derivation for the first order solution with positive $K_p$ present will be given for the condition 00 followed by a 1 or a 0.

As with the derivation given for FIG. 11, $K_p$ is defined as equal to $$\frac{2T_A - T_p}{T_p} \quad (1)$$

The expression for S given in equation (2) above, is also the same. From line B of FIG. 12, it is apparent that the nominal termination for the search gate $$T_{sg2} = (5/4)T_p + S = T_p + S + \alpha T_p.$$

It is also apparent that
$$T_{sg1} = (¾)T_p + S$$

in the nominal condition which equals $T_p + S - \alpha T_p$ for the general case. By looking at lines B and C of FIG. 12, the above expressions are obvious. Given the fact that no acceleration is present, the fundamental feature of the F2F code dictates that the length of the symbols are all equal, without spread present. From line B, it can be seen that $T_1 = T_{n-1} + 2S$ in the spread condition, and substituting the expression for S from equation (2) yields:

$$T_1 = T_{n-1} + \frac{K_p \times T_p}{2}.$$

Now given the fact that no acceleration is present, $T_p = T_1$ which equals $T_2$, that is, the length of the symbols is constant. It will be observed that the above equation is written in terms of $T_p$ and $T_1$, so substituting $T_1$ for $T_p$ yields:

$$T_1 = T_{n-1} + \frac{K_p \times T_1}{2}.$$

Rearranging the above expression to reflect $T_1$ in terms of $T_{n-1}$ yields:

$$T_p = T_1 = \frac{2T_{n-1}}{2-K_p}.$$

Eliminating the term S from the expression for $T_{sg2}$ and $T_{sg1}$ gives $$T_{sg2} = \frac{T_p}{4}[5 + K_p] = T_p\left[(1+\alpha) + \frac{K_p}{4}\right]$$

and $$T_{sg1} = \frac{T_p}{4}[3 + K_p] = T_p\left[(1-\alpha) + \frac{K_p}{4}\right].$$

Substituting the expression given above for $T_p$, $$T_p = \frac{2T_{n-1}}{2-K_p}$$

into the above expression for the search gate termination time yields:

$$T_{sg2} = \frac{T_{n-1}}{2}\left(5 + \frac{K_p}{2} - K_p\right) = T_{n-1}\left(\frac{2(1+\alpha)+\frac{K_p}{2}}{2-K_p}\right)$$

and $$T_{sg1} = \frac{T_{n-1}}{2}\frac{(3+K_p)}{2-K_p} = T_{n-1}\left(\frac{2(1+\alpha)+\frac{K_p}{2}}{2-K_p}\right)$$

Solving the above two expressions for $\alpha$ it may be found that the nominal value for $\alpha$ is $\alpha = \frac{1}{4}$ and returning to FIG. 12 line C it can be seen that:

$$S \leq \alpha T_p \leq \frac{T_p}{2} - S$$

From this it may be found that the permissible range of values for $\alpha$ is exactly as set forth previously for the prior derivation with reference to FIG. 11. A generalized form for the above two equations can be summarized in one equation as follows:

$$T_{sg} = T_{n-1}\left[\frac{2(1\pm\alpha)+\frac{K_p}{2}}{2-K_p}\right] \quad (13)$$

This is the equation that appears in Table 1B as the first entry in the column headed by the title "Constant Velocity with Spread." FIGS. 13 and 14, which are shown in the drawing, are for the other combinations of digital contents 0 and 1 followed by 1 and 0.

Using the techniques shown above for FIG. 11 and FIG. 12, the remaining algorithms may be derived for the figures as shown for the constant velocity code having spread present. For the sake of simplicity, these derivations will not be repeated here, as they follow precisely the form set forth above using the same substitutions and utilizing the dimensions indicated in the respective figures where the algorithm derived from the figure is shown with the figure.

For the second order solution for the situation illustrated in FIG. 12, return to line B of FIG. 12. As has been stated previously for the spread only system $T_{sg2} = (5/4)T_p + S$ which equals $T_p + S + \alpha T_p$ and $T_{sg1} = (3/4)T_p + S$ which equals $T_p + S - \alpha T_p$. As was shown in my copending application Ser. No. 522,210, an expression for $T_p$ to correct it for acceleration is $$T_p = T_1 \times \frac{T_1}{T_2}.$$

Substituting the expression for $T_p$ into the above expressions for the search gate 1 and search gate 2 yields:

$$T_{sg2} = (5/4)T_1 \times \frac{T_1}{T_2} + S$$

which equals $$(1 + \alpha) T_1 \times \frac{T_1}{T_2} + S \quad (14)$$

and $$T_{sg1} = (\tfrac{3}{4})T_1 \left(\frac{T_1}{T_2}\right) + S$$

which equals $$(1 - \alpha) T_1 \times \left(\frac{T_1}{T_2}\right) + S. \quad (15)$$

From the above expressions it is evident that $5/4 = 1 + \alpha$ and $3/4 = 1 - \alpha$. Therefore, in order to satisfy both the nominal values above, $\alpha$ must equal $\frac{1}{4}$ as was true before. Substituting the expression for $$S = \frac{K_p}{4} \times T_p$$

and $$T_p = T_1 \left(\frac{T_1}{T_2}\right)$$

gives $$S = \frac{K_p}{4} \times T_1 \left(\frac{T_1}{T_2}\right).$$

Substituting this value for S into the equation above yields $$T_{sg2} = \tfrac{1}{4}T_1 \left(\frac{T_1}{T_2}\right)[5+K_p] = T_1 \left(\frac{T_1}{T_2}\right)\left[(1+\alpha)+\frac{K_p}{4}\right] \quad (16)$$

$$T_{sg1} = \tfrac{1}{4}T_1 \left(\frac{T_1}{T_2}\right)[3+K_p] = T_1 \left(\frac{T_1}{T_2}\right)\left[(1-\alpha)+\frac{K_p}{4}\right] \quad (17)$$

From line B of FIG. 12, the expressions for $T_1$ and $T_2$ in terms of $T_{n-1}$ and $T_{n-2}$, respectively, can be obtained where it may be seen that $T_2 = T_{n-2} - 2S$ and $T_1 = T_{n-1} + 2S$. Substituting the expression for S into these equations gives:

$$T_2 = \frac{2T_{n-2}}{2+K_p}$$

and $$T_1 = \frac{2T_{n-1}}{2-K_p}.$$

Substituting these expressions into the above expressions for the search gate yields:

$$T_{sg2} = \tfrac{1}{2}T_{n-1} \quad (\frac{T_{n-1}}{T_{n-2}}) \quad (\frac{2+K_p}{(2-K_p)^2}) \; [5+K_p]$$

$$T_{sg2} = T_{n-1} \quad (\frac{T_{n-1}}{T_{n-2}}) \quad (\frac{2+K_p}{(2-K_p)^2}) \; [2(1+\alpha) + \frac{K_p}{2}] \quad (18)$$

and $$T_{sg1} = \tfrac{1}{2}T_{n-1} \quad (\frac{T_{n-1}}{T_{n-2}}) \quad (\frac{2+K_p}{(2-K_p)^2}) \; [3+K_p]$$

or $$T_{sg} = T_{n-1} \quad (\frac{T_{n-1}}{T_{n-2}}) \quad (\frac{2+K_p}{(2-K_p)^2}) \; [2(1-\alpha) + \frac{K_p}{2}] \quad (19)$$

As may be seen, the equations above are identical in the right-hand portion except for the sign of $\alpha$. The equations may be written together in a general form where the start of a symbol boundary search gate corresponds to the use of the minus $\alpha$ term and the finish of the search gate corresponds to the plus $\alpha$ term as follows:

$$T_{sg} = T_{n-1} \quad (\frac{T_{n-1}}{T_{n-2}}) \times \frac{2+K_p}{(2-K_p)^2} \; [2(1 \pm \alpha) + \frac{K_p}{2}] \; .$$

This equation appears in Table 1B as the first entry headed by "Acceleration With Spread."

In FIGS. 13 and 14, the situation is drawn for the other combinations of 1 and 0 as noted above. The derivation for the second order solutions follow the same methods as that set forth above using the same substitutions and utilizing the dimensions as given in the figures. This leads to the derivation of the algorithms listed with the figures. The derivations will not be presented here in detail as they do follow the same method as that set forth in the example above.

As will be appreciated by those skilled in the art, the expressions for acceleration with spread for the start and end of the search gate can be broken down to yield the expression for spread only simply by removing the $T_1/T_2$ term which provides the expression for correcting for acceleration. The resulting expression for constant velocity with spread present can be broken down still further into a constant velocity system without spread simply by setting $K_p = 0$. Similarly, if $K_p$ is 0 in the expression for acceleration with spread present, an expression for acceleration only without spread will result. The latter expressions for constant velocity and no spread and acceleration without spread are shown in Table 1A with the same conditions for $T_{n-1}$, $T_{n-2}$, etc., and are easily derived as just discussed from the general expressions developed for spread at constant velocity and acceleration plus spread.

Returning now to FIG. 10, line E, it may be appreciated that the algorithms developed above can be used to predict the start of a search gate, SGS, or the termination of a search gate, SGT, to isolate a symbol boundary transition as shown in line E of FIG. 10. These same predictions, with the name changed to reflect their use, can be utilized in line D of FIG. 10 to construct symbol boundary transition inhibit gates about the symbol transition boundaries utilizing the exact same predicted measurements. However, in the latter case, the data element is the 2F signal.

These same conditions may also be utilized in line C to construct a center transition signal inhibit function where the termination of inhibit function is given by the algorithm which predicts the start of the search gate in line E and the beginning of the following inhibit function for the following symbol is given by that algorithm which defines the termination of the search gate in line E. To implement these expressions for systems such as shown in line C of FIG. 10, the initial inhibit gate would be started simultaneously with (or at the end of) the reference gate pulse and would be terminated at the value calculated using the algorithms for line E which yield the start of the search gate time, which is equivalent to the end of the inhibit gate time, in line C. This would construct the inhibit gate for the first central transition signal in the first data symbol in the line of code shown.

The time to begin the inhibit gate for the second data symbol is yielded from the first set of measurements and predictions as equal to the desired search gate termination time in line E. The termination of the inhibit gate for the second data symbol will be equal to the search gate start time in line E predicted for the second symbol using the algorithms which relate to line E.

The proper expressions to choose, therefore, for generating inhibit gates in the system illustrated in line C of FIG. 10, are those which pick an algorithm based on the 1 and 0 content of the two preceding symbols and the sign of $K_p$ and the odd-even considerations as discussed in my copending application Ser. No. 522,210 for choosing the proper algorithm based on these conditions. Furthermore, by utilizing the minus $\alpha$ term to define the end of the inhibit gate and the plus $\alpha$ term to define the beginning of the inhibit gate for the symbol following the one in question, the other inhibit gates for central transitions may be developed, and so on.

It should be obvious that the start and termination times for the various gate functions using the algorithms for prediction are measured from the symbol boundary at the start of a symbol. An operative system must therefore be provided with the means for measuring time periods from boundary to boundary and from boundary to intermediate transition in order to calculate the factors of $K_p$, etc., as taught in my previous application Ser. No. 522,210. It should also be apparent that the algorithms for defining the termination point for central transition search gates in Ser. No.

522,210 could be used herein to define the termination points for central transition inhibit gates. These are the algorithms in Tables 2–5 reproduced below and in Table 1, previously set forth.

TABLE 2

| $T_{n-1}$ | $T_{n-2}$ | Conditions $T_{n-2}$ (Zero) | Comp. $K_p$ | First Order Solution | | Second Order Solution | |
|---|---|---|---|---|---|---|---|
| "0" | "0" | Odd | Pos. | $T_{so} = \frac{T_{n-1}}{2} [\frac{3+|K_p|}{2-|K_p|}]$ | $T_{so} = \frac{T_{n-1}}{2}$ | $[3\ (\frac{2+|K_p|}{2-|K_p|})\ \frac{T_{n-1}}{T_{n-2}} + |K_p|]$ | $\frac{1}{2-|K_p|}$ |
| "0" | "0" | Even | Neg. | | | | |
| "0" | "0" | Even | Pos. | $T_{so} = \frac{T_{n-1}}{2} [\frac{3-|K_p|}{2+|K_p|}]$ | $T_{so} = \frac{T_{n-1}}{2}$ | $[3\ (\frac{2-|K_p|}{2+|K_p|})\ \frac{T_{n-1}}{T_{n-2}} - |K_p|]$ | $\frac{1}{2+|K_p|}$ |
| "0" | "0" | Odd | Neg. | | | | |
| "1" | "0" | Odd | Pos. | $T_{so} = \frac{T_{n-1}}{4}(3-|K_p|)$ | $T_{so} = \frac{T_{n-1}}{4}$ | $[3\ \frac{T_{n-1}}{T_{n-2}}\ (1 + \frac{|K_p|}{2}) - |K_p|]$ | |
| "1" | "0" | Even | Neg. | | | | |
| "1" | "0" | Even | Pos. | $T_{so} = \frac{T_{n-1}}{4}(3+|K_p|)$ | $T_{so} = \frac{T_{n-1}}{4}$ | $[3\ \frac{T_{n-1}}{T_{n-2}}\ (1 - \frac{|K_p|}{2}) + |K_p|]$ | |
| "1" | "0" | Odd | neg. | | | | |
| "0" | "1" | | Pos. | $T_{so} = \frac{T_{n-1}}{2} (\frac{3-|K_p|}{2+|K_p|})$ | $T_{so} = \frac{T_{n-1}}{2+K_p}$ | $[(\frac{3}{2+|K_p|})\ \frac{T_{n-1}}{T_{n-2}} - \frac{|K_p|}{2}]$ | |
| "0" | "1" | | Neg. | $T_{so} = \frac{T_{n-1}}{2} (\frac{3+|K_p|}{2-|K_p|})$ | $T_{so} = \frac{T_{n-1}}{2-K_p}$ | $[(\frac{3}{2-|K_p|})\ \frac{T_{n-1}}{TT_{n-2}} + \frac{|K_p|}{2}]$ | |
| "1" | "1" | | Pos. | $T_{so} = \frac{T_{n-1}}{4}[3+|K_p|]$ | $T_{so} = \frac{T_{n-1}}{4}$ | $[3\ \frac{T_{n-1}}{T_{n-2}} + |K_p|]$ | |
| "1" | "1" | | Neg. | $T_{so} = \frac{T_{n-1}}{4}[3-|K_p|]$ | $T_{so} = \frac{T_{n-1}}{4}$ | $[3\ \frac{T_{n-1}}{T_{n-2}} - |K_p|]$ | |

To convert the above algorithms to the general form, substitute 4C for the numeral 3 wherever it occurs.

TABLE 3

| $T_{n-1}$ | $T_{n-2}$ | Conditions $T_{n-1}$ "0" (Odd-Even) | Comp. $K_p$ | First Order Solution | | Second Order Solution | |
|---|---|---|---|---|---|---|---|
| "0" | "0" | Even | Pos. | $T_{so} = \frac{T_{n-1}}{2} [\frac{3+|K_p|}{2-|K_p|}]$ | $T_{so} = \frac{T_{n-1}}{2}$ | $[3\ (\frac{2+|K_p|}{2-|K_p|})\ \frac{T_{n-1}}{T_{n-2}} + |K_p|]$ | $\frac{1}{2-|K_p|}$ |
| "0" | "0" | Odd | Neg. | | | | |
| "0" | "0" | Odd | Pos. | $T_{so} = \frac{T_{n-1}}{2} [\frac{3-|K_p|}{2+|K_p|}]$ | $T_{so} = \frac{T_{n-1}}{2}$ | $[3\ (\frac{2-|K_p|}{2+|K_p|})\ \frac{T_{n-1}}{T_{n-2}} - |K_p|]$ | $\frac{1}{2+|K_p|}$ |
| "0" | "0" | Even | Neg. | | | | |
| "1" | "0" | Forced Even | Neg. | $T_{so} = \frac{T_{n-1}}{4}(3-|K_p|)$ | $T_{so} = \frac{T_{n-1}}{4}$ | $[3\ \frac{T_{n-1}}{T_{n-2}}\ (1 + \frac{|K_p|}{2}) - |K_p|]$ | |
| "1" | "0" | Forced Even | Pos. | $T_{so} = \frac{T_{n-1}}{4}(3+|K_p|)$ | $T_{so} = \frac{T_{n-1}}{4}$ | $[3\ \frac{T_{n-1}}{T_{n-2}}\ (1 - \frac{|K_p|}{2}) + |K_p|]$ | |
| "0" | "1" | Odd | Pos. | $T_{so} = \frac{T_{n-1}}{2} (\frac{3-|K_p|}{2+|K_p|})$ | $T_{so} = \frac{T_{n-1}}{2+|K_p|}$ | $[(\frac{3}{2+|K_p|})\ \frac{T_{n-1}}{T_{n-2}} - \frac{|K_p|}{2}]$ | |
| "0" | "1" | Odd | Neg. | $T_{so} = \frac{T_{n-1}}{2} (\frac{3+|K_p|}{2-|K_p|})$ | $T_{so} = \frac{T_{n-1}}{2-|K_p|}$ | $[(\frac{3}{2-|K_p|})\ \frac{T_{n-1}}{T_{n-2}} + \frac{|K_p|}{2}]$ | |
| "1" | "1" | Forced Even | Pos. | $T_{so} = \frac{T_{n-1}}{4}[3+|K_p|]$ | $T_{so} = \frac{T_{n-1}}{4}$ | $[3\ \frac{T_{n-1}}{T_{n-2}} + |K_p|]$ | |
| "1" | "1" | Forced Even | Neg. | $T_{so} = \frac{T_{n-1}}{4}[3-|K_p|]$ | $T_{so} = \frac{T_{n-1}}{4}$ | $[3\ \frac{T_{n-1}}{T_{n-2}} - |K_p|]$ | |

To convert the above algorithms to the general form, substitute 4C for the numeral 3 wherever it occurs.

TABLE 4

| $T_{n-1}$ | $T_{n-2}$ | Conditions $T_{n-2}$ "0" | $K_p$ | First Order Solution | | Second Order Solution | |
|---|---|---|---|---|---|---|---|
| "0" | "0" | Odd | Pos. | $T_{so} = \frac{T_{n-1}}{2} [\frac{3+|K_p|}{2-K_p}]$ | $T_{so} = \frac{1}{2} T_{n-1}$ | $(\frac{T_{n-1}}{T_{n-2}})$ | $[\frac{(2+|K_p|)(3+|K_p|)}{(2-|K_p|)^2}]$ |
| "0" | "0" | Even | Neg. | | | | |
| "0" | "0" | Even | Pos. | $T_{so} = \frac{T_{n-1}}{2} [\frac{3-2|K_p|}{2+|K_p|}]$ | $T_{so} = \frac{1}{2} T_{n-1}$ | $(\frac{T_{n-1}}{T_{n-2}})$ | $[\frac{(3-2|K_p|)(2-|K_p|)}{(2+|K_p|)^2}]$ |
| "0" | "0" | Odd | Neg. | | | | |
| "1" | "0" | Odd | Pos. | $T_{so} = \frac{T_{n-1}}{4}$ | $T_{so} = T_{n-1}$ | $(\frac{T_{n-1}}{T_{n-2}})$ | $[\frac{(3-2|K_p|)(2+|K_p|)}{8}]$ |
| "1" | "0" | Even | Neg. | | | | |

TABLE 4-continued

| $T_{n-1}$ | $T_{n-2}$ | Conditions $T_{n-2}$ "0" | $K_p$ | First Order Solution | | Second Order Solution | |
|---|---|---|---|---|---|---|---|
| "1" | "0" | Even | Pos. | $T_{so} = \dfrac{T_{n-1}}{4}[3+|K_p|]$ | $T_{so} = T_{n-1}$ | $(\dfrac{T_{n-1}}{T_{n-2}})$ | $[\dfrac{(2-|K_p|)(3+|K_p|)}{8}]$ |
| "1" | "0" | Odd | Neg. | | | | |
| "0" | "1" | Forced Even | Pos. | $T_{so} = \dfrac{T_{n-1}}{2}[\dfrac{3-2|K_p|}{2+|K_p|}]$ | $T_{so} = T_{n-1}$ | $(\dfrac{T_{n-1}}{T_{n-2}})$ | $\dfrac{3-2|K_p|}{[2+|K_p|]^2}$ |
| "0" | "1" | Forced Even | Neg. | $T_{so} = \dfrac{T_{n-1}}{2}[\dfrac{3+|K_p|}{2-|K_p|}]$ | $T_{so} = T_{n-1}$ | $(\dfrac{T_{n-1}}{T_{n-2}})$ | $\dfrac{3+|K_p|}{[2-|K_p|]^2}$ |
| "1" | "1" | Forced Even | Pos. | $T_{so} = \dfrac{T_{n-1}}{4}[3+|K_p|]$ | $T_{so} = T_{n-1}$ | $(\dfrac{T_{n-1}}{T_{n-2}})$ | $(\dfrac{3+|K_p|}{4})$ |
| "1" | "1" | Forced Even | Neg. | $T_{so} = \dfrac{T_{n-1}}{4}[3-2|K_p|]$ | $T_{so} = T_{n-1}$ | $(\dfrac{T_{n-1}}{T_{n-2}})$ | $(\dfrac{3-2|K_p|}{4})$ |

To convert the above algorithms to the general form, substitute 4C for the numeral 3 wherever it occurs.

TABLE 5

| $T_{n-1}$ | $T_{n-2}$ | Conditions $T_{n-1}$ "0" | $K_p$ | First Order Solution | | Second Order Solution | |
|---|---|---|---|---|---|---|---|
| "0" | "0" | Even | Pos. | $T_{so} = \dfrac{T_{n-1}}{2}[\dfrac{3+|K_p|}{2-|K_p|}]$ | $T_{so} = \tfrac{1}{2} T_{n-1}$ | $(\dfrac{T_{n-1}}{T_{n-2}})$ | $[\dfrac{(2+|K_p|)(3+|K_p|)}{(2-|K_p|)^2}]$ |
| "0" | "0" | Odd | Neg. | | | | |
| "0" | "0" | Odd | Pos. | $T_{so} = \dfrac{T_{n-1}}{2}[\dfrac{3-2|K_p|}{2+|K_p|}]$ | $T_{so} = \tfrac{1}{2} T_{n-1}$ | $(\dfrac{T_{n-1}}{T_{n-2}})$ | $[\dfrac{(3-2|K_p|)(2-|K_p|)}{(2+|K_p|)^2}]$ |
| "0" | "0" | Even | Neg. | | | | |
| "1" | "0" | Forced Even | Neg. | $T_{so} = \dfrac{T_{n-1}}{4}[3-2|K_p|]$ | $T_{so} = T_{n-1}$ | $(\dfrac{T_{n-1}}{T_{n-2}})$ | $[\dfrac{(3-2|K_p|)(2+|K_p|)}{8}]$ |
| "1" | "0" | Forced Even | Pos. | $T_{so} = \dfrac{T_{n-1}}{4}[3+|K_p|]$ | $T_{so} = T_{n-1}$ | $(\dfrac{T_{n-1}}{T_{n-2}})$ | $[\dfrac{(2-|K_p|)(3+|K_p|)}{8}]$ |
| "0" | "1" | Odd | Pos. | $T_{so} = \dfrac{T_{n-1}}{2}[\dfrac{3-2|K_p|}{2+|K_p|}]$ | $T_{so} = T_{n-1}$ | $(\dfrac{T_{n-1}}{T_{n-2}})$ | $\dfrac{3-2|K_p|}{[2+|K_p|]^2}$ |
| "0" | "1" | Odd | Neg. | $T_{so} = \dfrac{T_{n-1}}{2}[\dfrac{3+|K_p|}{2-|K_p|}]$ | $T_{so} = T_{n-1}$ | $(\dfrac{T_{n-1}}{T_{n-2}})$ | $\dfrac{3+|K_p|}{[2-|K_p|]^2}$ |
| "1" | "1" | Forced Even | Pos. | $T_{so} = \dfrac{T_{n-1}}{4}[3+|K_p|]$ | $T_{so} = T_{n-1}$ | $(\dfrac{T_{n-1}}{T_{n-2}})$ | $(\dfrac{3+|K_p|}{4})$ |
| "1" | "1" | Forced Even | Neg. | $T_{so} = \dfrac{T_{n-1}}{4}[3-2|K_p|]$ | $T_{so} = T_{n-1}$ | $(\dfrac{T_{n-1}}{T_{n-2}})$ | $(\dfrac{3-2|K_p|}{4})$ |

To convert the above algorithms to the general form, substitute 4C for the numeral 3 wherever it occurs.

In FIG. 6, a discussion of the logic diagram for several embodiments, including that of the present invention will be described. In FIG. 6, the basic system clock, or timing pulse generator 1, is illustrated schematically as having one output. This output is a CP, or clock pulse output. Clock 1 comprises, for example, an oscillator operating at the basic system clocking frequency, for example, one megahertz and, although the oscillator should be stable, drift can be accommodated so long as it occurs gradually. The clock would also include suitable waveform shaping circuits to produce a steady train of, for example, narrow impulse type signals at the basic clocking (oscillator) frequency. The details of such an oscillator or multi-vibrator are well-known to those of skill in the art and will not be further illustrated or explained here. At various points in the logic diagram of FIG. 6, the connections to the basic clock 1 are illustrated as CP without the interconnecting circuit lines which would add undue confusion to the diagram.

Sensor 2, as has been discussed previously, should be understood as either a magnetic read head or an optical pickup system which is scanned across the appropriate type of two frequency code media to pick up the transitional signals making up the code. An equivalent system would receive a signal train of pulses from a communications channel. Sensor 2 does not, per se, form a part of this invention, but is a state-of-the-art piece of equipment which would be employed in generating the basic input signals for use in the invention.

Sensor 2 is connected to an amplifier and signal shaper 3 which is continuously activated. The output of amplifier 3 is a train of bipolar pulses, amplified and cleaned of spurious noise.

The primary signals from the amplifier and pulse shaper 3 are applied simultaneously to both an inverter 4 and to a cascode inverter (which requires two inputs to be "on") 5. The function of the inverter 4 is to take any negative-going pulses from amplifier 3 and invert them to positive-going pulses. The resulting pulses are applied to the cascode inverter 6 to produce negative-going pulses if the cascode inverter 6 is also activated by the absence of an "inhibit gate" signal coming from inverter 7. The output of the cascode inverter 6, which is negative-going, is inverted again in inverter 8 to produce a positive-going pulse. In this manner, positive logic can be utilized in the rest of the logic diagram. This pulse is identified as the negative pulse because it required a negative-going pulse at the input to inverter 4 to generate this output.

The input to the cascode inverter 5, when inverter 5 is also activated by the input from inverter 7 (which is the absence of an inhibit gate signal) takes positive-going pulses from amplifier 3 and inverts them to negative-going pulses. These signals are reinverted in inverter 9 to produce the positive pulse output.

Both the negative signal and the positive signal are applied to OR gate 10 and the output of OR gate 10 is the pulse $SP_0$, or the raw sense pulse, which is utilized for timing purposes at various points in the logic diagram as illustrated by the symbol $SP_0$. The interconnecting circuit lines are omitted for simplicity. The $SP_0$ output is also applied to a pulse delay unit 11 to generate the delayed pulse signal $SP_1$. This signal in turn, is applied to delay unit 12 to generate the delayed signal $SP_2$ which is, in turn, delayed in delay unit 13 to generate signal $SP_3$ which is again delayed in unit 14 to develop pulse $SP_4$. Pulses $SP_1 - SP_4$ are also utilized for timing purposes at various points in the diagram as indicated.

In FIG. 6, the initial pulse signal $SP_0$, and the four delayed derivatives of it, are utilized in clocking the various circuit elements of FIG. 6. This assures that the sequence of on and off states of the various devices is conducted with sufficient time between changes to stabilize, as is well-known to those of skill in the art of logic design.

With the occurrence of sensing the first pulse $SP_0$, the 1 which is resident in the zero stage of register 16 is shifted to the first stage and, at the occurrence of the first delayed pulse $SP_1$, AND gate 17 is activated. The output of AND gate 17 is used to produce the terminal data register reset signal X, which is utilized elsewhere in the logic diagram. Also, the output of AND gate 17, through OR gate 18, is used to set the count gate latch 19 to the "on" condition. This, through AND gate 21, starts the $T_n$ register, counter 20, counting each clock pulse CP which is fed through AND gate 21. The $T_A$ register 22 is not started counting at this point since two preamble bits are being used in this embodiment and the $T_A$ count will not be started until the first time slot in the second preamble bit (begun at the third pulse $SP_0$). However, as discussed in detail in my co-pending application, the use of either half of either preamble bit for measuring $T_A$ is arbitrary.

At the occurrence of the second pulse $SP_0$, the 1 which is resident in the first stage of shift register 16, is moved to the second stage. At the occurrence of the first delayed pulse $SP_1$ from the second pulse $SP_0$, AND gate 23 is activated. AND gate 23 sets a fixed delay gate 24, which is a univibrator, to the "on" condition. The "off" condition output of delay gate 24, which occurs after the fixed delay period, is differentiated in unit 25 to produce a pulse for signalling the end of the fixed delay period, "FDG".

At the occurrence of the third sense pulse $SP_0$, the 1 in the second stage of shift register 16 is moved to the third stage. AND gate 26 is activated at the occurrence of the first delayed pulse $SP_1$ from the third sense pulse $SP_0$. The output of AND gate 26 is applied, through OR gate 27, to reset the count gate latch 19. This stops the counting, via AND gate 21, of clock pulses in the $T_n$ register, counter 20.

AND gate 26 is also connected to the $T_A$ count gate latch 29 to start, through AND gate 30, the counting of clock pulses CP in the $T_A$ register, in counter 22. AND gate 26 also connects to OR gate 31. This drives the multiple AND gates 32 to gate the content of counter 20 to the $T_{n-1}$ register 33. Also, AND gate 26, through a connection to OR gate 34, which sets the second indicator 35 to the 1 state. The count $T_n$ is also applied on N lines, to the $T_{n-1}$ register 43 in the $K_p$ computation block 44. The count $T_n$ is further applied, on N lines, to the $T_{n-1}$, $(T_{n-1})/2$ and $(T_{n-1})/4$ registers 45, 46 and 47, respectively, contained in the algorithm computation unit 48.

The 1 in the third stage of the sense pulse register 16 is also utilized to activate, coincident with the second delayed pulse $SP_2$, an AND gate 36. Upon coincidence with the third delayed sense pulse SP, the third stage of register 16 is used to activate AND gate 37. The output of AND gate 36 is fed, via OR gate 39, to gate the output of the $T_{n-1}$ register counter 33, via AND gates 40, to the $T_{n-2}$ register 41.

At the occurrence of the third delayed sense pulse $SP_3$ and the coincidence with a 1 being in the third stage of sense pulse shift register 16, AND gate 37 is activated. This, via OR gate 49, resets the $T_n$ count register 20, and, through OR gate 50, it resets the $T_{n-1}$ register 33. Also, through multiple AND gates 51, it transfers the content of the $T_{n-2}$ register 41, to the $T_{n-2}$ register 52 in the $K_p$ block 44, and to the $T_{n-2}$ register 53 in the algorithm unit 48.

At this point in time, the measurement for the length of the first full preamble bit, the count stored in the $T_n$ register 20, has been completed, loaded into the algorithm function block 44 for $K_p$, and shifted into the $T_{n-1}$ register 33, and into the $T_{n-2}$ register 41.

At the occurrence of the fourth delayed pulse $SP_4$ derived from the third sense pulse $SP_0$, AND gate 38 is activated. The output of AND gate 38 is utilized, via OR gate 18, to set the $T_n$ count gate 19 to start counting for measuring the next symbol.

At the occurrence of the fourth sense pulse $SP_0$, the 1 in the sense pulse shift register 16 is shifted to the fourth stage. Upon coincidence with the first delayed pulse $SP_1$, this activated AND gate 54. The output of AND gate 54 produces the following results. It is applied, to latch 29, to end the $T_A$ count, through AND gate 30, of clock pulses in the $T_A$ register counter 22. This is done since this is the end of the first time slot in the second preamble bit, and the width of the first time slot in this preamble bit is defined, for use here, as $T_A$.

The output from the fourth stage of the sense pulse register 16 is also utilized, coincident with the second delayed pulse $SP_2$, to activate AND gate 56. The output of AND gate 56 gates the output of the $T_A$ register counter 22, via AND gates 57, on N parallel lines to the $T_A$ register 58 contained in the $K_p$ function block 44. The N lines are shifted 1 high order bit to create a 2 × $T_A$ content in register 58.

When the fourth stage of register 16 is "on," AND gate 59 is activated, at the occurrence of the fourth delayed pulse $SP_4$, to set the reference pulse gate latch 60 to the "on" condition. This establishes a gate to admit the next pulse from the sensors. This is the reference pulse. It is used to determine the polarity and content of the first data pulse which will follow the reference pulse. This is done in a polarity comparison unit 61 which is shown separately in FIG. 9.

At the occurrence of the fifth sense pulse $SP_0$, which is the end of the second preamble symbol and also the reference pulse, the fifth cell of shift register 16 is activated. This produces an output ⑤ which is utilized as a timing and condition signal at several points in the logic diagram. Also, coincident with the first delayed pulse $SP_1$ from the fifth sensed pulse $SP_0$, AND gate 62 is activated. This, via OR gate 27, resets the count gate latch 19 and halts the counting, through AND gate 21, of the $T_n$ register counter 20. This is the end of the second preamble bit.

At $SP_1$ time, the output of the fifth stage of counter 16 is applied to AND gate 62 as noted above. The output of AND 62 is used, through OR gate 63, to set the elapsed time latch 64. This, through AND gate 65, starts the counting of clock pulses in counter 66 to measure the elapsed time from the start of data. Also, the output of AND gate 62 is applied to OR gate 67 to set the $T_{n-1}$ latch 68, or first indicator, to the 1 state. The output of AND gate 62 also is applied to OR gate 69 to set the odd-even indicator 70, to the even state, ⓠ.

The output from the fifth cell of shift register 16 is also applied to AND gates 71, 72 and 73. AND gate 71 is activated at the occurrence of the second delayed pulse $SP_2$. Its output is utilized, through OR gate 31, to gate the output of the $T_n$ register 20 through AND gates 32 as before.

The output from the fifth cell of register 16 is also applied to AND gate 72. Upon coincidence with the third delayed pulse $SP_3$, provides an output which, via OR gate 77, resets the $T_A$ register counter 22.

The AND gate 73 is activated by the 1 in the fifth cell of register 16 at the occurrence of the fourth delayed pulse $SP_4$. This signal is utilized, via OR gate 18, to set the count gate latch 19 to the "on" condition. This restarts, through AND gate 21, the $T_n$ register counter 20 counting again.

AND gate 80, coincident with the occurrence of a clock pulse CP and the ⓢ signal, will reset the reference pulse gate latch 60, which ends the reference pulse gate.

When the sixth pulse is sensed, the 1 in the shift register 16 moves to the sixth stage. This has the effect of deconditioning AND gate 15 to stop further shifting of register 16. Also, the 1 output of the sixth stage of register 16 is utilized, as shown by the symbol ⑥, for several functions. This indicates to the system that the preamble symbols have been read and that all following pulses passed to the decoder will be symbol boundary pulses.

When AND gate 65 passes clock pulses CP, the elapsed time counter 66 counts them during the time that the calculation of the predicted inhibit gate termination time is being done in block 48. When the inhibit gate prediction is completed in block 48, a completion signal ⓣ is issued which is applied to reset latch 64 to stop the elapsed time counter 66 before the occurrence of the next symbol transition, sense pulse $SP_0$. Signal ⓣ also operates AND gates 85 to feed the output from the predicted inhibit gate termination time register 86 and from the Δ value unit 74 on N lines in parallel to the predicted inhibit gate termination time register 87 and to the search gate termination (or inhibit gate start) register 42, respectively. The ⓣ signal is also applied to a delay unit 88 which, after a brief delay, causes a reset through OR gate 89 to reset the $T_{ta}$ register 86. The delayed signal ⓣ is also applied to reset the algorithm selector control logic box 90. These actions reset the algorithm selector and the inhibit gate prediction time units to zero, permitting their use for the next symbol time $T_n$.

The subtractor unit 91 then calculates the difference between the content of the predicted inhibit gate termination time, from register 86, and the elapsed time from counter 66. The result is outputted on N parallel lines via AND gate 92. The result is loaded in parallel into the inhibit gate termination register (or search gate start register) 93, which starts counting down when the internal clock pulse signal from the subtractor unit is applied to the countdown gate latch 94, which sets AND gate 95 "on" and starts the inhibit gate termination register 93 counting down at the rate of clock pulses, CP. The internal clock from the subtractor unit is used via OR gate 39, to gate the output of the $T_{n-1}$ register 33, via AND gates 40, to the $T_{n-2}$ register 41. This same clock pulse, delayed slightly in delay unit 96, is utilized through OR gate 100, to reset the elapsed time counter 66, the $T_{n-1}$ latch 68 through OR gate 97, to the "off" position. Also, via OR gate 50, this delayed pulse is used to reset the $T_{n-1}$ register 33 to 0. The undelayed clock pulse, as utilized previously, gates the outputs of the $T_{n-1}$ latch 68 through AND gates 98 and 99 and OR gate 34 into the $T_{n-2}$ latch 35 inputs so that, at the time the $T_{n-1}$ latch 68 is set to the "off" position by the delayed pulse from delay unit 96, the content of latch 68 has already been transferred into the $T_{n-2}$ latch 35.

The zero side of the $T_{n-1}$ latch 68, indicating 0, is applied to the algorithm selector control 90. The 0 output from the $T_{n-1}$ latch 68 is transferred via AND gate 98 to the $T_{n-2}$ latch 35 if the $T_{n-1}$ latch is in the 0 state when the initial clock pulse occurs coming from the subtractor unit. The 0 output from the $T_{n-2}$ latch 35 is utilized to provide an input into the algorithm selector control box 90.

With the inhibit gate termination register 93 counting down, eventually all the stages of this register, except for the least order bit, reach 0. When this occurs, AND gate 101 is activated to provide a reset to the inhibit gate latch 79. When the content of the inhibit gate termination register 93 reaches 0, AND gate 102 is activated to reset the countdown gate latch 94 to await the start of the next inhibit gate. By this means, the inhibit gate termination register is left in the empty state. This also generates the ⓢ signal.

The output ⓢ from AND gate 102 is utilized to set the countdown gate latch 75 to the "on" condition. Then, through AND gate 76, the search gate termination register (or inhibit gate start register) 42 will be counted down at each clock pulse. This is required since at the fifth pulse $SP_0$, data begins and it is necessary to start the "inhibit" gate (or end a "search" gate) a short time after data begins.

The inhibit gate start register (or search gate termination register) 42 counting down finally reaches the condition in which all but the last, or lowest order bits, are 0. At this point, AND gate 78 is activated at the next clock pulse CP to produce an output which sets the search gate latch 79 to the "off" condition to start the inhibit gate for the center pulse or end the search gate for the symbol boundary. This raises the inhibit gate signal used at several points in the diagram.

When all bit positions in register 42 are zero, AND gate 110 is activated to reset the count gate latch 75 and end counting down of register 42.

The output of AND gate 102 is also applied to an AND gate 103. Gate 103 is fully activated when $2^n$ shift pulses have occurred, by the content of the shift pulse counter 84 via OR gate 104, to set a delay univibrator 105. The output of delay 105 is differentiated in unit 106 to provide the reset ⓡ signal. OR gate 104 has three other inputs to drive it to create the ⓡ signal. They are the fixed delay gate (FDG) pulse from the differentiator 25, the output from AND gate 107, and an ERROR indication if an error occurs. AND gate 107 is activated by the binary content of counter 84 and the $SP_0$ pulse.

When the shift pulse counter 84 has counted enough shift pulses to make up a complete $2^n$ code, n being arbitrary, and an inhibit gate is not present, the next pulse sensed, $SP_0$, applies to create a reset ⓡ via AND gate 107, as stated above. This signal is applied through OR gate 104 and activates the univibrator 105 whose output is differentiated in differentiator 106 to provide a reset signal ⓡ which resets all the elements in the system where the ⓡ symbol is present. The reset signal is also used to gate the content of the data shift register 83, via AND gates 108, to the terminal data register 109.

Several other control functions occur as follows. At the first delayed pulse $SP_1$ and with a 1 shifted into the sixth position of register 16, AND gate 113 is activated to set, through OR gate 63, the elapsed time counter gate 64 to the "on" position to begin counting elapsed time in counter 66. Also, AND gates 114 and 115 are activated to pass the 0 or 1 data from the data latch 116 to set the first indicator 68 to the 1 or 0 condition through OR gates 67 and 97, respectively. Also, AND gate 117 is activated to reset, through OR gate 27, the $T_n$ count gate latch 19 to stop counting pulses to measure $T_n$ in counter 20. Also, in the presence of a ⓥ signal from the odd-even indicator 70, indicative of an "odd" state, AND gate 118 is activated at this time. It transfers the contents of the $K_p$ polarity latch, or indicator, 119 to the temporary $K_p$ polarity indicator 120, through AND gates 121 and 122, respectively. This is done to facilitate reversing the $K_p$ polarity to account for an odd 0 following the last sensed 1 as described in detail in my aforementioned application Ser. No. 522,210. Additionally, at every occurrence of an $SP_1$ pulse, (after the occurrence of the fifth sensed pulse $SP_0$ which means data will be in latch 116) or the third sensed pulse $SP_0$ if only a single preamble symbol is used, AND gates 123 and 124 are activated to pass the 1 and 0 content of data latch 116 to the input cell of data register 83.

Note that all $SP_0$ signals which correspond to the double frequency signal transitions in the data stream are blocked by an inhibit gate function ⓘⓖ applied through inverter 7 to inverters 5 and 6, which operate as AND gates. This is done to prevent loading any 1 or 0 content which would otherwise be read if the double frequency pulses were passed to the decoder 61 which interprets only the symbol boundary pulses as previously discussed.

As discussed previously, the IG signal is generated by inverter 188 under control of the inhibit gate start register (SGTR) 42 and the inhibit gate termination register (SGSR) 93 which are, in turn, controlled by the predicted inhibit gate length algorithms of Table 1A, 1B or 1-5 of my copending application chosen according to the conditions of Tables 1-5 as discussed with relation to my copending application Ser. No. 522,210, where these algorithms are used for the inverse function as 2F "search gate" predictions as was discussed above.

At the second delayed pulse $SP_2$, and with a 1 in the sixth cell of register 16, AND gate 112 is activated. This controls, through OR gate 31 and AND gates 32, the transfer of the count in the $T_n$ register 20 to the $T_{n-1}$ registers 33, 43, 45, 46, & 47. Also at this time, AND gates 125 and 126 are activated to pass the 1 or 0 content of latch 116 to the odd-even indicator 70 through OR gate 69 to force indicator 70 to "even" if a 1 is present, or to set it to its opposite state if a 0 is present. Also, in the presence of a ⓥ signal from the odd-even indicator 70, AND gate 127 is activated to transfer the contents of the temporary $K_p$ indicator 120 through AND gates 128 and 129 back to the $K_p$ polarity latch 119, in inverted order, to change, through OR gates 130 and 131, the polarity indicated in latch 119. The original polarity of $K_p$ is entered at CP time following the completion of the comparison in comparator 132 whose output is passed by AND gates 133 and 134 through OR gates 130 and 131.

Also at every $SP_2$ pulse during the time a 1 is in the fifth cell of register 16, and both the first and second indicators 68 and 35, respectively, are both in the 1 state, AND gate 135, a preamble bit condition indicator, is activated. This gives an output used to determine whether $K_p$ is to be computed since two 1's are necessary to calculate a value for $K_p$. This choice is accomplished as follows. The output of AND gate 135 is applied to AND gates 136 and 137. These gates are controlled by the output of a switchably controlled latch 138 whose state is determined by the setting of selector switch 139. Switch 139 determines whether it is necessary to compute a spread coefficient $K_p$. If a magnetic recording is being interpreted, the $K_p$ computation is not always necessary. If a $K_p$ computation is not selected, AND gate 136 deactivates AND gates 140 and 141. AND gate 140, if activated, gives the compute $K_p$ command to the $K_p$ unit 44, to the comparator 132 and to the computation unit 142 at the $SP_0$ pulse. AND gate 140 is activated by $SP_0$, plus the output of AND gate 136 and the "yes" output of latch 143, which is set by selector switch 144, which allows the choice of whether $K_p$ is to be computed or not. AND gate 141 resets, through OR gate 145, the $T_{n-2}$ register 52 and $T_{n-1}$ register 43 and the $2 \times T_4$ register 58, when no $K_p$ computation is to be done. Also, this output is used to force the polarity of the $K_p$ latch 119 positive through OR gate 130 so that a choice of algorithm can be made, even though no value for $K_p$ is computed. The output of AND gate 141 also is used, through OR gate 146, to reset the $K_p$ register 147 in the algorithm computation unit 48.

Also at the $SP_2$ pulse, in the presence of an output ⓩ from data gate latch 148, AND gate 149 is activated to reset, through OR gate 145, the $T_{n-2}$ register 52, $T_{n-1}$ register 43 and the $2 \times T_4$ register 58, whenever both indicators 68 and 35 are in the 1 state. This is done because it is necessary to clear the registers prior to receiving new measurements at $SP_3$ time for computing a new value for $K_p$, if required.

AND gate 150 is activated by the 1 output from the indicators or latches 68 and 35 to provide, through inverter 151, an input to AND gate 152 whenever two 1's are not present and $K_p$ will not be computed, which provides an input through OR gate 153 to the algorithm selector control 90 at $SP_3$ pulse time, coincident with a data gate signal from latch 148, to allow a selection of an algorithm during data bits when no $K_p$ computation is being done.

At the completion of the $K_p$ computation in unit 142, its result is outputted on N lines through AND gate 154 to the $K_p$ register 147. The "computation completed" signal from unit 142 is applied to AND gate 154 to activate it and also to a latch 155 to set it to the "on" condition. This signal is also applied to a delay unit 156, whose output is applied, together with the "on" output of latch 155, to an AND gate 157 to provide an input to the algorithm selector control 90. This instructs the selector to choose an algorithm for predicting the proper termination time of an inhibit gate whenever $K_p$ has been computed.

Other controls are as follows. At the occurrence of the third delayed pulse $SP_3$, and with a 1 in the sixth cell of register 16, AND gate 158 is activated to provide an input through OR gates 77 and 49, respectively, to reset counters 20 and 22.

At the fourth delayed pulse $SP_4$, and with a 1 in the sixth cell of register 16, AND gate 159 is activated to provide an input through OR gate 18 to the count gate latch 19 to start counting in counter 20.

When the first inhibit gate signal (IG) from inverter 188 is present and a 1 is in the fifth cell of register 16, and a clock pulse occurs, AND gate 160 sets the data gate latch 148 to the "on" condition through a delay unit 161.

In the event that a negative result from the elapsed time compensator, subtractor unit 91, occurs, the pulse issued is an "error" signal because the computation has run beyond the time for terminating the inhibit gate. This error signal, delayed slightly in unit 162 to allow stabilization of the system, is applied as a system reset signal (R) at numerous points in the figure as shown.

After register 16 has a 1 in the sixth cell, the following occurs. The countdown of the inhibit gate start register 42 begins when AND gate 102 detects all 0's in the inhibit gate termination register 93. Also, via AND gate 112 and OR gate 31, the count in the $T_n$ register 20 is transferred, via AND gates 32, to the $T_{n-1}$ registers. This is done for the following reasons.

First, this is the first symbol transition after the end of the second preamble bit. At this and at every data symbol ending, it is necessary to open the count gates to begin counting CP's for the receipt of data. This is done at every major symbol transition thereafter. The intermediate transitions, if any, are blocked by the inhibit gate when it is on and the major transitions are allowed through by the not inhibit gate signal at inverter 7.

By referring to the timing diagram FIG. 4 and to the logic flow chart FIG. 5, the operation of the embodiment in FIG. 6 may now be understood to follow the following general pattern: when the system senses the start of pulses, the pulses are counted until sufficient pulses have been accumulated to determine that the first preamble bit has been sensed. Also the period of time for the first three pulses to be sensed is measured as a number of clock pulses and is stored for further use as $T_{n-2}$ in the $K_p$ algorithm unit. The next two clock pulses are also awaited and the first time slot in the second preamble bit, $T_A$, is measured as a count of clock pulses. It, too, is stored for the computation of $K_p$. When the fifth pulse is sensed, the end of the two preamble bits has been reached and the start of data is at hand. Appropriate steps are taken to set the data gate latch and to start timing in the various measuring registers and to start calculating a predicted inhibit gate termination time based on the two preamble bits which have been read. Also, since the second preamble bit has been measured, its time, defined as $T_{n-1}$ and the previous $T_{n-1}$ time, defined as $T_{n-2}$ in the $K_p$ algorithm unit, are utilized so that $K_p$ may be calculated. When $K_p$ has been calculated, and an appropriate algorithm based on the condition that $T_{n-1}$ is a 1, $T_{n-2}$ is a 1, the polarity of $K_p$ is as calculated, and the odd-even flip flop will be set to the even state, the appropriate algorithm in the algorithm unit is run using the calculated $K_p$ and the two measured $T_{n-1}$ and $T_{n-2}$ periods. This determines when the inhibit gate should theoretically be terminated following the occurrence of the fifth pulse $SP_0$. Since the time to do these various calculations goes on simultaneously with the inhibit gate, an elapsed time count is also maintained for the duration of the inhibit gate until the calculation has been completed. The time utilized in computation is then subtracted from the predicted inhibit gate termination time to provide the corrected inhibit gate termination time. When this time has elapsed, the inhibit gate is discontinued. If a pulse is sensed during the time that the inhibit gate is on, it is blocked in this system and the various latches are not affected. The system then continues measuring the time periods. In general, the mode of operation is as follows:

At the start of each data bit, an elapsed time count is begun, an inhibit gate is activated, and calculations are performed to predict the ideal length for the inhibit gate. When the result is computed, it is compared, by subtraction, with the elapsed time. A positive result, indicative of the time yet to run to inhibit gate termination, is stored in a counter which is then counted down. At the count of zero, or nearly zero, the inhibit gate ends. If a pulse occurred, (as one always should) during the time the inhibit gate was not on, a 1 or a 0 is stored in the data shift register following the polarity comparison decode operation, and operation proceeds as detailed above.

As is apparent in FIG. 6, the apparatus is designed to maintain an account of two symbol transition periods. The account kept is a record of the sign of $K_p$ and of the states of $T_{n-1}$ and $T_{n-2}$, whether a 0 or a 1, and the lengths of the periods $T_{n-1}$ and $T_{n-2}$. The algorithms of Tables 1–5 and 1A and 1B show these conditions (except for the lengths of $T_{n-1}$ and $T_{n-2}$) as the selective factors for choosing which algorithm is to be applied for a given inhibit gate prediction. It will be apparent that the spread factor $K_p$ has different effects if it is positive or negative, and has a varying effect depending on whether it is applied to a 0 or a 1. The type of effects and the order in which these effects occur was discussed fully in my copending application Ser. No. 522,210.

System measurements and computations are utilized to determine the phase of a binary 1 along with the degree of print spread which can occur. As has been discussed fully in my copending application noted above, the degree of print spread is determined by the value of the spread coefficient $K_p$. As is already known, $K_p$ can have a magnitude in the range $0 \leq K_p \leq 1$. The polarity of the spread coefficient $K_p$ is derived from the time measurements made on the various widths of the signal transition periods, as previously discussed, and results in either a positive or a negative spread being calculated as previously shown. The effect of print spread is to distort the measured width of an F2F type 0 symbol, while the width of binary 1's in this coding scheme remains constant, regardless of the phase of the 1's.

The distortionless (considering spread only) property of the F2F type coded 1 symbol is utilized in this invention.

The width variation of 0 symbols in the F2F code format, given a print spread positive or negative, requires keeping track of whether the 0 symbol following the last 1 is odd or even in the chain of 0's following the 1. It also requires keeping track of whether the last referenced 1 is a "phase A" or a "phase B" type of 1. For example, given $K_p$ positive, the measured width of odd 0's after a "phase A" type 1 will be wider than the unspread 0. Conversely, the even numbered 0's which occur since the last referenced 1, are measured to be narrower than the ideal or unspread 0. The opposite situation occurs for the same 0's following a 1 which happens to exhibit a "phase B" characteristic.

The situation is illustrated in FIGS. 28A and 28B of my copending application and will not be repeated here.

The first and second order inhibit gate prediction algorithms given in Tables 1A, 1B and 1–5 utilize the spread constant $K_p$ in the calculations. The magnitude and polarity of the spread constant $K_p$ is always, at a minimum, measured and computed by the use of one or two preamble bits or one or two data 1's, which are provided at the start of each F2F coded character sequence, or which occur in the data stream.

As previously discussed, the preamble bits are binary 1's. It should be clear that they must be "phase A" ones which have a bar in the first time slot so that the start of the time slot will be properly detected.

Turning to the system in FIG. 6, it will now be understood that in my copending application the $T_{n-1}$ odd-even flip flop 70 keeps track of whether the referenced 1 is a "phase A" or a "phase B" 1. In this manner, two flip flops were utilized in one preferred embodiment in my copending application in order to simplify understanding the system operation. As will be readily apparent to those who understand the present system, measuring $T_{n-1}$ is equivalent to measuring $T_{n-2}$ for the next succeeding time period, since the measurement $T_{n-1}$ in the present time frame becomes $T_{n-2}$ in the next succeeding time frame. Given this consideration, it is apparent that a single odd-even flip flop can be used to keep track of the odd-even status of a $T_{n-1}$ 0 bit, in addition to controlling the phase designation of the referenced 1 bit.

Tables 3, 4, and 5 of my copending application Ser. No. 522,210 list algorithm conditions needed to control the choice of the prediction algorithm given in a single odd-even flip flop as embodied in FIG. 6 herein. The algorithm selection conditions are noticably different from those shown for the two flip flop system utilized in Tables 1–2. Three of the four conditions are similar in both systems, i.e., the binary states of the $T_{n-1}$ and $T_{n-2}$ latches, and a column which identifies the polarity of the computed spread coefficient $K_p$. However, the state of the odd-even indicator listed in Table 3 is the reverse of that listed in Table 2. The reversal is obvious, since $T_{n-2}$ time is always adjacent to a $T_{n-1}$ time. For example, if $T_{n-2}$ and $T_{n-1}$ are both 0's, and $T_{n-2}$ is odd, it follows that $T_{n-1}$ must be even and conversely, if $T_{n-1}$ is even, $T_{n-2}$ must be odd. The difference which exists between the conditions given in Table 2 and Table 3 is that the $T_{n-1}$ odd-even state is substituted for the $T_{n-2}$ odd-even state in Table 3.

In the system in which the algorithm choice is governed by the conditions of Table 3, the odd-even flip flop serves the dual purpose of: keeping track of whether the 0 in the $T_{n-1}$ time slot was odd or even and if not a 0, the flip flop is forced to the even state, since any succeeding 0 following the 1 that must be present will, of course, be odd. Secondly, the flip flop, if it is odd and is sensed in the interval $T_n$, the $K_p$ polarity latch is reversed using the flip flop as the gate function so that the proper reversal and sign to account for the difference in phase A or phase B 1's will be taken account of.

An actual logic diagram which would be built to utilize the single flip flop instead of two, has been illustrated in FIG. 6 using the indicator 70.

Returning momentarily to FIG. 5, it will be observed that a plurality of symbols which have a circle, a normally open switch, and a symbol S in the circle, are shown at various points or on particular functional boxes in the flow chart of FIG. 5. The purpose of the S switches is to short out, or logically disable, the specific function illustrated or to connect or disconnect functions illustrated according to whether the switches are shown normally opened or closed. All of the normally open switches would be closed and all of the normally closed switches would be opened to modify the diagram in FIG. 5 to illustrate a system which corrects for acceleration only without any correction for spread. Such systems might be used, for example, for magnetic stripe or card readers or for a communications channel in which spread might not be present.

FIG. 32 of my copending application illustrates the algorithm selector which would be utilized for a system for which it is desired to do acceleration and spread corrections. The algorithm selector portions of FIGS. 31 and 32 of my copending application which lie between the boxes labeled A and C are intended to be inserted between the same boxes labeled A and C on FIG. 5 to complete it, in the event that it is desired to use the system described in FIG. 5 for spread only, or for spread and acceleration combined corrections, as appropriate. Also, if it is desired in either of the flow charts in which spread and acceleration corrections are made, the improved formula for the computation of $K_p$ which accounts for acceleration in the $K_p$ computations may be utilized as described in my copending application.

Figure 9:
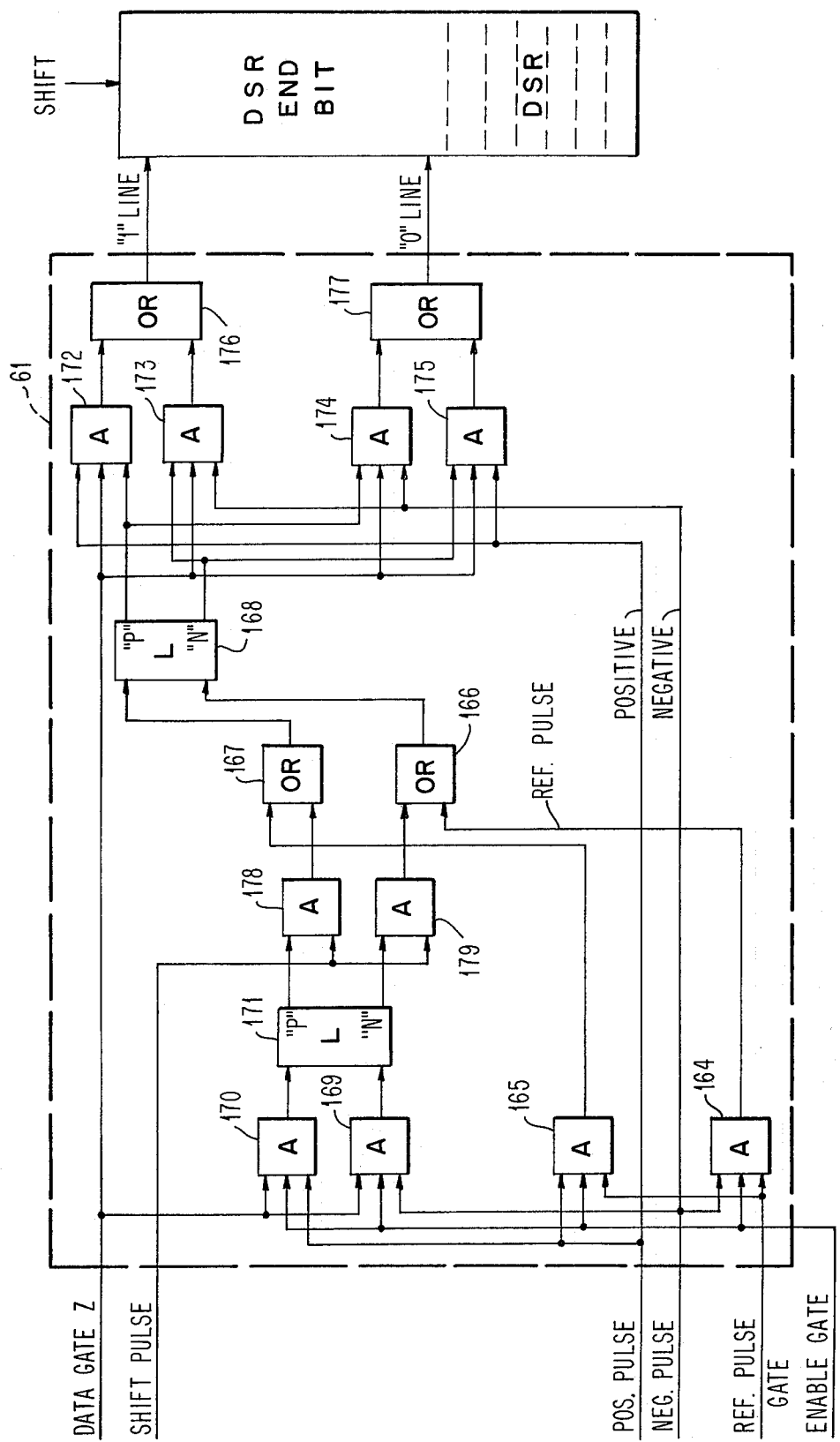
FIG. 9 illustrates, in schematic form, the logic of a polarity comparison decoder for use in FIG. 6.

Turning now to FIG. 9, a schematic diagram of a functional logic circuit for the polar comparison decoder unit 61 shown in FIG. 6 will be given. The inputs to the decoder 61 are the data gate signals Ⓩ, the reference pulse gate signal from the pulse generator 60, and the positive and negative outputs Ⓟ and Ⓝ from the inverters 8 and 9, processing the incoming signals from amplifier 3. A shift pulse from the shift pulse driver 82 is also applied as shown. The method of operation for the decode technique used is as follows.

The polarity of the referenced pulse is stored temporarily and the first data pulse is compared with it. If the first data pulse has a polarity that matches that of the referenced pulse, a 1 is decoded. If the first data pulse has a polarity which does not match that of the referenced pulse, a 0 is decoded. Following this operation, the polarity of the reference pulse is no longer stored and the polarity of the first data pulse is stored as the reference for the second data pulse, and so on. Since the 2F, or double frequency pulses, are inhibited by the presence of the inhibit gate signal from passing through to the positive and negative inputs of the decoder 61, the data information is encoded at the symbol boundary transitions which signals are passed through as positive and negative input signals to decoder 61. The decoder 61 interprets the polarity of the signals in a way which makes them correspond to the F2F coded data ordinarily written by the presence or absence of the central or 2F transition pulse in an F2F data stream. By encoding the data at the symbol boundary transitions, in the form of signal polarity reversals, the characteristics of F2F code which make it possible to measure and correct for spread and/or acceleration effects are utilized and any time dependence or distance dependence of the decode technique is eliminated. The use of the algorithms for predicting the proper end of the data inhibition time to block out the central of 2F transition signal pulses is made possible by the use of the F2F code format as discussed in my previously noted copending application Ser. No. 522,210. By utilizing the polarity comparison decode or encode techniques, the data may be encoded directly in the form of polarity reversals in the signal stream which are not dependent on time, scanner velocity, or print spread. Although the resulting encoded F2F data stream may become distorted, as is apparent from the nature of the F2F code, it can be corrected as taught in my previous application Ser. No. 522,210 because of the unique characteristics of utilizing binary 1's as initial measuring symbols from which spread and acceleration correction factors may be derived as taught.

The circuit in FIG. 9 serves to decode the incoming polarity signals by comparison one with another as follows.

When the referenced pulse gate 60 is on, the signal is applied to AND gates 164 and 165 so that the occurrence of either a positive pulse output from the amplifier 3 or a negative pulse output will activate the appropriate AND gate 164 or 165. The outputs of AND gate 164 and 165 are applied, through OR gates 166 and 167, to set a temporary memory or latch 168 at the same time, the incoming positive or negative input pulse is applied to AND gates 169 and 170 which are activated when the data gate signal is on. This loads the temporary register or latch 171 with the polarity of the first data signal received after the receipt of the reference pulse which is defined to be a pulse admitted during the time the reference pulse gate signal is on.

Temporary memory 168 has the polarity of the reference pulse set into it as previously noted. Its output either on the Ⓟ or Ⓝ line, as shown, is then compared with the first incoming data pulse in the AND gates 172 through 175. If the first data pulse happens to be positive, it will be applied to AND gates 172 and 175, both of which will also receive an input from the data gate signal. However, only AND gate 172 will be fully activated since it receives its third input from the positive output of temporary memory 168. This will give an indication via OR gate 176 that a 1 has been decoded. In the alternative, if the reference pulse happens to have been negative, and the first data pulse was also negative, AND gate 173 would be fully activated to produce a similar one output. If the reference pulse is not of the same polarity as the first data pulse, either AND gate 174 or 175 will be fully activated and the zero output line will be signalled through OR gate 177.

Following the comparison in AND gates 172 through 175 of the first incoming data pulse with the reference pulse, a shift pulse is applied to AND gates 178 and 179 to load the output from temporary memory 171 into memory 168. It will be recalled that the contents of temporary memory 171 is the polarity of the first data pulse. This polarity is now loaded into temporary memory 168 and serves as the reference pulse for the second data pulse when it arrives. The second data pulse is loaded into temporary memory 171 and becomes, following the next shift pulse, the reference pulse (or reference polarity) for the third data pulse, and so on.

As will be apparent to those of skill in the art, what has been accomplished by encoding and decoding the F2F data by means of polarity reversals at the symbol boundaries is that the desirable characteristics of F2F code, which enable corrections and adjustments to be made for acceleration and print spread, can be maintained and utilized to block out the central transition or double frequency pulse which can be polarity compared with a reference for decoding purposes. This is superior to the normal type of F2F encoding and decoding where the presence or absence of a signal during a search gate is regarded as the significant data event. In the present system, clocking is easier to maintain because a data pulse must be received at each symbol, or else an error has occurred.

It will be apparent that what has been described is a truly universal F2F code reading method and apparatus which can handle either optical or magnetic code systems with print spread and acceleration, or either individually. It is also apparent that a whole new system need not be constructed to employ this invention. For example, in given systems which have already built a sensor and an amplifier, etc., to produce the F2F signal transitions as a record bearing medium is scanned, or F2F data is received from a communications medium, one need only build the circuitry of the appropriate logic diagram from the present invention, attach it to the output of the sense amplifier, and let the output of the circuit so produced be the code output to a using system. This is to say, that the present invention as an F2F code reading and interpreting system and apparatus, stands alone and apart and may be plugged in at will to existing systems with full effect.

What follows will be a description of a flow diagram, in schematic form, which defines an embodiment of this system built to operate according to the method illustrated in line E of FIG. 10. Following the discussion of the schematic flow chart, a logic diagram of a preferred embodiment of the invention constructed to carry out the same method will be illustrated and discussed. Modifications to the logic diagram and to the flow chart to accommodate the systems illustrated on line D will also be given, as will a description of a flow chart showing the operation of such a system.

Figure 15B:
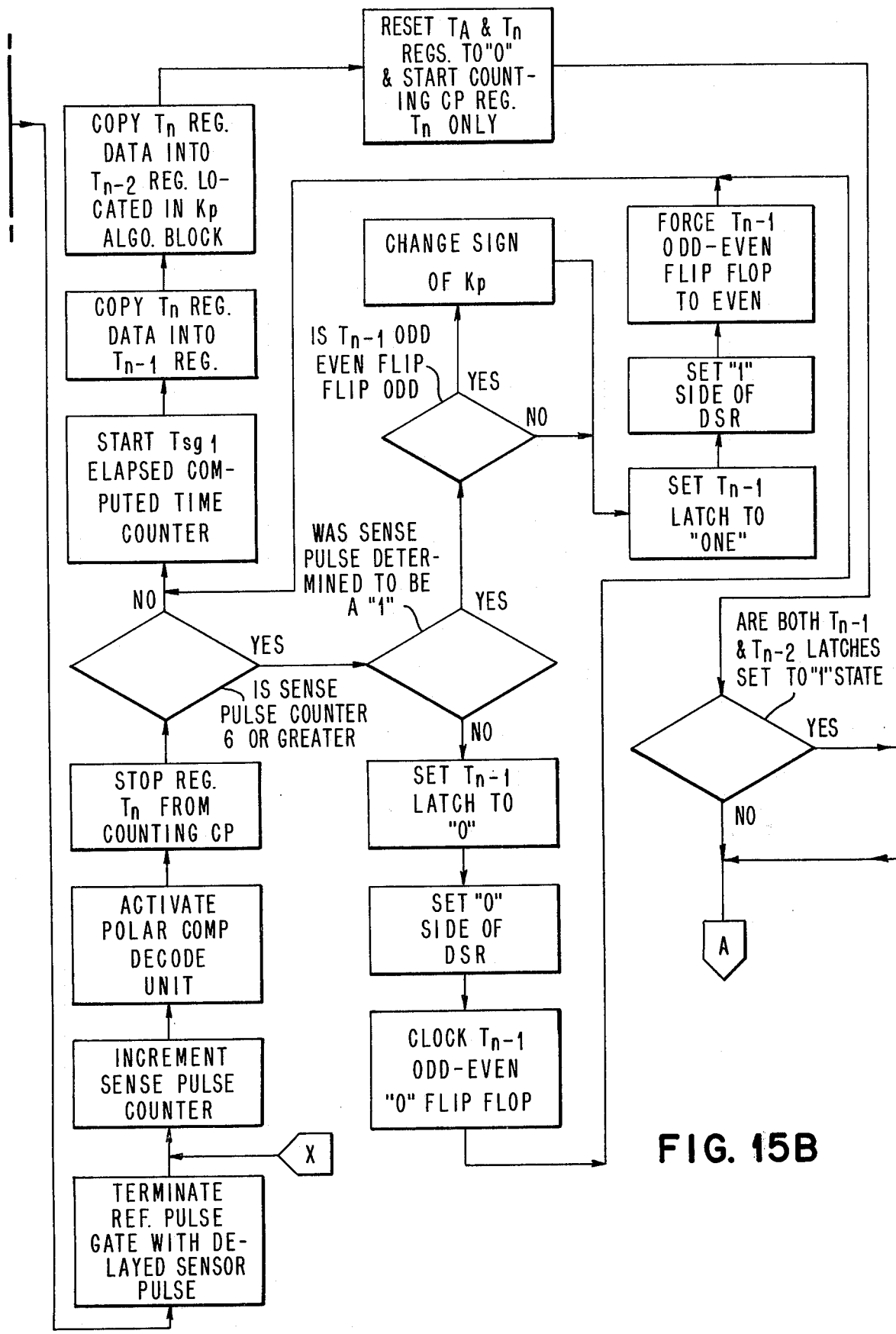
FIG. 15 illustrates, in schematic form, a functional flow chart for a symbol boundary search technique embodied in FIG. 6.
Figure 15C:
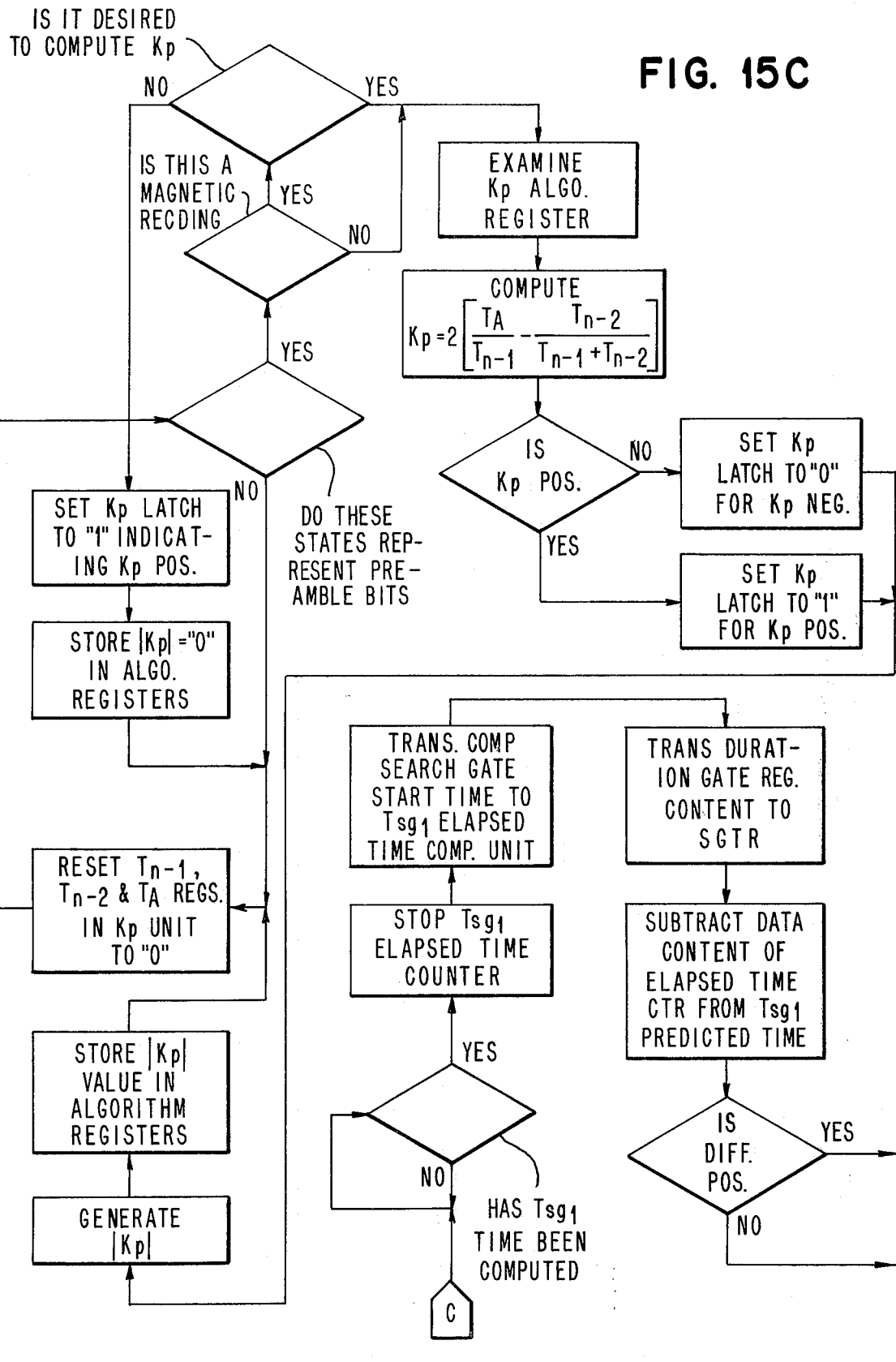
Figure 15D:
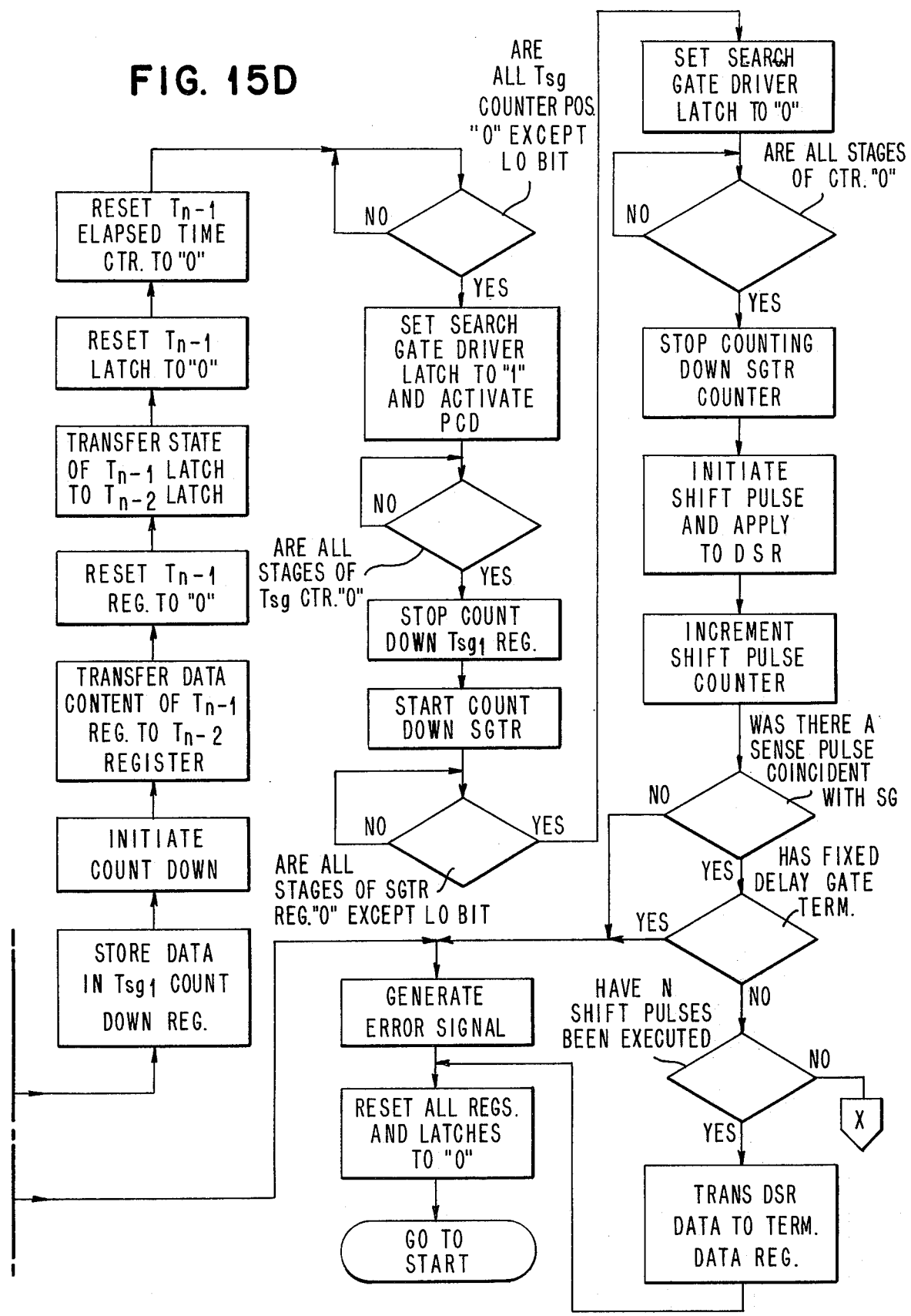
Figure 16B:
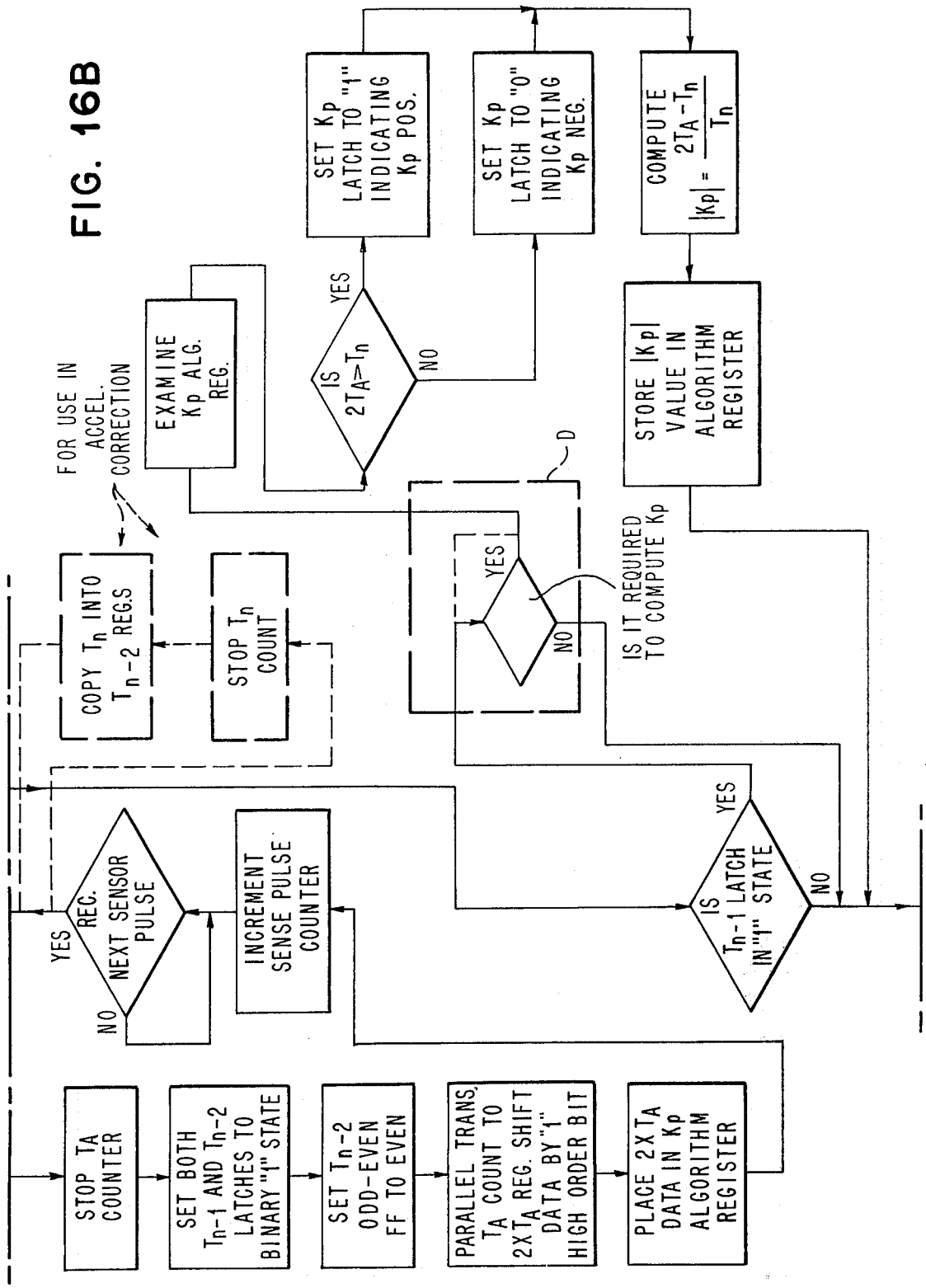
FIG. 16 illustrates, in schematic form, a functional flow chart for a center or 2F signal transition search technique using a single preamble bit symbol boundary search algorithm to generate a 2F search gate function.
Figure 16C:
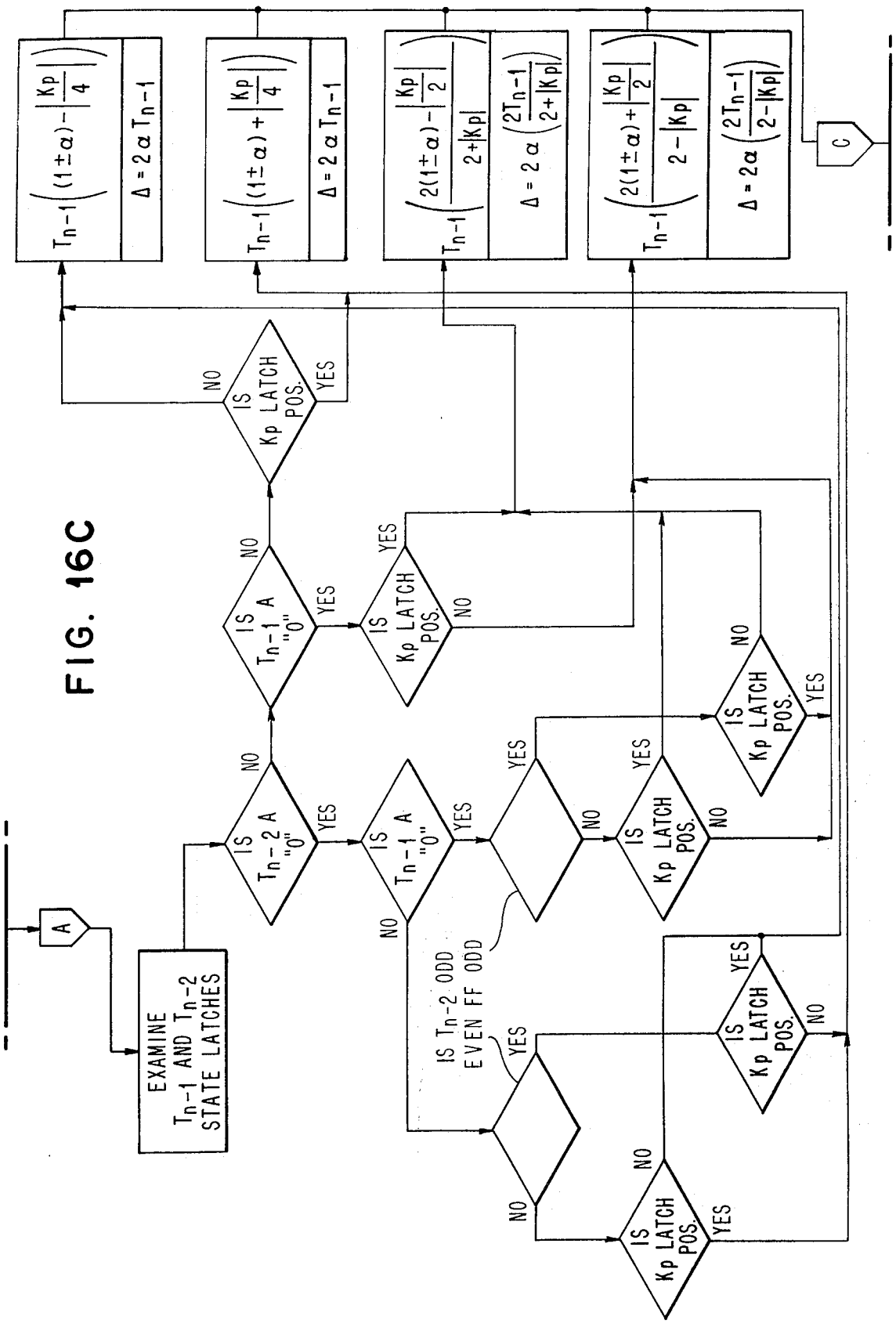
Figure 16D:
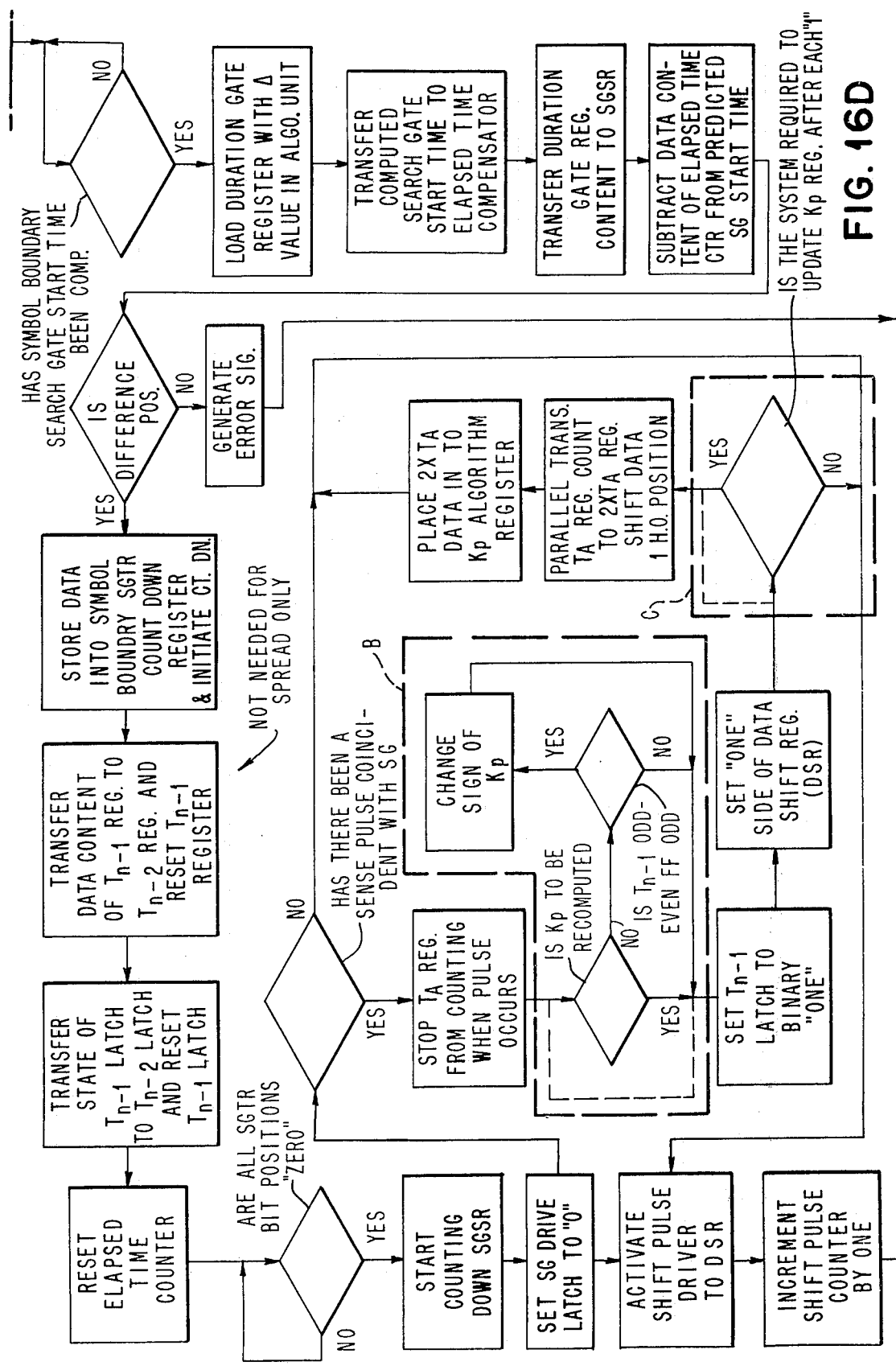
Figure 16E:
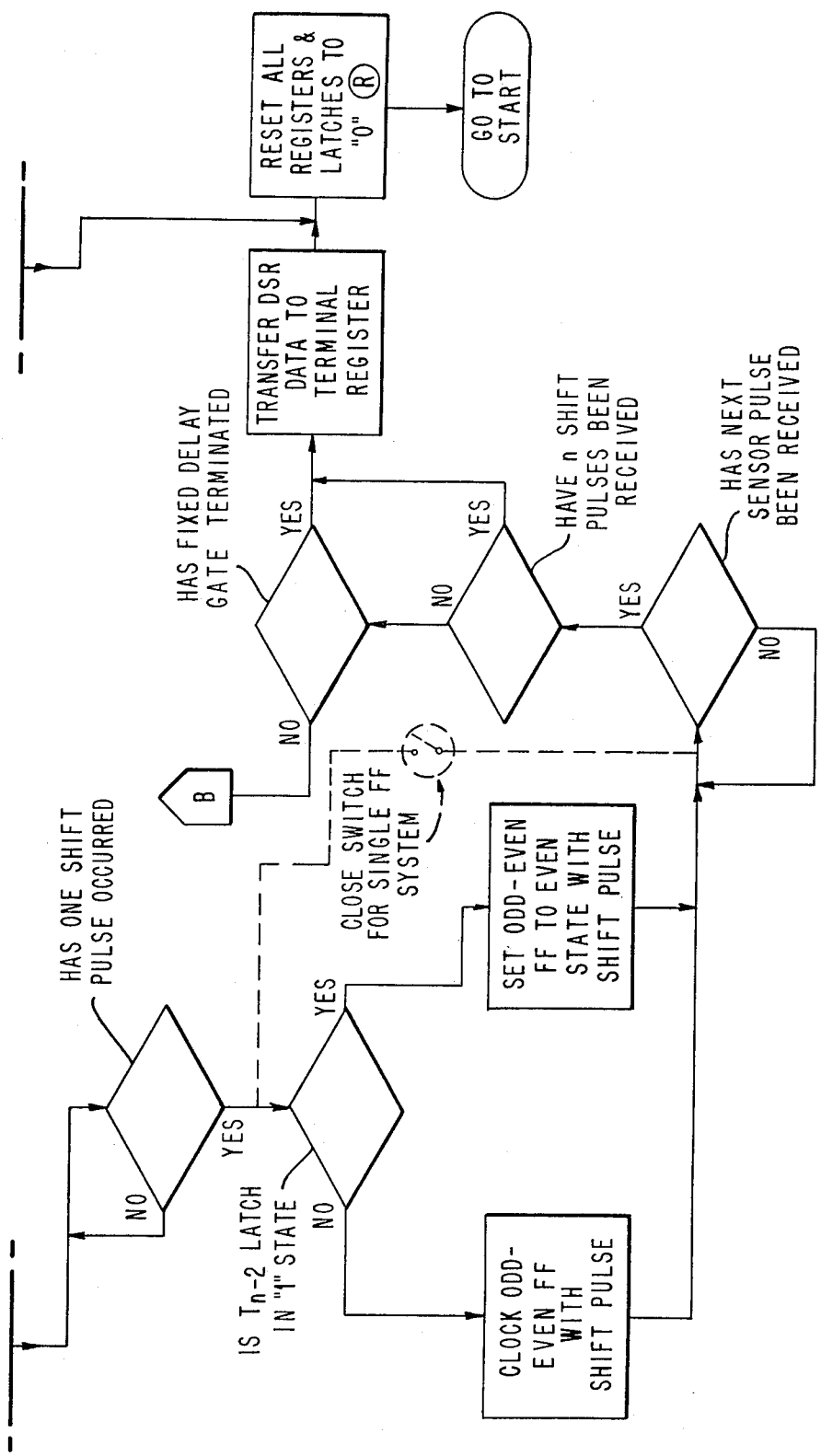
Figure 17B:
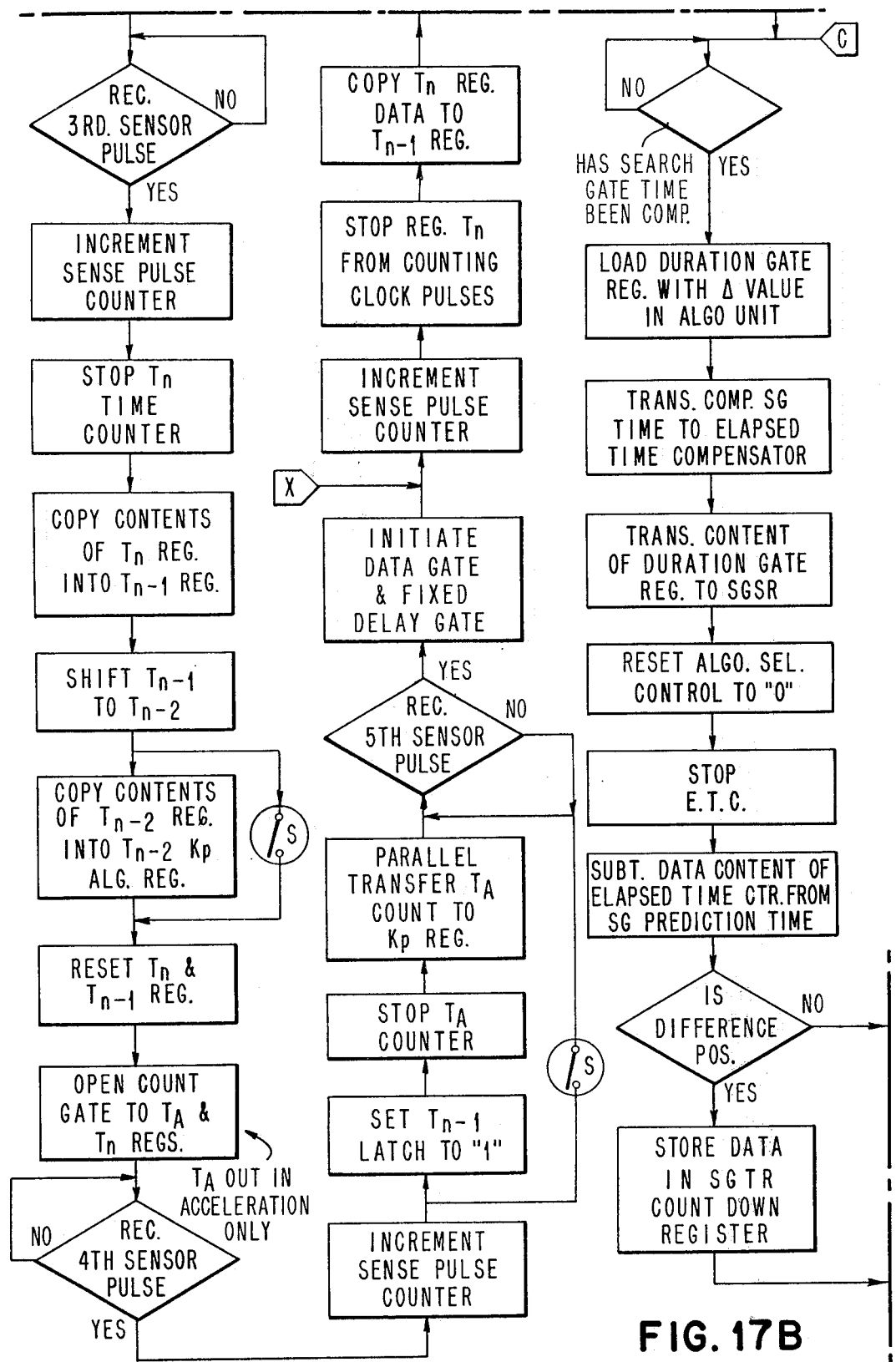
FIG. 17 illustrates, in schematic form, a functional flow chart for a center or 2F signal transition search technique using two preamble bits symbol boundary search algorithms to generate a 2F search gate function.
Figure 17D:
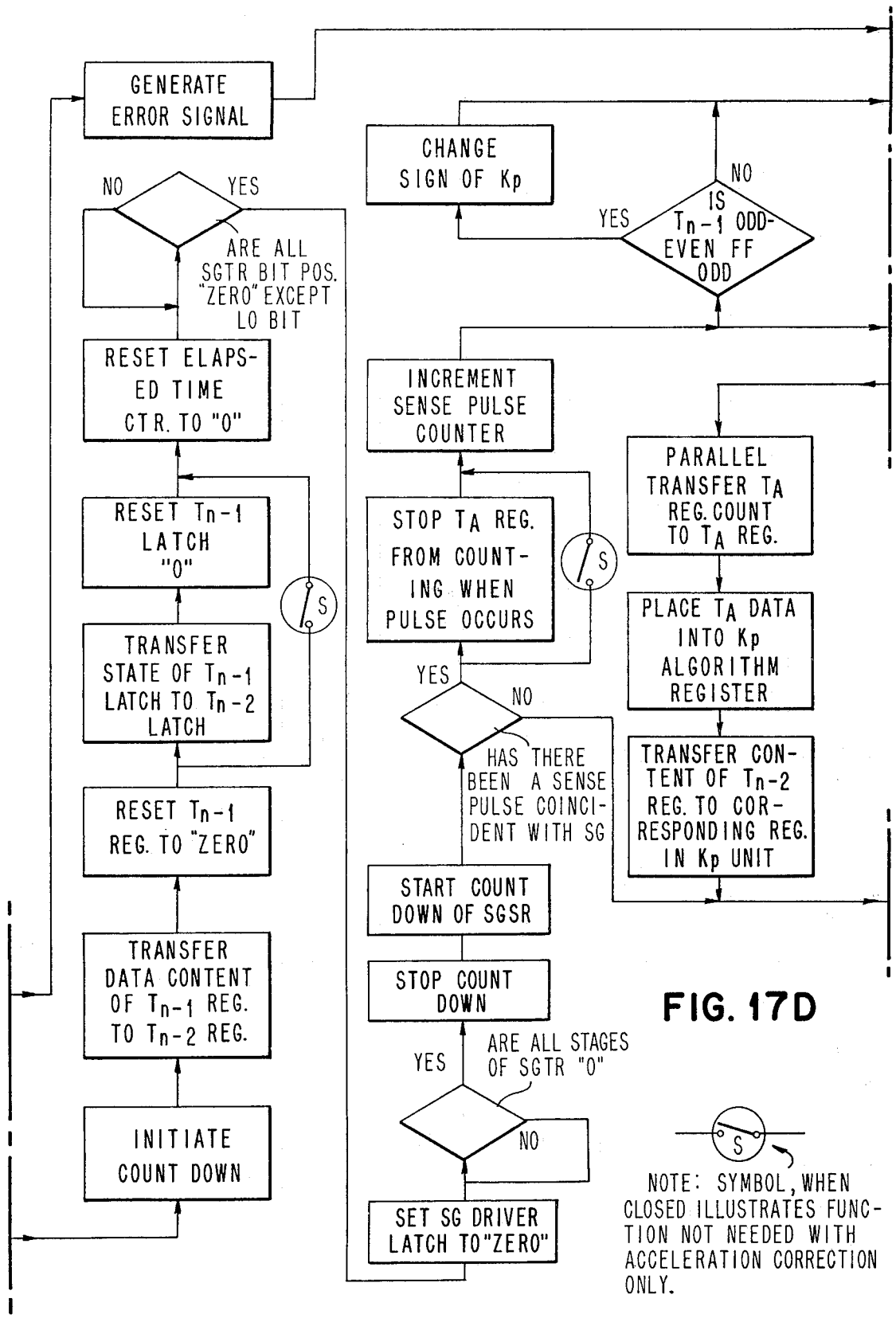
Figure 17E:
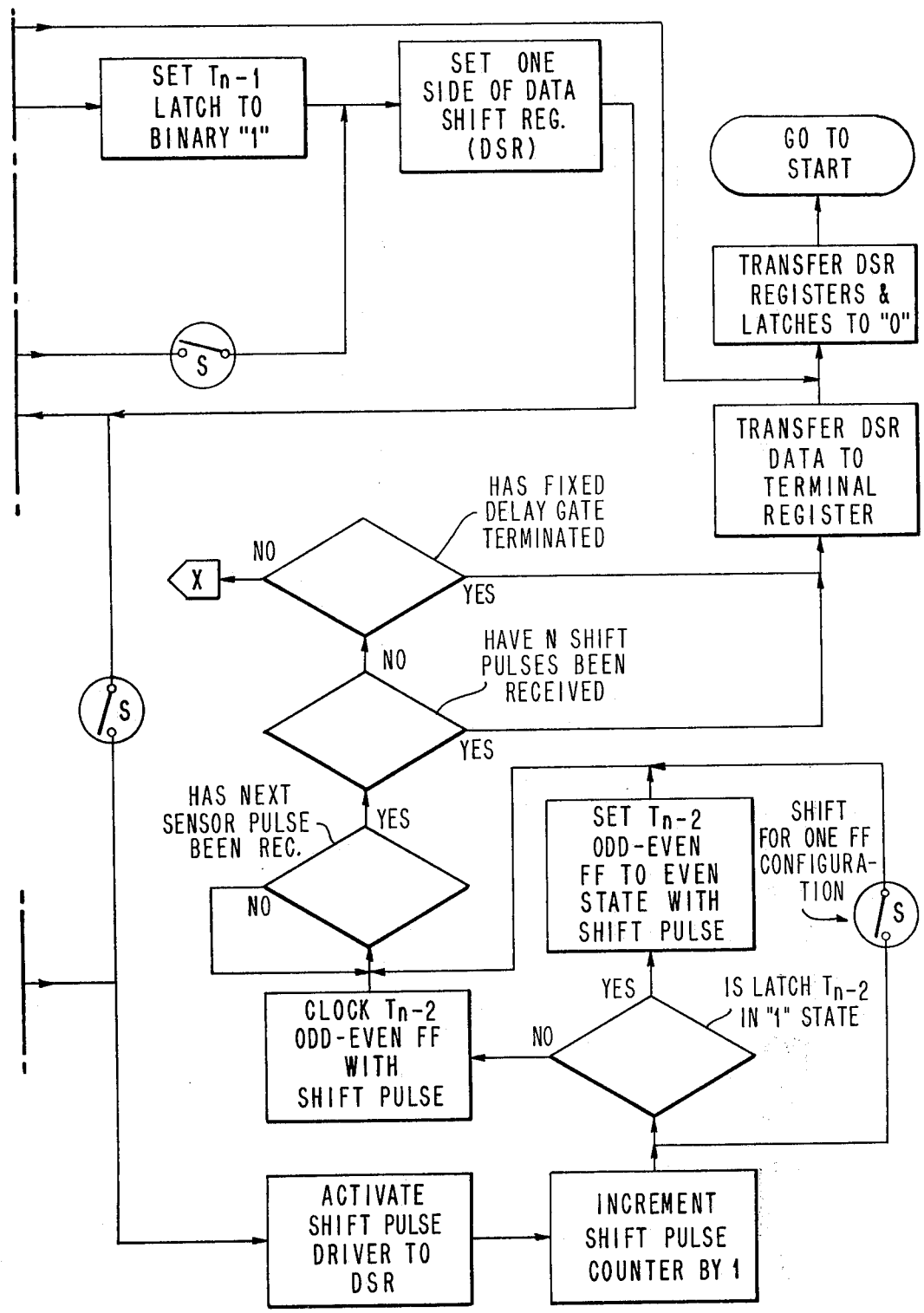

Turning to FIG. 15, a schematic flow chart of a system built to operate by searching for symbol boundary transitions and conducting polarity decode operations thereon is illustrated. The operations for reading the first two preamble bits are the same as have been previously discussed and will not be repeated. Operation will be described commencing with the point labeled by an X in a box after which the sense pulse counter is incremented and the polarity comparison decode unit is activated. These two functions are completed following the receipt of the fifth sensor pulse at the end of the second preamble symbol. What next occurs is that the $T_n$ register is stopped from counting and the question is asked, whether the pulse count is 6 or greater. If the answer is "yes," as is will not be at least until the end of the first data bit, a further question is asked as to whether the pulse was determined to be a 1. If the answer to this question is "no," the $T_{n-1}$ latch or indicator is set to 0 and the 0 is entered into the data register and the odd-even indicator is clocked to the opposite of whatever condition it is in. Operation continues by starting and elapsed time count and initiating the timing which must elapse before the start of the next search gate for a symbol boundary.

If the pulse detected when the pulse count was 6 or greater was determined to be a 1, a further question is asked as to whether the odd-even flip flop is odd. If the answer is "yes," the sign of the $K_p$ polarity is reversed, but if the answer is "no," the system continues to the point which it reaches after the aforementioned polarity reversal, if necessary, and sets the $T_n$ latch to a 1, enters a 1 into the data register, and forces the $T_{n-1}$ flip flop to the even state. The chart then proceeds to the same point at which the elapsed time counter is started and the time to the first search gate is begun.

The length of the symbol, the count stored in the $T_n$ register, is copied into the $T_{n-1}$ register and into the $T_{n-2}$ registers located in the $K_p$ algorithm computation block. The $T_A$ and $T_n$ registers are reset to 0 and start counting at the next clock pulse in the $T_n$ register only. At this point, the question is asked, whether both indicators, the $T_{n-1}$ and $T_{n-2}$ latches, are set to the 1 state. If the answer is "no," the system continues to the box marked with the letter A, at which point it enters an algorithm selection unit identical to those already discussed.

If the answer to the previous question was "yes," a further question is asked whether these are preamble bits. If the answer is "yes" and a magnetic recording is being read, a further question as to whether it is desired to compute $K_p$ is asked. If the answer is "no," the $K_p$ latch is set to a 1, indicating that $K_p$ is positive, and a value of $K_p$ equal to 0 is stored in the registers for $K_p$; the $T_{n-1}$ and $T_{n-2}$ and $T_A$ registers are all reset to 0 in the $K_p$ computation unit, and the system continues to box A where an algorithm is selected.

If it is not a magnetic recording or if it is desired to compute $K_p$ and is a magnetic recording, the system examines the $K_p$ algorithm register and computes $K_p$ according to the algorithm illustrated. When this is completed, the question whether $K_p$ is positive is asked. If it is, a latch is set to the 1 state, if not, it is set to the 0 state and the value of $K_p$ is stored in the appropriate registers. The system proceeds to reset the $T_{n-1}$, the $T_{n-2}$ and $T_A$ registers in the $K_p$ unit and goes on to select an algorithm.

When an algorithm has been selected, the system returns to the flow chart at box C and asks whether the time from the end of the last preamble bit to the starting (or leading) edge of the first symbol boundary search gate has been computed yet as a result of the algorithm chosen, and awaits a positive answer. When an affirmative answer has been received, the proper duration of the search gate for the first symbol boundary is loaded as a $\Delta$ value into the search gate termination register and the elapsed time counter is stopped. The computed ideal time for the start of the search gate together with the elapsed time count are transferred to an elapsed time comparator unit where the data content of the elapsed time counter is subtracted from the predicted time to the start of the first search gate. If the difference is positive, no error has occurred and the system continues; but if the difference is negative, an error condition is signalled and all registers and latches are reset to 0 and the system returns to the start.

Assuming that the difference is positive, the system stores the positive difference in the search gate start register and proceeds to count down the register. The data contents of the $T_{n-1}$ register is transferred to the $T_{n-2}$ register, and the $T_{n-1}$ register is reset to 0. The state of the $T_{n-1}$ latch is transferred to the $T_{n-2}$ latch and the $T_{n-1}$ latch is reset to 0, and the $T_{n-1}$ elapsed time counter is set to 0. When the search gate start register reaches 0, or nearly 0, the search gate driver latch is raised and the polarity comparison unit is activated. When all of the search gate start register positions are 0, the countdown of that register is stopped and the countdown of the duration register, the search gate termination count, or the $\Delta$ value from the algorithm unit, is begun counting down. When all of the stages in the search gate termination register are count down to 0, or nearly 0, the search gate is ended and the search gate driver latch is set to 0. When all of the stages of the search gate termination register are 0, the countdown is ended and a shift pulse is initiated to apply the output from the polarity comparison decoder unit to the data shift register, and a shift pulse counter is incremented by 1.

The question is asked, whether a sense pulse was found coincident with the search gate. If no pulse was found, an error signal is generated. If the pulse was found, the question is asked whether the fixed delay gate has terminated. If it has, an error signal is generated, but if it has not yet terminated, the question is asked whether N shift pulses have been executed, and if not, the system exists at block X and returns in the flow chart at the point marked with the block X to continue operation. If N shift pulses have been executed, the data is transferred to the data shift register, the system is reset, and returns to the initial starting point.

The logic for accomplishing the aforementioned functions for a symbol boundary transition search gate technique with the polarity comparison decode have been embodied in FIG. 6. Turning to FIG. 6, a selector switch 178 is shown, as is another selector switch 179. The selector switches 178 and 179 would be operated together so that 178 would be thrown to the 1F search position and switch 179 would be switched away from the 2F search position, so that a reference pulse and the enable signals can be applied as shown to the polarity comparison decode unit 61.

When the search gate start register 93 reaches all 0, except for the last or least order bit, AND gate 101 is activated as previously described for the center transition inhibit technique. This produces an output which is applied to AND gate 180, which is conditioned by the Ⓚ signal coming from selector switch 181 being set to the "on" condition to select a 1F search function. Also, switch 182 is set to ground when the 1F search is desired so that the output of AND gate 183 will be shunted to ground. Also, selector switch 184 would be turned to the "on" position where it would also be placed for inhibiting center transition pulses.

Latch 185 is set to the "on" condition when the fifth sense pulse, the end of the second preamble bit, has been reached. This applies an output to AND gate 186 which is conditioned by switch 184 and by the output from OR gate 187 which may be activated by the reference pulse generator 60.

The output of AND gate 186, thus fully activated, is applied to an inverter 188 to produce an inhibit gate signal, if it is desired to inhibit the center transition using the symbol boundary search gate algorithms, as was previously discussed.

The output from OR gate 187 is also applied to AND gate 189, which is otherwise conditioned with the Ⓚ symbol is "on" as a result of switch 181 selecting 1F search technique. When AND gate 189 is "on," its output is applied to an inverter 190, the output of which is a 2F search gate function for use in another system which will be discussed. The output of inverter 190 is applied also to AND gate 183 so that the Ⓐ for the center pulse search gate system can be generated or cut off under the control of switch 182 as shown.

If it is desired to search for a symbol boundary using the circuit diagram of FIG. 6, the various control switches 178, 179, 181, 182, 184 are set to the appropriate position for conducting a 1F search as identified and the operation proceeds as described above. Briefly, the operation is as follows:

When the initiation time for the start of the first symbol boundary search has been computed by the algorithm unit, the value is loaded into the search gate start register 93 (after that value has been corrected for elapsed time.) When the search gate start register 93 counts down to 0, the search gate is initiated from AND gate 101 which is applied to latch 79 to set it to the "on" condition to generate the search gate signal. This signal is applied to various points as shown, with the search gate signal present and the various control switches 178, 179, 181, 182, and 184 set to the appropriate positions for the 1F or symbol boundary search, the inhibit gate system previously described is not operative, but the error detection circuitry works in the same fashion. The presence of a search gate function being "on," is the output from latch 79 which is applied to AND gate 191. AND gate 191 is activated if a pulse $SP_0$ is sensed during the time that a search gate is "on." If this occurs, an output from AND gate 191 resets latch 196 so that no "error" function signal will be produced. Latch 196 is originally set to its "on" condition by the search gate start signal as illustrated. The output from latch 196 is applied to AND gate 194 and if the search gate termination signal occurs coincident with the output of latch 196, an "error" indication is signalled by setting latch 195 to the "on" condition. The output of AND gate 194 is also applied to OR gate 104 to generate a system reset, the function of which has been discussed before.

Operation of the system has previously been described in the inhibit gate mode for the central or 2F frequency signals, and has just been described with relation to the symbol boundary search gate operation. A description with the system operative to search for the center transition or 2F pulses will now be given.

The various control switches 178, 179, 181, 182 and 184 are all set to the appropriate position for a 2F or center transition search. When the symbol boundary search gate start register 93 produces an output, it is applied to AND gate 180 which is activated by the presence of a Ⓚ signal. The Ⓚ signal is produced when switch 181 is set to the 2F position. The output from AND gate 180 is applied to set OR gate 192 to drive the condition latch 116 to the 0 level so that proper account of the content of the data symbols may be made, as will appear shortly. This output is also applied to OR gate 193 so that the shift pulse driver 82 will produce a shift pulse to shift the pulse counter 84 and the shift register 83 in preparation for the receipt of the next bit of data. The output from the symbol boundary search gate start register 93 is also applied, as before, to latch 79 to produce the search gate signal. This is applied to OR gate 187 which is also activated by the reference pulse gate if that should occur. The output from OR gate 187 is applied to AND gate 189 which is activated by switch 181 being on for the 2F or center transition search. It is also applied to AND gate 186. AND gate 186 is deactivated by switch 184 so that no inhibit gate signal will be produced for the 2F or center pulse inhibit gate system. AND gate 189, as previously stated, will be activated, and, through inverter 190 will produce a 2F search gate signal. This is applied to various points in the diagram, where required, and is also fed directly to AND gate 183.

At the presence of a sense pulse during the time that the 2F search gate signal is on, AND gate 183 will be activated to produce the Ⓐ output which is applied to OR gate 197 to set a 1 into latch 116. The 2F search signal is applied to AND gates 123 & 124 so that, at the occurrence of either a pulse during the center transition search gate period or the absence during that period, data will be appropriately loaded as a 1 or a 0 from the condition outputs of latch 116 through AND gates 123 or 124 to the initial cell of the data shift register 83. The polarity comparison decode unit 61 is disenabled by switch 179 and the AND gates 114, 115, 125 and 126 are enabled during the 2F search mode, following the mode of operation previously described, so that the proper account of the $K_p$ function may be maintained to switch the polarity if $K_p$ is not recomputed with each occurrence of a 1.

Figure 18:
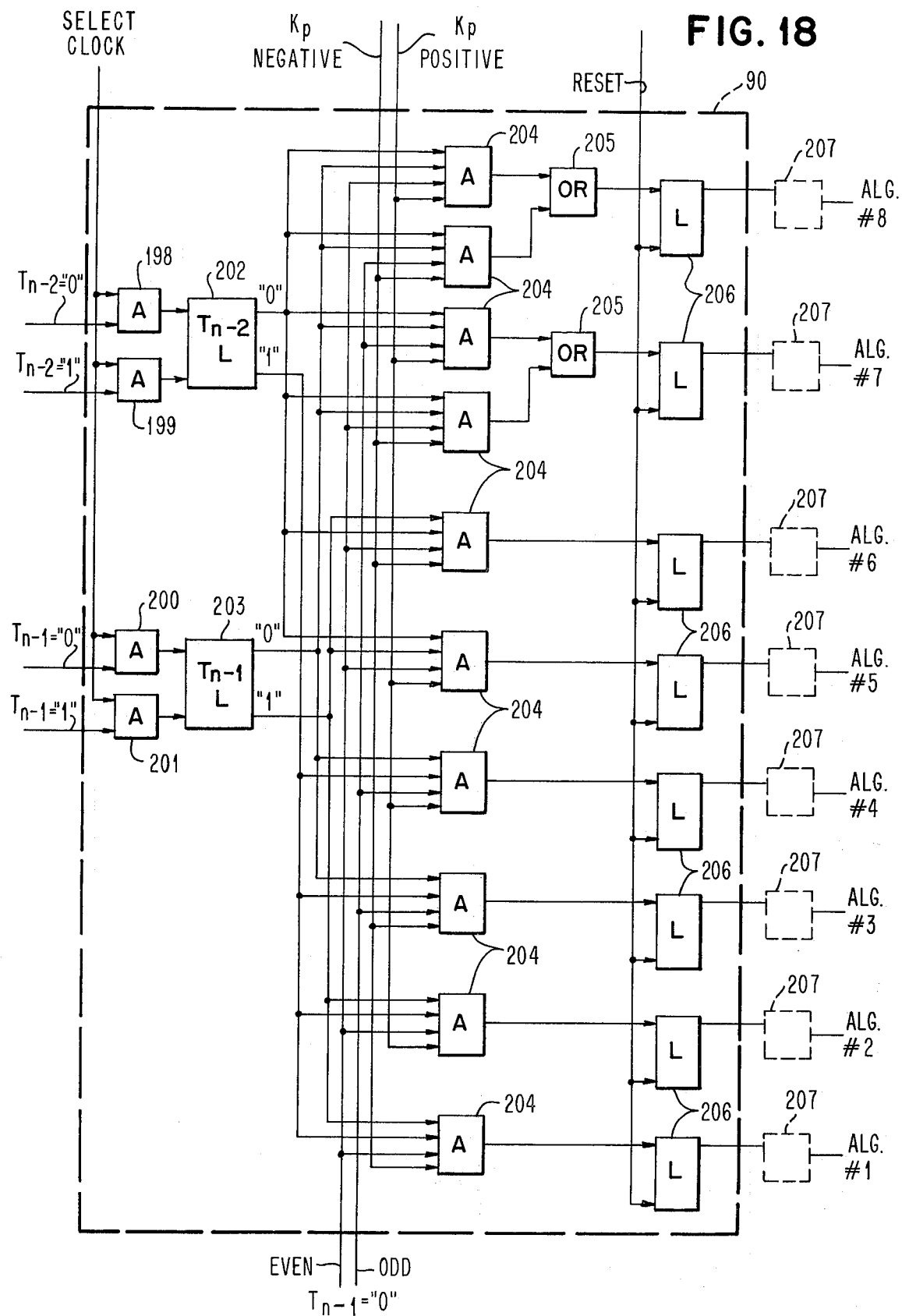
FIG. 18 illustrates an algorithm selector logic circuit for use in the center transition inhibit technique embodied in FIGS. 5 and 6.

Turning now to FIGS. 18–23, the algorithm selector and a description of the arithmetic logic circuits for computing the algorithm functions in Tables 1A and 1B will be explained. Turning to FIG. 18, a schematic diagram for the functional logic of an algorithm selector unit 90 as illustrated in block form in FIG. 6 is shown. The various inputs to the algorithm selector 90 as shown in FIG. 18 are as depicted in FIG. 6. AND gates 198 and 199 receive the $T_{n-2}=0$ or 1 input condition. AND gates 200 and 201 receive the $T_{n-1}=0$ and 1 input conditions. Latch 202 is set to the 0 or 1 input condition corresponding to the $T_{n-2}=0$ or 1 content. Latch 203 is set to the 0 or 1 content dependent upon the $T_{n-1}=0$ or 1 content. Both latches 202 and 203 are connected to selected pluralities of AND gates 204 to provide one enabling input thereto. AND gates 204 are also provided selectively with inputs for the sign of the $K_p$ factor from the algorithm computation unit for $K_p$, and with an "even" or "odd" indication from the even-odd flip flop for the $T_{n-1}=0$ being odd or even.

The selector shown in FIG. 18 is for an eight algorithm unit, or for a system which computes search gates for an environment having both spread and acceleration present. Selectors for fewer algorithms, such as those required where only spread is present, could be constructed along the same lines as the selector in FIG. 18, but would be simpler as is obvious to those of skill in the art having viewed FIG. 18 for the more complex selector circuit.

Figures 8, 8A:
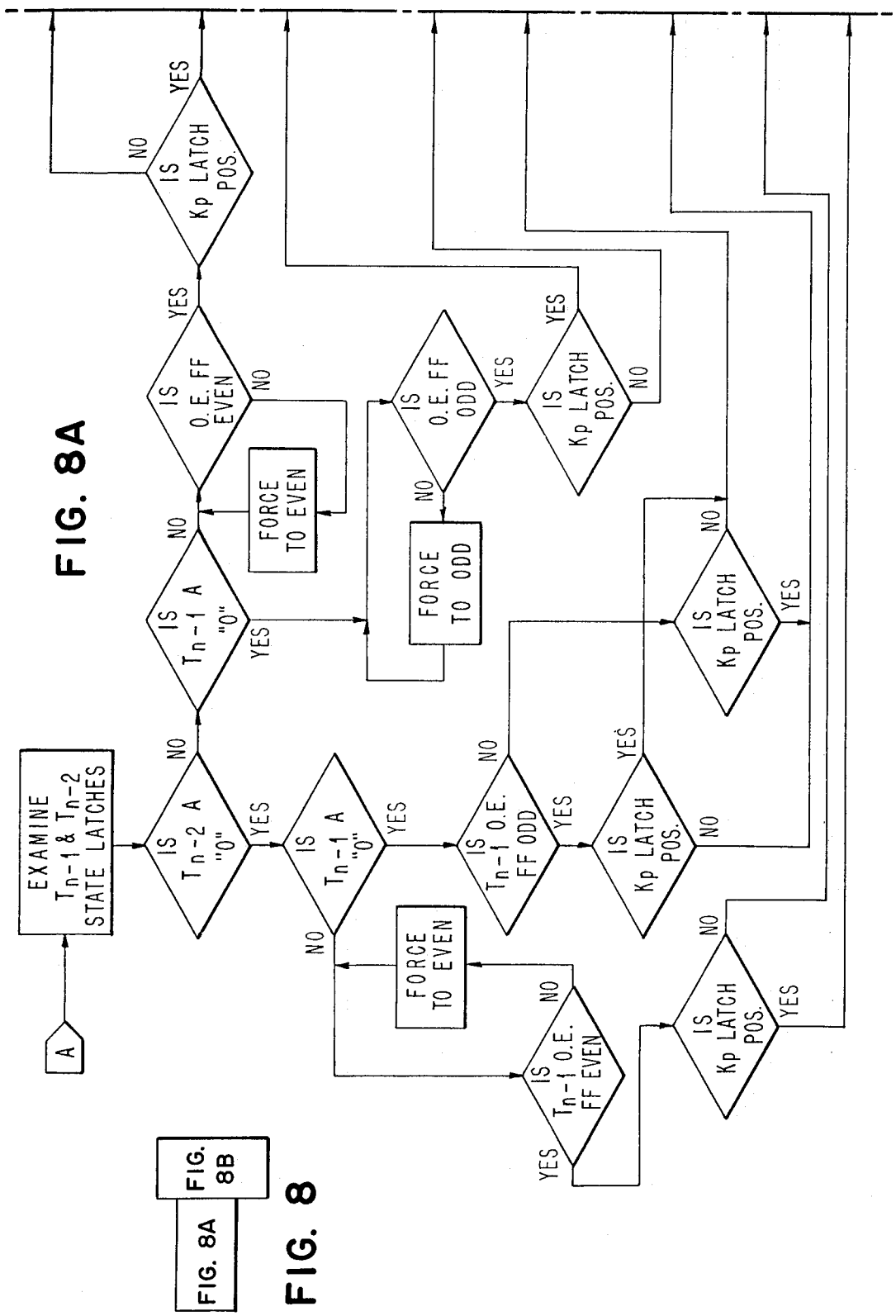
FIG. 8 illustrates in more detail an algorithm selector for use in FIG. 5 and is for both spread and acceleration corrections.
Figure 8B:
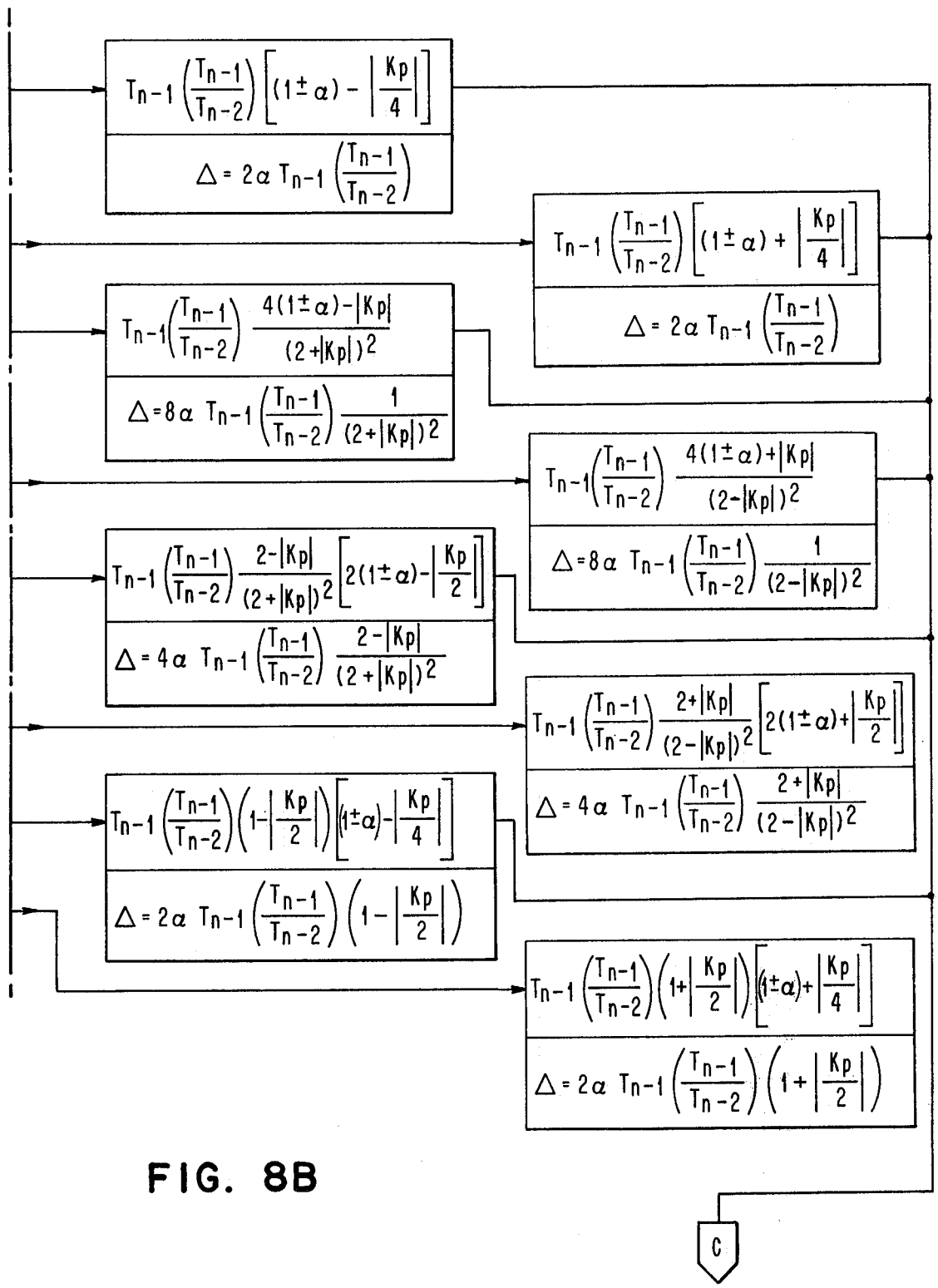

The selector circuit in FIG. 18 performs the selection for the functional flow chart of FIG. 8.

When a given AND gate is fully activated, its output is applied to a latch 206 to select an algorithm 1 – 8. Algorithms 1 through 8 have been given arbitrary numbers from bottom to top to correspond to the algorithms listed in the last column of Table 1B from bottom to top. OR gates 205 are utilized to provide an output whenever the first or second or third or fourth AND gates 204 are fully activated since algorithms 7 or 8 may be selected under two different sets of conditions as shown in the selection factors of Table 1B. The outputs from latches 206 are applied individually to AND gates 207 to select the search gate algorithm output and the Δ value output from the algorithm selector circuit illustrated in FIGS. 19 through 23.

Figure 19:
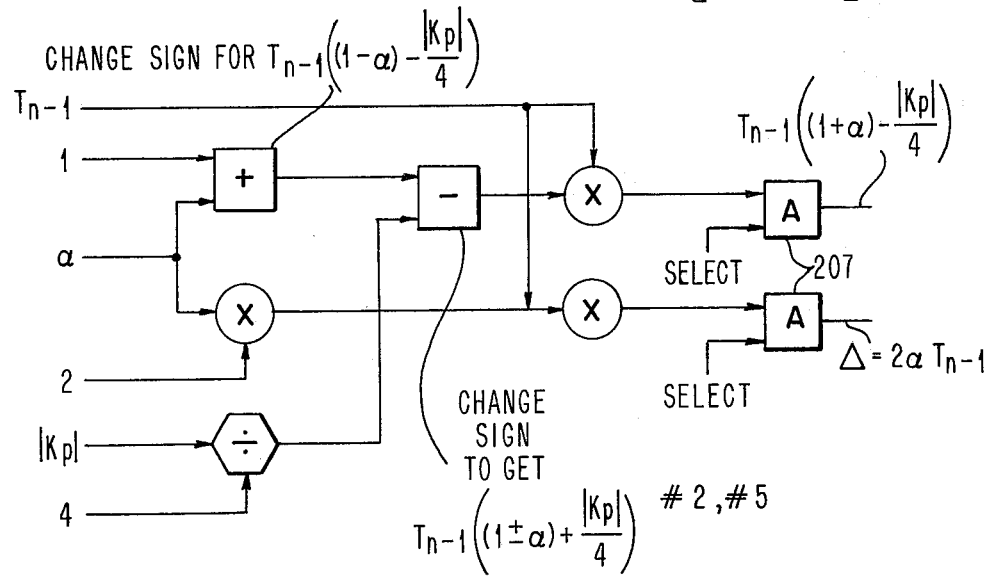
Figure 20:
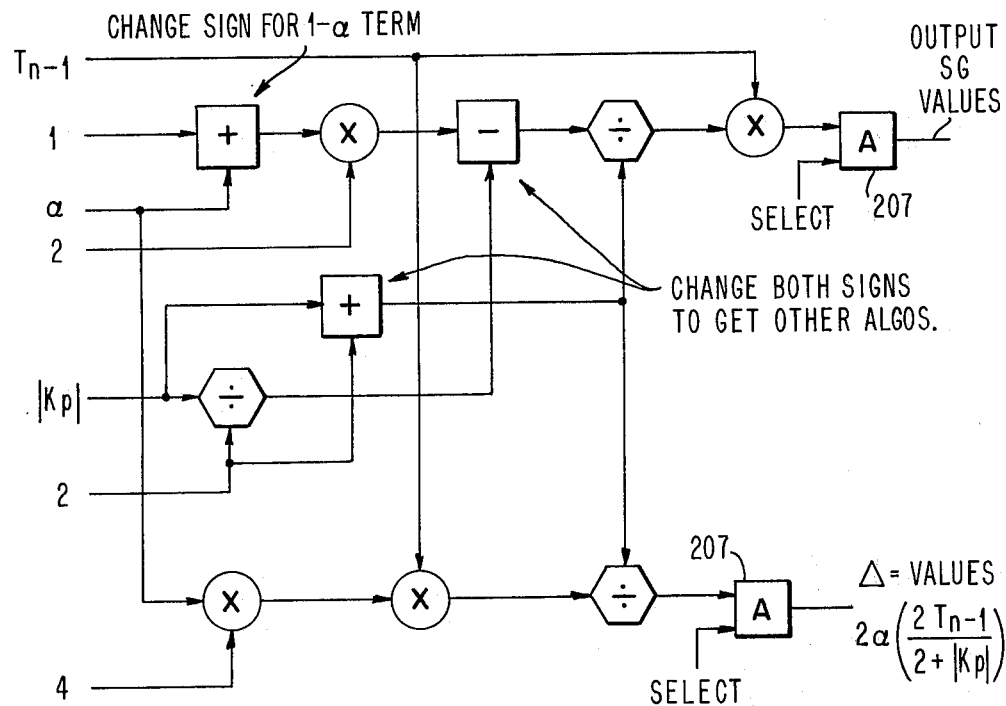

Turning to FIG. 19, the algorithm computation logic circuits are illustrated for performing all of the algorithms listed in Table 1B, in the final column, for acceleration and spread combined. FIG. 20 illustrates th algorithm computation circuit for the condition $T_{n-1}$ and $T_{n-2}$ both contain a 0 and the $T_{n-1}$ may be the odd or even with $K_p$ positive or negative for the situation where there is constant velocity, i.e., no acceleration with spread present. FIG. 20 is for the most complex mathematical computations for the zero-acceleration system with the algorithms listed in Table 1B for that condition. It is obvious to those of skill in the art that FIG. 20 may be easily modified, such as by changing the signs of the adder and subtractor units to obtain other algorithms, or to remove the multiplication or divide by two and four factors appropriate to derive the remaining algorithms for constant velocity, hence, these will not be given.

In FIG. 19, the algorithm computation circuit for computing the algorithms under zero-acceleration conditions for Table 1B for the constant velocity with spread algorithms numbers 1, 2, 5 and 6 (numbered from the bottom of Table 1B) is shown. The inputs are the value of $T_{n-1}$ from the register for $T_{n-1}$, a numerical 1 value, for the value of $\alpha$, a numerical value of 2, the absolute value of $K_p$, and the numerical value of 4. These values are combined as illustrated to produce the plus $\alpha$ equation terms for algorithm number 1 at the bottom of Table 1B in the column headed, "Constant Velocity With Spread." The sign of the adder will be changed to obtain the minus $\alpha$ form and the sign of the subtractor unit would be changed to obtain algorithm 2. Algorithms 5 and 6 are like algorithms 2 and 1, respectively, and hence, would be embodied in the same fashion.

The appropriate output would be selected by AND gate 207 under control of a select signal from an algorithm selector such as that shown in FIG. 18 and discussed previously.

With reference to FIGS. 19–23, it wll be observed that no great detail has been indulged in illustrating the functional algorithm circuits for addition, subtraction, multiplication, and division. This is done because it is within the skill of the art to construct suitable circuits of this type and other functional logic circuits to handle these mathematical calculations for any of the algorithms in Tables 1A and 1B. For example, a standard treatise on the subject matter is, "Arithmetic Operations in Digital Computers," by Richards; Van Nostrand, 1955. Other useful articles showing hardware for these operational circuits are, "A Signed Binary Multiplication Technique," by Andrew D. Booth, appearing in the Quarterly Journal of Mechanics and Applied Mathematics, Vol. 4, Part 2, 1951, pages 236–240. Also, "Fast, Economical Binary Divider," by A. B. Gardiner, in Electronics Letters, 18 Nov. 1971, Vol. 7, No. 23, pages 691–692. Another article is "A Synchronous Binary Restoring Divider Array," by A. B. Gardiner, in Electronics Letters, 9 Sept. 1971, Vol. 7, No. 18, pages 542–544. It will be understood by those of skill in the art that the individual circuits, their appropriate signal voltage levels, and other operating conditions, are a matter of design choice depending on the type of technology used and are well within the capabilities of the logic designer to select, as is indicated by the above publications. Therefore, the arithmetic logic functions are illustrated only by signs and no attempt is made to show a detailed circuitry which would be produced to embody these functions.

In FIG. 20, the arithmetic logic circuits for algorithms number 3, 4, 7, and 8 are shown. As is apparent from Table 1B, the various signs in the algorithms listed would be changed appropriately to obtain the desired algorithm output, and this has been indicated in FIG. 20. The Δ value and the search gate output value are both selected by AND gate 207 as was previously discussed with relation to FIG. 19 and FIG. 18.

The specific circuit illustrated in FIG. 20 calculates the form of the algorithm which has a minus absolute value of $K_p/2$ in the numerator and a plus absolute value of $K_p$ in the denominator. It is for the plus $\alpha$ term or form of the search gate prediction. It would be obvious to change the sign of the $\alpha$ adder to a subtractor and to interchange both signs of the adder and the subtractor as indicated to obtain the other algorithms and their various forms and the Δ values as indicated in Table 1B.

Figure 23:
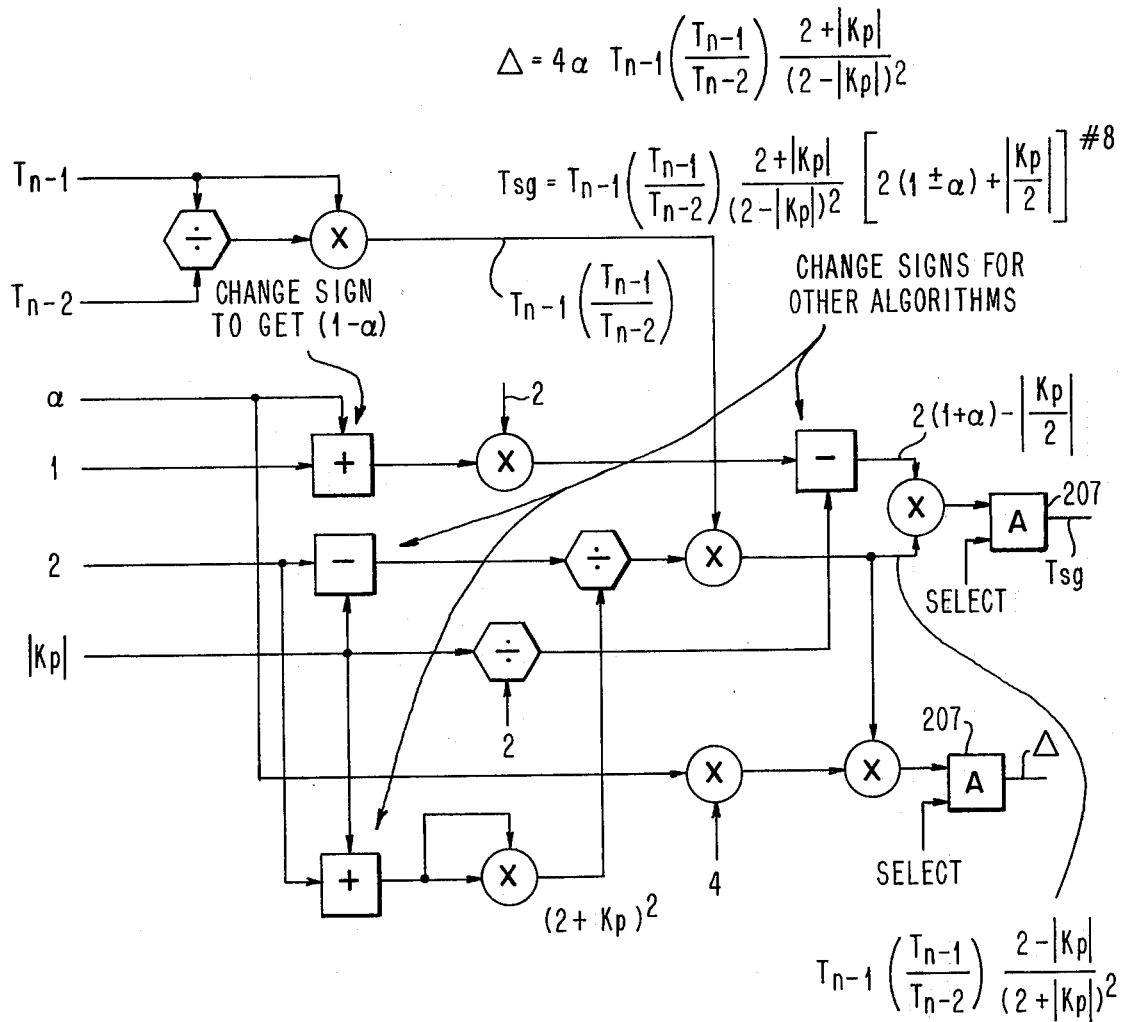

FIGS. 21 through 23 illustrate algorithm computation units for calculating the values of algorithms 3 through 8 in Table 1B in the column headed "Acceleration With Spread." FIG. 21 produces the outputs of the plus $\alpha$ form for algorithm 6, and by changing the appropriate signs as indicated, would produce the plus $\alpha$ form for algorithm 5. The sign of the $1 \pm \alpha$ term would be changed as appropriate as indicated in FIG. 21.

FIG. 22 illustrates the algorithm circuitry for algorithms number 3 and 4 and indicated, together with the Δ values for these algorithms.

FIG. 23 produces the algorithm outputs for algorithms number 7 and 8 together with the Δ values.

As has been pointed out at the bottom of Table 1A, the Δ value is merely the difference between calculating the algorithm prediction with a plus $\alpha$ term and doing it again with a minus $\alpha$ term to define the width of the search gate window. The selection of the appropriate output is conducted via AND gates 207 from the appropriate output of the algorithm selector in FIG. 18 as previously described. The circuitry for algorithms numbers 1 and 2 for acceleration with spread have not been illustrated as it is obvious to those of skill in the art in view of those already shown, how circuitry of this type would be constructed for the simpler forms in algorithms 1 and 2.

As noted previously, the algorithms in Tables 1A and 1B in the form which predicts the start of a symbol boundary search gate may also be shown to be equivalent to the algorithms in Tables 1–5 which predict the end of a 2F signal search gate as discussed in my copending application Ser. No. 522,210. It should, therefore, be apparent, especially for the center signal inhibit system and the center signal search system utilizing the symbol boundary search gate algorithms, that the algorithms in Tables 1–5 could be substituted for those illustrated in FIG. 8 as being selected by the algorithm selectors and the results would be computed to be mathematically equal to the prediction obtained using the algorithms of Tables 1A or 1B. However, the algorithms of Tables 1A and 1B are more general and useful, since they predict not only the end of a 2F search gate, but also predict the point at which a symbol boundary transition should occur and predict the trailing edge of a search gate window for that symbol boundary. Thus, the algorithms written in the form shown in Tables 1A and 1B lend themselves to a variety of applications beyond those of Tables 1–5.

While the present invention has been illustrated in several preferred embodiments to show typical modifications which can be made in the implementation of the invention, it will be appreciated by those of skill in the art that various departures from the specific implementations may be made which will still embody the basic methods and techniques and will utilize the same general algorithms which have been developed. To that end, therefore, the claims which follow are intended not to be limited to the specific nature of the circuit embodiments described herein.

What is claimed is:

1. In an F2F coded data decoder apparatus system, in which the time periods or widths between signal transitions corresponding to the two frequencies originally used to encode the data may be distorted by spread, when received at said decoder, so as to exhibit their signal transition points spaced at other than the original frequency transition spacing or times, a method of operating said decoder apparatus for interpreting said distorted F2F coded data to extract therefrom its correct digital content whenever each multibit data block is preceded by at least a binary 1 preamble or first symbol having two double frequency time slots, or nominal half-symbol widths, by predicting the ieal length of an inhibiting period and controlling the duration of said inhibiting period imposed by said decoding apparatus for any said double frequency signal transition occurring intermediate the single frequency symbol boundary transitions, thereby isolating said boundary transitions for interpretation, comprising the steps performed by means in said apparatus of:

a. measuring the width of either of the two time slots in said first symbol;
b. measuring the width of said first symbol and, after said measurement is completed, initiating a signal inhibiting time measurement and reinitiating steps a) and b) for the next succeeding symbol;
c. storing as a reference the polarity of the symbol boundary transition signal at the end of said first symbol width measurement;
d. setting a first and a second indicator to a binary 1 state and an odd-even indicator to the "even" state;
e. doubling the measurement made of said time slot;
f. examining the state of said first indicator and, if it is in the binary 1 state, dividing the difference between said doubled time slot measurement and said symbol width measurement by said symbol width measurement;
g. assigning an algebraic sign to the quotient resulting from step f), said sign being positive if said doubled time slot measurement is greater than said symbol width measurement and negative if said doubled time slot measurement is less than said symbol width measurement when said time slot measurement is made of the first time slot in said symbol, and said signs being the opposite when said time slot measurement is made of the second time slot of said symbol;
h. selecting an algorithm and predicting an ideal length for said signal inhibiting time measurement, said algorithm being selected from the following:

(a) $T_{i_0} = T_{n-1} \left[ (1 \pm \alpha) - \dfrac{|K_p|}{4} \right]$, (b) $T_{i_0} = T_{n-1} \left[ (1 \pm \alpha) + \dfrac{|K_p|}{4} \right]$, (c) $T_{i_0} = T_{n-1} \left[ \dfrac{2(1 \pm \alpha) - \dfrac{|K_p|}{2}}{2 + |K_p|} \right]$, or (d) $T_{i_0} = T_{n-1} \left[ \dfrac{2(1 \pm \alpha) + \dfrac{|K_p|}{2}}{2 - |K_p|} \right]$ where $\alpha$ is a variable coefficient arbitrarily chosen from the range $K_{p/4}$ to $1/2 \text{-} K_{p/4}$ and being optimum at $\alpha = \frac{1}{4}$, $T_{i_0}$ is the predicted ideal length for said signal inhibiting time, $T_{n-1}$ is the last said symbol width measurement and $K_p$ is the absolute value of said quotient, and said algorithm $(a)$, $(b)$, $(c)$, or $(d)$ is selected according to the following criteria: if the state of both said first and said second indicators is a "one" and said odd-even indicator is even, and the sign of said quotient is negative, select algorithm $(a)$; if the state of both of said first and second indicators is a "one" and said odd-even indicator is even, and the sign of said quotient is positive, select algorithm $(b)$; if the state of said second indicator is a "one" and the state of said first indicator is a "zero" and said odd-even indicator is odd, and the sign of said quotient is positive, select algorithm $(c)$; if the state of said second indicator is a "one" and the state of said first indicator is a "zero" and said odd-even indicator is odd, and the sign of said quotient is negative, select algorithm $(d)$; if the state of both said second indicator and said first indicator is a "zero" and the state of said odd-even indicator is odd and the sign of said quotient is positive, select algorithm $(c)$; if the state of both of said indicator and said first indicator is a "zero" and the state of said odd-even indicator is odd and the sign of said quotient is negative, select algorithm $(d)$; if the state of both said first and second indicators is "zero" and the state of said odd-even indicator is even and the sign of said quotient is positive, select algorithm $(d)$; if the state of both said first and second indicators is "zero" and the state of said odd-even indicator is even and the sign of said quotient is negative, select algorithm $(c)$; if the state of said second indicator is a "zero" and the state of said first indicator is a "one" and the state of said odd-even indicator is even and the sign of said quotient is positive, select algorithm $(b)$; if the state of said second indicator is a "zero" and the state of said first indicator is a "one" and the state of said odd-even indicator is even and the sign of said quotient is negative, select algorithm $(a)$;

i. replacing the state of said second indicator with the state of said first indicator;
j. terminating said signal inhibiting time measurement when it is equal to the predicted ideal length resulting from the use of said selected algorithm and, following the termination of said signal inhibiting period, sensing the next symbol boundary transition signal, storing the polarity of said signal in a temporary storage, comparing the polarity of said transition with said reference polarity and, if said polarities correspond, setting said first indicator to a binary 1 and entering a one into a data register, and, reinitiating said signal inhibiting time measurement, terminating said reinitiated symbol width measurement, and reinitiating said symbol width and time slot measurements for the succeeding symbol, and setting said odd-even indicator to the even state, and resuming operation at step e), but if said polarities do not correspond, entering a "zero" into said data register, setting said first indicator to a binary 0, setting said odd-even indicator to the opposite state to that it is then in, and terminating said reinitiated symbol width measurement, reinitiating steps a) and b) and said signal inhibiting time measurement and resuming operation with step h); and k. storing the polarity contents of said temporary storage as the next said reference polarity.

2. The method as described in claim 1, further comprising:
predicting an ideal reinitiation time for said signal inhibiting time measurement by using the $+\alpha$ form of said selected algorithm.

3. The method as described in claim 2, further comprising:
predicting an ideal length for said inhibiting time measurement by using the $-\alpha$ form of said selected algorithm; and
reinitiating of said signal inhibiting time measurement at said ideal predicted time therefor.

4. In an F2F coded data decoder apparatus system, in which the time periods or widths between signal transitions corresponding to the two frequencies originally used to encode the data may be distorted by spread, when received at said decoder, so as to exhibit their signal transition points spaced at other than the original frequency transition spacing or times, a method of operating said decoder apparatus for interpreting said distorted F2F coded data to extract therefrom its correct digital content whenever each multibit data block is preceded by at least a binary "1" preamble or first symbol having two double frequency time slots, or nominal half-symbol widths, by predicting the ideal length of an inhibiting period and controlling the duration of said period imposed by said decoding apparatus for any said double frequency signal transitions occurring intermediate the single frequency symbol boundary transitions, thereby isolating said boundary transitions for interpretation, comprising the steps performed by means in said apparatus of:

a. measuring the width of either of the two time slots in said first symbol;

b. measuring the total width of said first symbol and, after said measurement is completed, initiating a signal inhibiting time measurement and reinitiating step b) for the next succeeding symbol;

c. storing as a reference the polarity of the symbol boundary transition signal at the end of said symbol width measurement;

d. setting a first and a second indicator to a binary 1 state;

e. doubling the measurement of said time slot;

f. dividing the difference between said doubled time slot measurement and said symbol width measurement by said symbol width measurement;

g. assigning an algebraic sign to the quotient resulting from said step f) said sign being positive if said doubled time slot measurement is greater than said symbol width measurement and being negative if said doubled time slot measurement is less than said symbol width measurement when said time slot measurement is made of the first time slot in said symbol, and said signs being the opposite when said time slot measurement is made of the second time slot of said symbol;

h. examining the state of said first indicator and if said first indicator is then in the "zero" state, setting an odd-even indicator to the opposite of whichever state it is then in, but if said first indicator is then in the "one" state, setting said odd-even indicator to the even state;

i. selecting an algorithm and predicting an ideal length for said signal inhibiting time measurement, said algorithm being chosen from the following:

(a) $\quad T_{io} = T_{n-1} \left[ (1 \pm \alpha) - \dfrac{|K_p|}{4} \right]$, (b) $\quad T_{io} = T_{n-1} \left[ (1 \pm \alpha) + \dfrac{|K_p|}{4} \right]$, (c) $\quad T_{io} = T_{n-1} \left[ \dfrac{2(1 \pm \alpha) - \dfrac{|K_p|}{2}}{2 + |K_p|} \right]$, or (d) $\quad T_{io} = T_{n-1} \left[ \dfrac{2(1 \pm \alpha) + \dfrac{|K_p|}{2}}{2 - |K_p|} \right]$ where $\alpha$ is a variable coefficient arbitrarily chosen from the range $K_{p/4}$ to $\tfrac{1}{2} - K_{p/4}$ and being optimum at $\alpha = \tfrac{1}{4}$, $T_{io}$ is the predicted ideal length for said signal inhibiting time, $T_{n-1}$ is the last said symbol width measurement, and $K_p$ is the absolute value of said quotient, and said algorithm (a), (b), (c), or (d) is selected according to the following criteria: if the state of both said first and said second indicators is a "one" and said odd-even indicator is even, and the sign of said quotient is negative, select algorithm (a); if the state of both of said first and second indicators is a "one" and said odd-even indicator is even, and the sign of said quotient is positive, select algorithm (b); if the state of said second indicator is a "one" and the state of said first indicator is a "zero" and said odd-even indicator is odd, and the sign of said quotient is positive, select algorithm (c); if the state of said second indicator is a "one" and the state of said first indicator is a "zero" and said odd-even indicator is odd, and the sign of said quotient is negative, select algorithm (d); if the state of both said second indicator and said first indicator is a "zero" and the state of said odd-even indicator is odd and the sign of said quotient is positive, select algorithm (c); if the state of both said second indicator and said first indicator is a "zero" and the state of said odd-even indicator is odd and the sign of said quotient is negative, select algorithm (d); if the state of both said first and second indicators is "zero" and the state of said odd-even indicator is even and the sign of said quotient is positive, select algorithm (d); if the state of both said first and second indicators is "zero" and the state of said odd-even indicator is even and the sign of said quotient is negative, select algorithm (c); if the state of said second indicator is a "zero" and the state of said first indicator is a "one" and the state of said odd-even indicator is even and the sign of said quotient is positive, select algorithm (b); if the state of said second indicator is a "zero" and the state of said first indicator is a "one" and the state of said odd-even indicator is even and the sign of said quotient is negative, select algorithm (a);

j. replacing the state of said second indicator with the state of said first indicator;

k. terminating said signal inhibiting time measurement when it equals said predicted ideal length resulting from the use of said algorithm and, following the termination of said signal inhibiting period, sensing the next symbol boundary transition signal, storing the polarity of said signal in a temporary storage, comparing the polarity of said transition with said reference polarity, and if said polarities correspond, setting said first indicator to a binary 1, entering a "one" into a data register, and examining the state of said odd-even indicator, and if it is odd, changing the sign of said quotient, but if said signal polarities do not correspond, entering a "zero" into said data register and setting said first indicator to a binary 0;

l. terminating said symbol width measurement and reinitiating said symbol width measurement and reinitiating said signal inhibiting time measurement when said symbol boundary transition is sensed and resuming operation at step h); and m. storing the polarity of said temporary storage as the next said reference polarity.

5. The method as described in claim 4, further comprising:

predicting an ideal reinitiation time for said signal inhibiting time measurement by using the $+\alpha$ form of said selected algorithm.

6. The method as described in claim 5, further comprising:

predicting an ideal length for said signal inhibiting time measurement by using the $-\alpha$ form of said selected algorithm; and reinitiating of said signal inhibiting time measurement at said ideal precipitated time therefor.

7. In an F2F coded data decoder apparatus system in which the time periods or widths between signal transitions corresponding to the two frequencies originally used to encode the data may be distorted by spread and by acceleration effects in the sensing or in the encoding of said data to exhibit their signal transition points spaced at other than the ideal frequency transition spacing or times, a method of operating said decoder apparatus for interpreting said distorted F2F coded data to extract therefrom its correct digital content whenever each multibit data block is preceded by at least a binary 1 preamble or first symbol having two double frequency time slots, or nominal half-symbol widths, by predicting the ideal length of an inhibiting period and controlling the duration of said inhibiting period imposed by said decoding apparatus for any said double frequency signal transitions occurring intermediate the single frequency symbol boundary transition, thereby isolating said boundary transitions for interpretation, comprising the steps performed by means in said apparatus of:

a. measuring the width of either of the two time slots in said first symbol;

b. measuring the width of said first symbol and, when said measurement is complete, storing said measurement in a first and a second storage, initiating a signal inhibiting time measurement and reinitiating steps a) and b) for the next succeeding symbol and setting a first and a second indicator to a binary 1 state and setting an odd-even indicator to the even state;

c. storing as a reference the polarity of the symbol boundary transition signal at the end of said symbol width measurement;

d. doubling the measurement made of said time slot;

e. examining the state of said first indicator and, if it is in the binary "1" state, dividing the difference between said doubled time slot measurement and said symbol width measurement by said symbol width measurement to yield a quotient;

f. assigning an algebraic positive or negative sign to said quotient, said sign being positive if said doubled time slot measurement is greater than said symbol width measurement and negative if said doubled time slot measurement is less than said symbol width measurement when said time slot measurement is made on said first time slot in said first measuring step, but said signs being the opposite if said second time slot was measured in said time slot measuring step;

g. selecting an algorithm and predicting an ideal length for said signal inhibiting time measurement, said algorithm being chosen from the following:

(a) $T_{ti} = T_{n-1} \left(\dfrac{T_{n-1}}{T_{n-2}}\right) \left[(1+\alpha) - \dfrac{|K_p|}{4}\right]$, (b) $T_{ti} = T_{n-1} \left(\dfrac{T_{n-1}}{T_{n-2}}\right) \left[(1+\alpha) + \dfrac{|K_p|}{4}\right]$, (c) $T_{ti} = T_{n-1} \left(\dfrac{T_{n-1}}{T_{n-2}}\right) \left[\dfrac{4(1+\alpha) - |K_p|}{(2+K_p)^2}\right]$, (d) $T_{ti} = T_{n-1} \left(\dfrac{T_{n-1}}{T_{n-2}}\right) \left[\dfrac{4(1+\alpha) + |K_p|}{(2-|K_p|)}\right]$, (e) $T_{ti} = T_{n-1} \left(\dfrac{T_{n-1}}{T_{n-2}}\right) \left[\dfrac{2 - |K_p|}{(2+|K_p|)^2} \quad 2(1+\alpha) - \dfrac{|K_p|}{2}\right]$, (f) $T_{ti} = T_{n-1} \left(\dfrac{T_{n-1}}{T_{n-2}}\right) \left[\dfrac{2 + |K_p|}{(2-|K_p|)^2} \quad 2(1+\alpha) + \dfrac{|K_p|}{2}\right]$, (g) $T_{ti} = T_{n-1} \left(\dfrac{T_{n-1}}{T_{n-2}}\right) \left[1 - \dfrac{|K_p|}{2}, \quad (1+\alpha) - \dfrac{|K_p|}{4}\right]$, or (h) $T_{ti} = T_{n-1} \left(\dfrac{T_{n-1}}{T_{n-2}}\right) \left[1 + \dfrac{|K_p|}{2} \quad (1+\alpha) + \dfrac{|K_p|}{4}\right]$, where $\alpha$ is a variable coefficient arbitrarily chosen from the range $K_{p/4}$ to $\frac{1}{2} - K_{p/4}$ and being optimum at $\alpha = \frac{1}{4}$, $T_{ti}$ is the predicted ideal length for said signal inhibiting time, $T_{n-1}$ in said last symbol width measurement, $T_{n-2}$ is the next to last symbol width measurement, and $K_p$ is the absolute value of said quotient, and said algorithm (a), (b), (c), (d), (e), (f), (g), or (h) is selected according to the following criteria: if said first and said second indicators are in the binary "1" state, and said odd-even indicator is even, and the sign of said quotient is negative, select algorithm (a); if the state of said first and said second indicators is a binary "1", and said odd-even indicator is even, and the sign of said quotient is positive, select algorithm (b); if the state of said second indicator is a one and the state of said first indicator is a zero and said odd-even indicator is odd, and the sign of said quotient is positive, select algorithm (c); if the state of said first indicator is a zero and the state of said second indicator is a one, and said odd-even indicator is odd, and the sign of said quotient is negative, select algorithm (d); if the state of said second indicator is a zero and the state of said first indicator is a zero and the state of said odd-even indicator is odd and the sign of said quotient is negative, select algorithm (f); if the state of said second indicator is a zero and the state of said first indicator is a zero and the state of said odd-even indicator is odd, and the sign of said quotient is positive, select algorithm (e); if the state of said second indicator is a zero and the state of said first indicator is a zero and the state of said odd-even indicator is even and the sign of said quotient is positive, select algorithm (f); if the state of said second indicator is zero and the state of said first indicator is zero and the state of said odd-even indicator is even and the sign of said quotient is negative, select algorithm (e); if the state of said second indicator is a zero and the state of said first indicator is a one and the state of said odd-even indicator is even and the sign of said quotient is negative, select algorithm (g); and, if the state of said second indicator is a zero and the state of said first indicator is a one and the state of said odd-even indicator is even and the sign of said quotient is positive, select algorithm (h);

h. replacing the state of said second indicator with the state of said first indicator;

i. replacing the content of said second storage with the content of said first storage;

j. terminating said signal inhibiting measurement when it is equal to said predicted length resulting from the use of said algorithm and, following the termination of said signal inhibiting period, sensing the next symbol boundary transition signal, storing the polarity of said signal in a temporary storage, comparing the polarity of said transition with said reference polarity and, if said polarities correspond, setting said first indicator to a binary 1 and, entering a one into a data register, and reinitiating said signal inhibiting time measurement, and terminating said symbol width measurement, and reinitiating said symbol width and time slot measurements and storing said symbol width measurement just completed in said first storage, setting said odd-even indicator to the even state, and resuming operation at step d), but if said polarities do not correspond, terminating said symbol width measurement, reinitiating said measuring steps a) and b) and said signal inhibiting time measurement period and storing said completed symbol width measurement in said first storage and entering a zero into said data register, setting said first indicator to the 0 state, setting said odd-even indicator to the opposite of whatever state it is then in, and resuming operation with step g); and k. storing the polarity contents of said temporary storage as the next said reference polarity.

8. The method as described in claim 7, further comprising:
predicting an ideal reiniation time for said signal inhibiting time measurement by using the $+\alpha$ form of said selected algorithm.

9. The method as described in claim 8, further comprising:
predicting an ideal length for said signal inhibiting time measurement by using the $-\alpha$ form of said selected algorithm; and
reinitiating of said signal inhibiting time measurement at said ideal predicted time therefor.

10. In an F2F coded data decoder apparatus system, in which the time periods or widths between signal transitions corresponding to the two frequencies originally used to encode the data may be distorted by spread and by acceleration effects in the sensing or in the encoding of said data to exhibit their signal transition points spaced at other than the original frequency transition spacing or times, a method of operating said decoder apparatus for interpreting said distorted F2F coded data to extract therefrom its correct digital content whenever each multibit data block is preceded by at least a binary 1 preamble or first symbol having two double frequency time slots, or half-symbol widths, by predicting the ideal length of an inhibiting period and controlling the duration of said inhibiting period imposed by said decoding apparatus for any said double frequency signal transitions occurring intermediate the single frequency symbol boundary transitions, thereby isolating said boundary transitions for interpretation, comprising the steps performed by means in said apparatus of:

a. measuring either one of said two time slots in said first symbol;

b. measuring the total width of said first symbol and, when said measurement is complete, storing said measurement in a first and a second storage and initiating a signal inhibiting time measurement and reinitiating step b) measurement for the next succeeding symbol and setting a first and a second indicator to a binary 1 state;

c. storing as a reference the polarity of the symbol boundary transition signal at the end of said symbol width measurement;

d. doubling said time slot measurement;

e. dividing the difference between said doubled time slot measurement and said symbol width measurement by said symbol width measurement to yield a quotient;

f. assigning an algebraic positive or negative sign to said quotient, said sign being positive if said doubled time slot measurement is greater than said symbol width measurement and negative if said doubled time slot measurement is less than said symbol width measurement, provided that some time slot measurement is made on said first time slot in said first symbol, said signs being the opposite of said second time slot that was measured in said first symbol;

g. examining the state of said first indicator and if said first indicator is then in the "zero" state, setting an odd-even indicator to the opposite of whichever state it is then in, but if said first indicator is then in the "one" state, setting said first odd-even indicator to the even state;

h. selecting an algorithm and predicting an ideal length for said signal inhibiting time measurement, said algorithm being chosen from the following:

(a) $T_{i9} = T_{n-1} \left(\dfrac{T_{n-1}}{T_{n-2}}\right) \left[1 \pm \alpha) - \dfrac{|K_p|}{4}\right]$, (b) $T_{i9} = T_{n-1} \left(\dfrac{T_{n-1}}{T_{n-2}}\right) \left[(1 \pm \alpha) + \dfrac{|K_p|}{4}\right]$, (c) $T_{i9} = T_{n-1} \left(\dfrac{T_{n-1}}{T_{n-2}}\right) \left[\dfrac{4(1 \pm \alpha) - |K_p|}{(2 + |K_p|)^2}\right]$, (d) $T_{i9} = T_{n-1} \left(\dfrac{T_{n-1}}{T_{n-2}}\right) \left[\dfrac{4(1 \pm \alpha) + |K_p|}{(2 - |K_p|)^2}\right]$, -continued (e) $T_{i_0} = T_{n-1} \left(\dfrac{T_{n-1}}{T_{n-2}}\right) \left[\dfrac{2 - |K_p|}{(2 + |K_p|)^2}\right] \left[2(1 \pm \alpha) - \dfrac{|K_p|}{2}\right],$ (f) $T_{i_0} = T_{n-1} \left(\dfrac{T_{n-1}}{T_{n-2}}\right) \left[\dfrac{2 + |K_p|}{(2 - |K_p|)^2}\right] \left[2(1 \pm \alpha) + \dfrac{|K_p|}{2}\right],$ (g) $T_{i_0} = T_{n-1} \left(\dfrac{T_{n-1}}{T_{n-2}}\right) \left[1 - \dfrac{|K_p|}{2}\right] \left[(1 \pm \alpha) - \dfrac{|K_p|}{4}\right],$ or (h) $T_{i_0} = T_{n-1} \left(\dfrac{T_{n-1}}{T_{n-2}}\right) \left[1 + \dfrac{|K_p|}{2}\right] \left[(1 \pm \alpha) + \dfrac{|K_p|}{4}\right],$ where $\alpha$ is a variable coefficient arbitrarily chosen from the range $K_{p/4}$ to $\frac{1}{2} - K_{p/4}$ and being optimum at $\alpha = \frac{1}{4}$, $T_{i_0}$ is the predicted ideal length for said signal inhibiting time, $T_{n-1}$ is said first stored symbol width measurement, $T_{n-2}$ is the second stored symbol width measurement, and $K_p$ is the absolute value of said quotient, and said algorithm (a), (b), (c), (d) (e), (f), (g), or (h) is selected according to the following criteria: if said first and second indicators are in the binary 1 state, and said odd-even indicator is even, and the sign of sid quotient is negative, select algorithm (a); if the state of said first and said second indicator is a binary "1", and said odd-even indicator is even, and the sign of said quotient is positive, select algorithm (b); if the state of said second indicator is a one and the state of said first indicator is a zero, and said odd-even indicator is odd, and the sign of said quotient is positive, select algorithm (c); if the state of said first indicator is a zero and the state of said second indicator is a one, and said odd-even indicator is odd, and the sign of said quotient is negative, select algorithm (d); if the state of said second indicator is a zero and the state of said first indicator is a zero and the state of said odd-even indicator is odd and the sign of said quotient is negative, select algorithm (f); if the state of said second indicator is a zero and the state of said odd-even indicator is odd, and the sign of said quotient is positive, select algorithm (e); if the state of said second indicator is a zero and the state of said first indicator is a zero and the state of said odd-even indicator is even and the sign of said quotient is positive, select algorithm (f); if the state of said second indicator is zero and the state of said first indicator is zero and the state of said odd-even indicator is even and the sign of said quotient is negative, select algorithm (e); if the state of said second indicator is a zero and the state of said first indicator is a one and the state of said odd-even indicator is even and the sign of said quotient is negative, select algorithm (g); and, if the state of said second indicator is a zero and the state of said first indicator is a one and the state of said odd-even indicator is even and the sign of said quotient is positive, select algorithm (h);

i. replacing the state of said second indicator with the state of said first indicator;
  j. replacing the content of said second storage with the content of said first storage;
  k. terminating said signal inhibiting measurement when it equals said ideal length resulting from the use of said algorithm and, following the termination of said signal inhibiting period, sensing the next symbol boundary transition signal, storing the polarity of said signal in a temporary storage, comprising the polarity of said transition with said reference polarity, and if said polarities correspond, setting said first indicator to a binary 1 state, entering a one into into a data register, examining the state of said first odd-even indicator, and if said first odd-even indicator is then in the odd state, changing the sign of said quotient to the opposite of whichever sign it is then in, but if said polarities do not correspond, setting said first indicator to a binary "0" state, and entering a 0 into a data register;
  1. terminating said symbol width measurement and storing said measurement in said first storage and reinitating said symbol width measurement and reinitiating said signal inhibiting time measurement when said symbol boundary transition is sensed and resuming operation at step g); and
  m. storing the polarity contents of said temporary storage as the next said reference polarity.

11. The method as described in claim 10, further comprising:
  predicting an ideal reininitiation time for said signal inhibiting time measurement by using the $+\alpha$ form of said selected algorithm.

12. The method as described in claim 11, further comprising:
  predicting an ideal length for said signal inhibiting time measurement by using the $-\alpha$ form of said selected algorithm; and
  reinitiating of said signal inhibiting time measurement at said ideal predicted time therefor.

13. In an F2F coded data decoder apparatus system, in which the time periods or widths between signal transitions corresponding to the two frequencies originally used to encode the data may be distorted by spread, when received at said decoder, so as to exhibit their signal transition points spaced at other than the original frequency transition spacing or times, a method of operating said decoder apparatus for interpreting said distorted F2F coded data to extract therefrom its correct ditital content whenever each multibit data block is preceded by at least two binary 1 preamble or first symbols having two double frequency time slots, or nominal half-symbol widths, by predicting the ideal length of an inhibiting period and controlling the duration of said inhibiting period imposed by said decoding apparatus for any side double frequency signal transitions occurring intermediate the single frequency symbol boundary transitions, thereby isolating said boundary transitions for interpretation, comprising the steps performed by means in said apparatus of:
  a. measuring the widths of both of said preamble symbols;
  b. setting a first and a second indicator to a binary 1 state;
  c. measuring either of the two time slots in either of said first two symbols, and at the end of said second symbol, reinitiating the symbol width measurement and the time slot measurement for the next succeeding symbol and initiating a signal inhibiting time measurement;
  d. storing as a reference the polarity of the symbol boundary transition signal at the end of said second symbol width measurement;
  e. examining the state of both said first and second indicators and, if both are in the binary 1 state, and if said time slot measurement was made in the first time slot of either of said symbols, dividing said time slot measurement by said symbol width measurement corresponding to the symbol in which said time slot measurement was made and subtracting therefrom said second symbol divided by the sum of said first symbol width and said second symbol width and doubling the result, to yield a spread correction factor, but if said time slot measurement was made in the second time slot of either of said symbols, subtracting instead said first symbol width measurement divided by the sum of said first symbol and said second symbol and doubling the result, to yield a spread correction factor and, if both said first and second indicators are not in the binary 1 state, proceeding to step g);

f. assigning an algebraic positive or negative sign to said spread correction factor, said sign being positive if the quotient resulting from said time slot divided by a symbol width is greater than, and negative if said quotient is less than the appropriate said symbol width divided by the sum of said first and said second symbol widths and if said time slot measurement was made in the first slot of either of said symbols, but said sign being the opposite whenever said time slot measurement is made in the second time slot of either of said symbols;

g. examining the state of said first indicator, and if it is in the binary 1 condition, setting an odd-even indicator to the even state, but if said first indicator is not in the binary 1 state, setting said odd-even indicator to the opposite of whichever stat it is then in;

h. selecting an algorithm and predicting an ideal length for said signal inhibiting time measurement, said algorithm being chosen from the following:

(a) $T_{ta} = T_{n-1} \left[ (1 \pm \alpha) - \frac{|K_p|}{4} \right]$, (b) $T_{ta} = T_{n-1} \left[ (1 \pm \alpha) + \frac{|K_p|}{4} \right]$, (c) $T_{ta} = T_{n-1} \left[ \frac{2(1 \pm \alpha) - \frac{|K_p|}{2}}{2 + |K_p|} \right]$, or (d) $T_{ta} = T_{n-1} \left[ \frac{2(1 \pm \alpha) + \frac{|K_p|}{2}}{2 - |K_p|} \right]$ where $\alpha$ is a variable coefficient arbitrarily chosen from the range $K_{p/4}$ to $\frac{1}{2} - K_{p/4}$ and being optimum at $\alpha = \frac{1}{4}$, $T_{ta}$ is the predicted ideal length for said signal inhibiting time period, $T_{n-1}$ is the last symbol width measurement made, and $K_p$ is the absolute value of the result computed in step d) and said algorithm (a), (b), (c), or (d) is selected according to the following criteria: if the state of both said first and said second indicators is a "one" and said odd-even indicator is even, and the sign of said quotient is negative, select algorithm (a); if the state of both of said first and second indicators is a "one" and said odd-even indicator is even, and the sign of said quotient is positive, select algorithm (b); if the state of said second indicator is a "one" and the state of said first indicator is a "zero" and said odd-even indicator is odd, and the sign of said quotient is positive, select algorithm (c); if the state of said second indicator is a "one" and the state of said first indicator is a "zero" and said odd-even indicator is odd, and the sign of said quotient is negative, select algorithm (d); if the state of both said second indicator and said first indicator is a "zero" and the state of said odd-even indicator is odd and the sign of said quotient is positive, select algorithm (c); if the state of both said second indicator and said first indicator is a "zero" and the state of said odd-even indicator is odd and the sign of said quotient is negative, select algorithm (d); if the state of both said first and second indicators is "zero" and the state of said odd-even indicator is even and the sign of said quotient is positive, select algorithm (d); if the state of both said first and second indicators is "zero" and the state of said odd-even indicator is even and the sign of said quotient is negative, select algorithm (c); if the state of said second indicator is a "zero" and the state of said first indicator is a "one" and the state of said odd-even indicator is even and the sign of said quotient is positive, select algorithm (b); if the state of said second indicator is a "zero" and the state of said first indicator is a "one" and the state of said odd-even indicator is even and the sign of said quotient is negative, select algorithm (a);

i. replacing the state of said second indicator with the state of said first indicator;

j. terminating said signal inhibiting time measurement when it equals said predicted ideal length for said time measurement resulting from step h) and, following the termination of said signal inhibiting period, sensing the next symbol boundary transition signal, storing the polarity of said signal in a temporary storage, comparing the polarity of said transition with said reference polarity and, if said polarities correspond, setting said first indicator to a binary 1, entering a one into a data register, and examining the state of said first odd-even indicator and if said odd-even indicator is in the odd state, changing the sign of said correction factor as was assigned to said factor in step f), and, when said symbol boundary transition is sensed, terminating said symbol width measurement and reinitiating said time slot and symbol width measurements for the next succeeding symbol, and resuming operation with step e), but if said polarities do not correspond, terminating said symbol width measurements at the symbol boundary transition occurring after the termination of said signal inhibiting time period, entering a zero into a data register, and setting said first indicator to a binary 0, reinitiating said symbol width and time slot measurements for the next succeeding symbol, and returning to step g); and k. storing the polarity contents of said temporary storage as the next said reference polarity.

14. The method as described in claim 13, further comprising:
predicting an ideal reinitiation time for said signal inhibiting time measurement by using the $+\alpha$ form of said selected algorithm.

15. The method as described in claim 14, further comprising:
predicting an ideal length for said signal inhibiting time measurement by using the $-\alpha$ form of said selected algorithm; and
reinitiating of said signal inhibiting time measurement at said ideal predicted time therefor.

16. In an F2F coded data decoder apparatus system, in which the time periods or widths between signal transitions corresponding to the two frequencies originally used to encode the data may be distorted by spread, when received at said decoder, so as to exhibit their signal transition points spaced at other than the original frequency transition spacing or times, a method of operating said decoder apparatus for interpreting said distorted F2F coded data to extract therefrom its correct digital content whenever each multibit data block is preceded by at least two binary 1 preamble or first symbols having two double frequency time slots, or nominal half-symbol widths, by predicting the ideal length of an inhibiting period and controlling the duration of said inhibiting period imposed by said decoding apparatus for any said double frequency signal transitions occurring intermediate the single frequency symbol boundary transitions, thereby isolating said boundary transitions for interpretation, comprising the steps performed by means in said apparatus of:
  a. measuring the width of both of said preamble symbols;
  b. setting a first and a second indicator to a binary 1 state;
  c. measuring either one of the two time slots in either of said first two symbols, and, at the end of said second symbol, initiating a signal inhibiting time measurement, and reinitiating said symbol width measurement;
  d. storing as a reference the polarity of the symbol boundary transition signal at the end of said second symbol width measurement;
  e. dividing said time slot measurement by said symbol width measurement correspondng to the symbol in which said time slot measurement was made and subtracting therefrom said second symbol width measurement divided by the sum of said first symbol width and said second symbol width and doubling the result, to yield a spread correction factor, but if said time slot measurement was made in the second time slot of either of said symbols, subtracting instead one said first symbol width measurement divided by the sum of said first symbol and said second symbol and doubling the result, to yield a spread correction factor;
  f. assigning an algebraic positive or negative sign to said resulting spread correction factor, said sign being positive if said doubled time slot measurement divided by said symbol width is greater than and negative if it is less than said either symbol width divided by the sum of said second symbol width and said first symbol width and if said time slot measurement was made in the first time slot of either said symbol, but said signs being the opposite when said time slot measurement is made in the second time slot of either of said symbols;
  g. examining the state of said first indicator, and if it is in the binary 1 condition, setting an odd-even indicator to the even state, but if said first indicator is not in the binary 1 state, setting said odd-even indicator to the opposite of whichever state it is then in;
  h. selecting an algorithm and predicting an ideal length for said signal inhibiting time measurement, said algorithm being chosen from the following:

$$\text{(a)} \quad T_{i_0} = T_{n-1} \left[ (1 \pm \alpha) - \frac{|K_p|}{4} \right],$$

$$\text{(b)} \quad T_{i_0} = T_{n-1} \left[ (1 \pm \alpha) + \frac{|K_p|}{4} \right],$$

$$\text{(c)} \quad T_{i_0} = T_{n-1} \left[ \frac{2(1 \pm \alpha) - \frac{|K_p|}{2}}{2 + |K_p|} \right], \text{ or}$$

$$\text{(d)} \quad T_{i_0} = T_{n-1} \left[ \frac{2(1 \pm \alpha) + \frac{|K_p|}{2}}{2 - |K_p|} \right]$$

where $\alpha$ is a variable coefficient arbitrarily chosen from the range $K_{p/4}$ to $\frac{1}{2} - K_{p/4}$ and being optimum at $\alpha = \frac{1}{4}$, $T_{i_0}$ is the predicted ideal length for said signal inhibiting time period, $T_{n-1}$ is the last symbol width measurement made, and $K_p$ is the absolute value of the result computed in step d) and said algorithm (a), (b), (c), or (d) is selected accoding to the following criteria: if the state of both said first and said second indicators is a "one" and said odd-even indicator is even, and the sign of said quotient is negative, select algorithm (a); if the state of both of said first and second indicators is a "one" and said odd-even indicator is even, and the sign of said quotient is positive, select algorithm (b); if the state of said second indicator is a "one" and the state of said first indicator is a "zero" and said odd-even indicator is odd, and the sign of said quotient is positive, select algoritlim (c); if the state of said second indicator is a "one" and the state of said first indicator is a "zero" and said odd-even indicator is odd, and the sign of said quotient is negative, select algorithm (d); and if the state of both said second indicator and said first indicator is a "zero" and the state of said odd-even indicator is odd and the sign of said quotient is positive, select algorithm (c); if the state of both said second indicator and said first indicator is a "zero" and the state of said odd-even indicator is odd and the sign of said quotient is negative, select algorithm (d); if the state of both said first and second indicators is "zero" and the state of said odd-even indicator is even and the sign of said quotient is positive, select algorithm (d); if the state of both said first and second indicators is "zero" and the state of said odd-even indicator is even and the sign of said quotient is negative, select algorithm (c); if the state of said second indicator is a "zero" and the state of said first indicator is a "one" and the state of said odd-even indicator is even and the sign of said quotient is positive, select algorithm (b); if the state of said second indicator is a "zero" and the state of said first indicator is a "one" and the state of said odd-even indicator is even and the sign of said quotient is negative, select algorithm (a);
  i. replacing the state of said second indicator with the state of said first indicator;
  j. terminating said signal inhibiting time measurement when it equals said predicted ideal length for said time measurement resulting from step h) and, following the termination of said signal inhibiting period, sensing the next symbol boundary transition signal, storing the polarity of said signal in a temporary storage, comparing the polarity of said transition with said reference polarity, and if said polarities correspond, setting said first indicator to a binary 1, entering a one into a data register, and examining the state of said odd-even indicator and if said odd-even indicator is in the odd state, changing the sign of said spread correction factor as was assigned to said factor is step f), and, at said signal transition, terminating said symbol width measurement and reinitiating said symbol width measurement for the next succeeding symbol, and resuming operation with step g), but if said polarities do not correspond, terminating said symbol width measurement at said signal transition occurring after the termination of said signal inhibiting time period, entering a zero into a data register, and setting said first indicator to a binary 0, reinitiating said symbol width measurement for the next succeeding symbol, and returning to step g); and k. storing the polarity contents of said temporary storage as the next said reference polarity.

17. The method as described in claim 16, further comprising:
   predicting an ideal reinitiation time for said signal inhibiting time measurement by using the $+\alpha$ form of said selected algorithm.

18. The method as described in claim 17, further comprising:
   predicting an ideal length for said signal inhibiting time measurement by using the $-\alpha$ form of said selected algorithm; and
   reinitiating of said signal inhibiting time measurement at said ideal predicted time therefor.

19. In an F2F coded data decoder apparatus system in which the time periods or widths between signal transitions corresponding to the two frequencies originally used to encode the data may be distorted by spread and by acceleration effects in the sensing or in the encoding of said data to exhibit their signal transition points spaced at other than the ideal frequency transition spacing or times, a method of operating said decoder apparatus for interpreting said distorted F2F coded data to extract therefrom its correct digital content whenever each multibit data block is preceded by at least two binary 1 preamble or first symbols having two double frequency time slots, or nominal half-symbol widths, by predicting the ideal length of an inhibiting period and controlling the duration of said inhibiting period imposed by said decoding apparatus for any said double frequency signal transitions occurring intermediate the single frequency symbol boundary transitions, thereby isolating said boundary transitions for interpretation, comprising the steps performed by means in said apparatus of:

a. measuring the width of said first symbol and storing said measurement in a second storage;

b. setting a second indicator to a binary 1 state;

c. measuring the width of said second symbol and storing said measurement in a first storage;

d. setting a first indicator to the binary 1 state;

e. measuring either of the two time slots in either of said first two symbols, and reinitiating the symbol width measurement and the time slot measurement for the next succeeding symbol and initiating a signal inhibiting time measurement;

f. storing as a reference the polarity of the symbol boundary transition signal at the end of said second symbol width measurement;

g. examining the state of both said first and said second indicators and, if both are in the binary 1 state, and if said time slot measurement was made in the first slot of either of said symbols, dividing said time slot measurement by said symbol width measurement corresponding to the symbol in which said time slot measurement was made and subtracting therefrom said second symbol width measurement divided by the sum of said first symbol width and said second symbol width, but if said time slot measurement was made in the second time slot of either of said symbols, subtracting instead said first symbol width measurement divided by the sum of said first symbol and said second symbol and doubling the result, to yield a spread correction factor and, if both said first and second indicators are not in the binary 1 state, proceeding to step i);

h. assigning an algebraic positive or negative sign to said spread correction factor, said sign being positive if said time slot divided by a symbol width quotient is greater and negative if said quotient is less than the appropriate said symbol width divided by the sum of said first and second symbol widths and if said time slot measurement was made in the first slot of either of said symbols, but said sign being the opposite whenever said time slot measurement is made in the second time slot of either of said symbols;

i. examining the state of said first indicator, and if it is in the binary 1 condition, setting an odd-even indicator to the even state, but if said first indicator is not in the binary 1 state, setting said odd-even indicator to the opposite of whichever statte it is then in;

j. a step of selecting an algorithm for predicting an ideal length for said signal inhibiting time measurement, said algorithm being chosen from the following:

(a) $T_{ia} = T_{n-1} \left(\frac{T_{n-1}}{T_{n-2}}\right) \left[(1 \pm \alpha) - \frac{|K_p|}{4}\right]$, (b) $T_{ia} = T_{n-1} \left(\frac{T_{n-1}}{T_{n-2}}\right) \left[(1 \pm \alpha) + \frac{|K_p|}{4}\right]$, (c) $T_{ia} = T_{n-1} \left(\frac{T_{n-1}}{T_{n-2}}\right) \left[\frac{4(1 \pm \alpha) - |K_p|}{(2 + |K_p|)^2}\right]$, (d) $T_{ia} = T_{n-1} \left(\frac{T_{n-1}}{T_{n-2}}\right) \left[\frac{4(1 \pm \alpha) + |K_p|}{(2 - |K_p|)^2}\right]$, (e) $T_{ia} = T_{n-1} \left(\frac{T_{n-1}}{T_{n-2}}\right) \left[\frac{2 - |K_p|}{(2 + |K_p|)^2}\right] \left[2(1 \pm \alpha) - \frac{|K_p|}{2}\right]$, (f) $T_{ia} = T_{n-1} \left(\frac{T_{n-1}}{T_{n-2}}\right) \left[\frac{2 + |K_p|}{(2 - |K_p|)^2}\right] \left[2(1 \pm \alpha) + \frac{|K_p|}{2}\right]$, (g) $T_{ia} = T_{n-1} \left(\frac{T_{n-1}}{T_{n-2}}\right) \left[1 - \frac{|K_p|}{2}\right] \left[(1 \pm \alpha) - \frac{|K_p|}{4}\right]$, or (h) $T_{ia} = T_{n-1} \left(\frac{T_{n-1}}{T_{n-2}}\right) \left[1 + \frac{|K_p|}{2}\right] \left[(1 \pm \alpha) + \frac{|K_p|}{4}\right]$.

where $\alpha$ is a variable coefficient arbitrarily chosen from the range $K_{p/4}$ to $\frac{1}{2} - K_{p/4}$ and being optimum at $\alpha = \frac{1}{4}$, $T_{ia}$ is the predicted ideal length for said signal inhibiting time measurement, $T_{n-1}$ is said first stored measurement, $T_{n-2}$ is said second stored measurement, and $K_p$ is said result computed in said step f) above, and said algorithm (a), (b), (c), (d), (e), (f), (g), or (h) is selected according to the following criteria: if said first and said second indicators are in the binary "1" state, and said odd-even indicator is even, and the sign of said quotient is negative, select algorithm (a); if the state of said first and said second indicators is a binary 1, and said odd-even indicator is even, and the sign of said quotient is positive, select algorithm (b); if the state of said second indicator is a one and the state of said first indicator is a zero and said odd-even indicator is odd, and the sign of said quotient is positive, select algorithm (c); if the state of said first indicator is a zero and the state of said second indicator is a one, and said odd-even indicator is odd, and the sign of said quotient is negative, select algorithm (d); if the state of said second indicator is a zero and the state of said first indicator is a zero and the state of said odd-even indicator is odd and the sign of said quotient is negative, select algorithm (f); if the state of said second indicator is a zero and the state of said first indicator is a zero and the state of said odd-even indicator is odd, and the sign of said quotient is positive, select algorithm (e); if the state of said second indicator is a zero and the state of said first indicator is a zero and the state of said odd-even indicator is even and the sign of said quotient is positive, select algorithm (f); if the state of said second indicator is zero and the state of said first indicator is zero and the state of said odd-even indicator is even and the sign of said quotient is negative, select algorithm (e); if the state of said second indicator is a zero and the state of said first indicator is a one and the state of said odd-even indicator is even and the sign of said quotient is negative, select algorithm (g); and, if the state of said second indicator is a zero and the state of said indicator is a one and the state of said odd-even indicator is even and the sign of said quotient is positive, select algorithm (h);

k. replacing the contents of said second indicator with the content of said first storage;

l. replacing the state of said second indicator with the state of said first indicator;

m. terminating said signal inhibiting time measurement when it equals said predicted ideal length for said time measurement resulting from step j) and, following the termination of said signal inhibiting period, sensing the next symbol boundary transition signal, storing the polarity of said signal in a temporary storage, comparing the polarity of said transition with said reference polarity and, if said polarities correspond, setting said first indicator to a binary 1, entering a one into a data register, and examining the state of said odd-even indicator and if said odd-even indicator is in the odd state, changing the sign of said spread correction factor as was assigned to said factor in step h), and, at said signal transition, terminating said symbol width measurement, storing said symbol width measurement in said first storage and reinitiating said time slot and symbol width measurements for the next succeeding symbol, and resuming operation with step g), but if said polarities do not correspond, terminating said symbol width measurement at said signal transition occurring after the termination of said signal inhibiting time period, storing said symbol width measurement in said first storage, entering a zero into a data register, and setting said first indicator to a binary 0, reinitiating said symbol width and time slot measurements for the next succeeding symbol, and returning to step g); and n. storing the polarity contents of said temporary storage as the next said reference polarity.

20. The method as described in claim 19, further comprising:

predicting an ideal reinitiation time for said signal inhibiting time measurement by using the +α form of said selected algorithm.

21. The method as described in claim 20, further comprising:

predicting an ideal length for said signal inhibiting time measurement by using the −α form of said selected algorithm; and reinitiating of said signal inhibiting time measurement at said ideal predicted time therefor.

22. In an F2F coded data decoder apparatus system, in which the time periods or widths between signal transitions corresponding to the two frequencies originally used to encode the data may be distorted by spread and by acceleration effects in the sensing or in the encoding of said data to exhibit their signal transition points spaced at other than the original frequency transition spacing or times, a method of operating said decoder apparatus for interpreting said distorted F2F coded data to extract therefrom its correct digital content whenever each multibit data block is preceded by at least two binary 1 preamble or first symbols having two double frequency time slots, or half-symbol widths, by predicting the ideal length of an inhibiting period and controlling the duration of said inhibiting period imposed by said decoding apparatus for any said double frequency signal transitions occurring intermediate the single frequency symbol boundary transitions, thereby isolating said boundary transitions for interpretation, comprising the steps performed by means in said apparatus of:

a. measuring the width of said first symbol and storing said measurement in a second storage;

b. setting a second indicator to a binary 1 state;

c. measuring the width of said second symbol and storing said measurement in a first storage;

d. setting a first indicator to the binary 1 state;

e. measuring either one of the two time slots in either of said first two symbols, initiating a signal inhibiting time measurement, and reinitiating said symbol width measurement;

f. storing as a reference the polarity of the symbol boundary transition signal at the end of said second symbol width measurement;

g. dividing said time slot measurement by said symbol width measurement corresponding to the symbol in which said time slot measurement was made and subtracting therefrom said second symbol width measurement divided by the sum of said first symbol width and said second symbol width, and doubling the result, to yield a spread correction factor, but if said time slot measurement was made in the second time slot of either of said symbols, subtracting instead said first symbol width measurment divided by the sum of said first symbol and said second symbol, and doubling the result, to yield a spread correction factor;

h. assigning an algebraic positive or negative sign to said resulting spread correction factor, said sign being positive if said doubled time slot measurement divided by said symbol width is greater than and negative if it is less than said either symbol width divided by the sum of said second symbol width and said first symbol width if said time slot measurement was made in the first time slot of either said symbol, but said signs being the opposite when said time slot measurement is made in the second time slot of either of said symbols;

i. examining the state of said first indicator, and if it is in the binary 1 condition, setting an odd-even indicator to the even state, but if said first indicator is not in the binary 1 state, setting said odd-even indicator to the opposite of whichever state it is then in;

j. selecting an algorithm and predicting an ideal length for said signal inhibiting time measurement,, said algorithm being chosen from the following:

(a) $T_{i\sigma} = T_{n-1} \left(\frac{T_{n-1}}{T_{n-2}}\right) \left[(1 \pm \alpha) - \frac{|K_p|}{4}\right]$, (b) $T_{i\sigma} = T_{n-1} \left(\frac{T_{n-1}}{T_{n-2}}\right) \left[(1 \pm \alpha) + \frac{|K_p|}{4}\right]$, (c) $T_{i\sigma} = T_{n-1} \left(\frac{T_{n-1}}{T_{n-2}}\right) \left[\frac{4(1 \pm \alpha) - |K_p|}{(2 + |K_p|)^2}\right]$, (d) $T_{i\sigma} = T_{n-1} \left(\frac{T_{n-1}}{T_{n-2}}\right) \left[\frac{4(1 \pm \alpha) + |K_p|}{(2 - |K_p|)^2}\right]$, (e) $T_{i\sigma} = T_{n-1} \left(\frac{T_{n-1}}{T_{n-2}}\right) \left[\frac{2 - |K_p|}{(2 + |K_p|)^2}\right] \left[2(1 \pm \alpha) - \frac{|K_p|}{2}\right]$, (f) $T_{i\sigma} = T_{n-1} \left(\frac{T_{n-1}}{T_{n-2}}\right) \left[\frac{2 + |K_p|}{(2 - |K_p|)^2}\right] \left[2(1 \pm \alpha) + \frac{|K_p|}{2}\right]$, (g) $T_{i\sigma} = T_{n-1} \left(\frac{T_{n-1}}{T_{n-2}}\right) \left[1 - \frac{|K_p|}{2}\right] \left[(1 \pm \alpha) - \frac{|K_p|}{4}\right]$, or (h) $T_{i\sigma} = T_{n-1} \left(\frac{T_{n-1}}{T_{n-2}}\right) \left[1 + \frac{|K_p|}{2}\right] \left[(1 \pm \alpha) + \frac{|K_p|}{4}\right]$, where $\alpha$ is a variable coefficient arbitrarily chosen from the range $K_{p/4}$ to $\frac{1}{2} - K_{p/4}$ and being optimum at $\alpha = \frac{1}{4}$, $T_{i\sigma}$ is the predicted ideal length for said signal inhibiting time, $T_{n-1}$ is said first stored measurement, $T_{n-2}$ is said second stored measurement, and $K_p$ is said result computed in step f) above, and said algorithm (a), (b), (c), (d), (e), (f), (g), or (h) is selected according to the following criteria: if said first and said second indicators are in the binary 1 state, and said odd-even indicator is even, and the sign of said quotient is negative, select algorithm (a); if the state of said first and said second indicators is a binary 1, and said odd-even indicator is even, and the sign of said quotient is positive, select algorithm (b); if the state of said second indicator is a one and the state of said first indicator is a zero and said odd-even indicator is odd, and the sign of said quotient is positive, select algorithm (c); if the state of said first indicator is a zero and the state of said second indicator is a one, and said odd-even indicator is odd, and the sign of said quotient is negative, select algorithm (d); if the state of said second indicator is a zero and the state of said first indicator is a zero and the state of said odd-even indicator is odd and the sign of said quotient is negative, select algorithm (f); if the state of said second indicator is a zero and the state of said first indicator is a zero and the state of said odd-even indicator is odd, and the sign of said quotient is positive, select algorithm (e); if the state of said second indicator is a zero and the state of said first indicator is a zero and the state of said odd-even indicator is even and the sign of said quotient is positive, select algorithm (f); if the state of said second indicator is zero and the state of said first indicator is zero and the state of said odd-even indicator is even and the sign of said quotient is negative, select algorithm (e); if the state of said second indicator is a zero and the state of said first indicator is a one and the state of said odd-even indicator is even and the sign of said quotient is negative, select algorithm (g); and, if the state of said second indicator is a zero and the state of said first indicator is a one and the state of said odd-even indicator is even and the sign of said quotient is positive, select algorithm (h);

k. replacing the contents of said second storage with the contents of said first storage;

l. replacing the state of said second indicator with the state of said first indicator;

m. terminating said signal inhibiting time measurement when it equals said predicted ideal length for said time measurement resulting from step j) and, following the termination if said signal inhibiting period, sensing the next symbol boundary transition signal, storing the polarity of said signal in a temporary storage, comparing the polarity of said transition with said reference polarity and, if said polarities correspond, setting said first indicator to a binary 1, entering a one into a data register, and examining the state of said odd-even indicator and if said odd-even indicator is in the odd state, changing the sign of said spread correction factor as was assigned to said factor in step h), and, at the signal transition, terminating said symbol width measurement, storing said symbol width measurement in said first storage, and reinitiating said symbol width measurement for the next succeeding symbol, and resuming operation with step i), but if said polarities do not corresond, terminating said symbol width measurement at said signal transition occurring after the termination of said signal inhibiting period, storing said symbol width measurement in said first storage, entering a zero into a data register, and setting said first indicator to a binary 0, reinitiating said symbol width measurement for the next succeeding symbol, and returning to step i); and n. storing the polarity contents of said temporary storage as the next said reference polarity.

23. The method as described in claim 22, further comprising:
predicting an ideal reinitiation time for said signal inhibiting time measurement by using the $+\alpha$ form of said selected algorithm.

24. The method as described in claim 23, further comprising:
predicting an ideal length for said signal inhibiting time measurement by using the $-\alpha$ form of said selected algorithm; and
reinitiating of said signal inhibiting time measurement at said ideal predicted time therefor.

25. In an F2F coded data decoder apparatus system, in which the time periods or widths between signal transitions corresponding to the two frequencies originally used to encode the data may be distorted by acceleration, when received at said decoder, so as to exhibit their signal transition points spaced at other than the original frequency transition spacing or times, a method of operating said decoder apparatus for interpreting said distorted F2F coded data to extract therefrom its correct digital content whenever each multibit data block is preceded by at least a binary 1 preamble or first symbol having two double frequency time slots, or nominal half-symbol widths, by predicting the ideal length of an inhibiting period and controlling the duration of said inhibiting period imposed by said decoding apparatus for any said double frequency signal transitions occurring intermediate the single frequency signal boundary transitions, thereby isolating said symbol boundary transitions for interpretation, comprising the steps performed by means in said apparatus of:

a. measuring the width of said first symbol and, when said measurement is completed, storing said measurement in a first and a second storage and initiating a signal inhibiting time measurement and reinitiating said symbol width measurement for the next succeeding symbol;

b. storing as a reference the polarity of the symbol boundary transition signal at the end of said second symbol width measurement;

c. predicting an ideal length for said signal inhibiting time measurement according to the following algorithm:

$$T_{i_a} = T_{n-1} \left( \frac{T_{n-1}}{T_{n-2}} \right) (1 \pm \alpha)$$

where $\alpha$ is a variable coefficient arbitrarily chosen from the range $K_{p/4}$ to $½ - K_{p/4}$ and being optimum at $\alpha = ¼$, $T_{i_a}$ is said ideal length for said data sensing time measurement, $T_{n-1}$ is said first stored width measurement, $T_{n-2}$ is said second stored width measurement;

d. replacing the content of said second storage with the content of said first storage;

e. terminating said signal inhibiting time measurement when it equals said ideal predicted length and, following the termination of said signal inhibiting period, sensing the next symbol boundary transition signal, storing the polarity of said signal in a temporary storage, comparing the polarity of said transition with said reference polarity, and if said polarities correspond, entering a "one" into a data register and if said polarities do not correspond, entering a "zero" into said data register;

f. terminating said reinitiated symbol width measurement following the termination of said signal inhibiting time period at the next occurring signal transition and storing said measurement in said first storage, reinitiating said signal inhibiting time measurement and said symbol width measurement and returning to step c); and g. storing the polarity contents of said temporary storage as the next said reference polarity.

26. The method as described in claim 25, further comprising:

predicting an ideal reinitiation time for said signal inhibiting time measurement by using the $+\alpha$ form of said selected algorithm.

27. The method as described in claim 26, further comprising:

predicting an ideal length for said signal inhibiting time measurement by using the $-\alpha$ form of said selected algorithm; and reinitiating of said signal inhibiting time measurement at said ideal predicted time therefor.

28. In an F2F coded data decoder apparatus system, in which the time periods or widths between signal transitions corresponding to the two frequencies originally used to encode the data may be distorted by acceleration, when received at said decoder, so as to exhibit their signal transition points spaced at other than the original frequency transition spacing or times, a method of operating said decoder apparatus for interpreting said distorted F2F coded data to extract therefrom its correct digital content whenever each multibit data block is preceded by at least two binary 1 preamble or first symbols having two double frequency time slots, or nominal half-symbol widths, by predicting the ideal length of an inhibiting period and controlling the duration of said inhibiting period imposed by said decoding apparatus for any said double frequency signal transitions occurring intermediate the single frequency symbol boundary transitions, thereby isolating said symbol boundary transitions for interpretation, comprising the steps performed by said apparatus of:

a. measuring the width of said first symbol and storing said measurement in a second storage;

b. reinitiating said symbol width measurement for said second symbol;

c. storing as a reference the polarity of the symbol boundary transition signal at the end of said second symbol width measurement;

d. storing said last reinitiated symbol width measurement in a first storage, and initiating a signal inhibiting time measurement;

e. predicting an ideal length for said data sensing time measurement according to the following algorithm:

$$T_{i_a} = T_{n-1} \left( \frac{T_{n-1}}{T_{n-2}} \right) (1 \pm \alpha),$$

where $\alpha$ is a variable coefficient arbitrarily chosen from the range $K_{p/4}$ to $½ - K_{p/4}$ and being optimum at $\alpha = ¼$, $T_{i_a}$ is said ideal predicted length for said signal inhibiting time measurement, $T_{n-1}$ is said first storage measurement, and $T_{n-2}$ is said second storage measurement;

f. terminating said signal inhibiting time measurement when it is equal to said ideal length of said signal inhibiting time measurement predicted according to said algorithm and, following the termination of said signal inhibiting period, sensing the next symbol boundary transition signal, storing the polarity of said signal in a temporary storage, comparing the polarity of said transition with said reference polarity, and if said polarities correspond, entering a one into a data register but, if said polarities do not correspond, entering a zero into said data register;

g. replacing the content of said second storage with the content of said first storage and terminating and reinitiating said symbol width measurement at said signal transition following said termination of said signal inhibiting time and resuming the operation at step d); and h. storing the polarity contents of said temporary storage as the next said reference polarity.

29. The method as described in claim 28, further comprising:

predicting an ideal reinitiation time for said signal inhibiting time measurement by using the $+\alpha$ form of said selected algorithm.

30. The method as described in claim 29, further comprising:

predicting an ideal length for said signal inhibiting time measurement by using the $-\alpha$ form of said selected algorithm; and reinitiating of said signal inhibiting time measurement at said ideal predicted time therefor.

* * * * *

UNITED STATES PATENT AND TRADEMARK OFFICE
CERTIFICATE OF CORRECTION

PATENT NO. : 3,947,662
DATED : March 30, 1976
INVENTOR(S) : Albert Watson Vinal

It is certified that error appears in the above-identified patent and that said Letters Patent are hereby corrected as shown below:

Claim 1, column 53, line 36, correct the spelling of "ideal"; column 54, line 44, after the first "said" insert the word --second--;

Claim 7, column 58, lines 31 through 49, delete in their entirety and substitute therefor the following:

$$\text{(a)} \quad T_{ig} = T_{n-1} \left(\frac{T_{n-1}}{T_{n-2}}\right) \left[(1 \pm \alpha) - \frac{|K_p|}{4}\right],$$

$$\text{(b)} \quad T_{ig} = T_{n-1} \left(\frac{T_{n-1}}{T_{n-2}}\right) \left[(1 \pm \alpha) + \frac{|K_p|}{4}\right],$$

$$\text{(c)} \quad T_{ig} = T_{n-1} \left(\frac{T_{n-1}}{T_{n-2}}\right) \left[\frac{4(1 \pm \alpha) - |K_p|}{(2 + |K_p|)^2}\right],$$

$$\text{(d)} \quad T_{ig} = T_{n-1} \left(\frac{T_{n-1}}{T_{n-2}}\right) \left[\frac{4(1 \pm \alpha) + |K_p|}{(2 - |K_p|)^2}\right],$$

$$\text{(e)} \quad T_{ig} = T_{n-1} \left(\frac{T_{n-1}}{T_{n-2}}\right) \left[\frac{2 - |K_p|}{(2 + |K_p|)^2}\right] \left[2(1 \pm \alpha) - \frac{|K_p|}{2}\right]$$

$$\text{(f)} \quad T_{ig} = T_{n-1} \left(\frac{T_{n-1}}{T_{n-2}}\right) \left[\frac{2 + |K_p|}{(2 - |K_p|)^2}\right] \left[2(1 \pm \alpha) + \frac{|K_p|}{2}\right]$$

$$\text{(g)} \quad T_{ig} = T_{n-1} \left(\frac{T_{n-1}}{T_{n-2}}\right) \left[1 - \frac{|K_p|}{2}\right] \left[(1 \pm \alpha) - \frac{|K_p|}{4}\right], \text{ or}$$

UNITED STATES PATENT AND TRADEMARK OFFICE
CERTIFICATE OF CORRECTION

PATENT NO. : 3,947,662
DATED : March 30, 1976
INVENTOR(S) : Albert Watson Vinal

It is certified that error appears in the above-identified patent and that said Letters Patent are hereby corrected as shown below:

$$(h) \quad T_{ig} = T_{n-1} \left(\frac{T_{n-1}}{T_{n-2}}\right) \left[1 + \frac{|K_p|}{2}\right] \left[(1 \pm \alpha) + \frac{|K_p|}{4}\right], --$$

Claim 10, column 61, line 23, change "sid" to --said--;

Claim 13, column 62, line 38, correct the spelling of "digital";

column 63, line 27, change "stat" to --state--;

Claim 16, column 66, line 13, correct the spelling of "according"

Claim 19, column 68, line 43, delete in its entirety and substitute therefor the following:

$$--(g) \quad T_{ig} = T_{n-1} \left(\frac{T_{n-1}}{T_{n-2}}\right) \left[1 - \frac{|K_p|}{2}\right] \left[(1 \pm \alpha) - \frac{|K_p|}{4}\right], \text{ or } --$$

Signed and Sealed this twenty-sixth Day of July 1977

[SEAL]

Attest:

RUTH C. MASON
Attesting Officer

C. MARSHALL DANN
Commissioner of Patents and Trademarks